(12) United States Patent
Gao et al.

(10) Patent No.: US 11,412,229 B2
(45) Date of Patent: Aug. 9, 2022

(54) METHOD AND APPARATUS FOR VIDEO ENCODING AND DECODING

(71) Applicant: TENCENT TECHNOLOGY (SHENZHEN) COMPANY LIMITED, Shenzhen (CN)

(72) Inventors: Xinwei Gao, Shenzhen (CN); Xunan Mao, Shenzhen (CN); Chenchen Gu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/994,183

(22) Filed: Aug. 14, 2020

(65) Prior Publication Data
US 2020/0382793 A1 Dec. 3, 2020

Related U.S. Application Data

(63) Continuation of application No. PCT/CN2019/089990, filed on Jun. 4, 2019.

(30) Foreign Application Priority Data

Jun. 20, 2018 (CN) .......................... 201810638919.1

(51) Int. Cl.
H04N 19/147 (2014.01)
H04N 19/124 (2014.01)
(Continued)

(52) U.S. Cl.
CPC ......... H04N 19/147 (2014.11); H04N 19/124 (2014.11); H04N 19/172 (2014.11); H04N 19/176 (2014.11)

(58) Field of Classification Search
CPC ...... H04N 19/176; H04N 19/61; H04N 19/70; H04N 19/117; H04N 19/46; H04N 19/147;
(Continued)

(56) References Cited

U.S. PATENT DOCUMENTS

2004/0213345 A1* 10/2004 Holcomb ............... H04N 19/59
375/240.03
2010/0067579 A1 3/2010 Bandoh et al.
(Continued)

FOREIGN PATENT DOCUMENTS

CN 101523923 A 9/2009
CN 103813174 A 5/2014
(Continued)

OTHER PUBLICATIONS

The World Intellectual Property Organization (WIPO) International Search Report for PCT/CN2019/089990 dated Aug. 15, 2019 5 Pages (including translation).

Primary Examiner — Farhan Mahmud
(74) Attorney, Agent, or Firm — Anova Law Group, PLLC

(57) ABSTRACT

A video coding method includes obtaining an input video frame; determining down-sampling information corresponding to the input video frame in response to determining that a target processing manner corresponding to the input video frame is a down-sampling processing manner; encoding the input video frame according to the down-sampling information to obtain encoded data corresponding to the input video frame; and adding the down-sampling information to the encoded data according to a processing range corresponding to the down-sampling information. The down-sampling information is capable of identifying at least one of a down-sampling proportion and a down-sampling method for
(Continued)

the input video frame or identifying a rule for identifying the at least one of a down-sampling proportion and a down-sampling method.

16 Claims, 13 Drawing Sheets

(51) Int. Cl.
*H04N 19/172* (2014.01)
*H04N 19/176* (2014.01)

(58) Field of Classification Search
CPC .... H04N 19/124; H04N 19/136; H04N 19/14; H04N 19/59; H04N 19/86; H04N 19/17
See application file for complete search history.

(56) References Cited

U.S. PATENT DOCUMENTS

| | | | |
|---|---|---|---|
| 2012/0076203 A1* | 3/2012 | Sugimoto | H04N 19/127 375/240.03 |
| 2014/0140407 A1 | 5/2014 | Yu et al. | |
| 2019/0253704 A1 | 8/2019 | Mao et al. | |

FOREIGN PATENT DOCUMENTS

| | | |
|---|---|---|
| CN | 107155107 A | 9/2017 |
| CN | 108848381 A | 11/2018 |
| EP | 2343900 A1 | 7/2011 |

\* cited by examiner

| | ... | ... | ... | ... | ... | ... | |
|---|---|---|---|---|---|---|---|
| ... | C1 | c11 | A1 | a11 | B1 | b11 | ... |
| ... | c13 | c12 | a13 | a12 | b13 | b12 | ... |
| ... | C2 | c21 | A2 | a21 | B2 | b21 | ... |
| ... | c23 | c22 | a23 | a22 | b13 | b22 | ... |
| ... | C3 | c31 | A3 | a31 | B3 | b31 | ... |
| ... | c33 | c32 | a33 | a32 | b33 | b32 | ... |
| | ... | ... | ... | ... | ... | ... | |

| C1 | ... | ... | ... | A1 | ... | ... | ... | B1 |
|---|---|---|---|---|---|---|---|---|
| ... | ... | ... | ... | ... | ... | ... | ... | ... |
| ... | ... | ... | ... | ... | ... | ... | ... | ... |
| ... | ... | ... | ... | ... | ... | ... | ... | ... |
| C2 | ... | ... | ... | A2 | a4 | a8 | a12 | B2 |
| ... | ... | ... | ... | a1 | a5 | a9 | a13 | ... |
| ... | ... | ... | ... | a2 | a6 | a10 | a14 | ... |
| ... | ... | ... | ... | a3 | a7 | a11 | a15 | ... |
| C3 | ... | ... | ... | A3 | ... | ... | ... | B3 |

METHOD AND APPARATUS FOR VIDEO ENCODING AND DECODING

RELATED APPLICATIONS

This application is a continuation application of PCT Patent Application No. PCT/CN2019/089990, filed on Jun. 4, 2019, which claims priority to Chinese Patent Application No. 201810638919.1, entitled "VIDEO ENCODING METHOD, VIDEO DECODING METHOD, APPARATUS, COMPUTER DEVICE, AND STORAGE MEDIUM" and filed with the National Intellectual Property Administration, PRC on Jun. 20, 2018, content of all of which is incorporated by reference in its entirety.

FIELD OF THE TECHNOLOGY

This application relates to the field of computer processing technologies and, in particular, to a video encoding method, a video decoding method, an apparatus, a computer device, and a readable storage medium.

BACKGROUND

With the development of digital media technologies and computer technologies, videos are applied to various fields, such as mobile communication, network monitoring, and network television. With the improvement of hardware performance and screen resolution, users' demand for high-definition videos is increasing.

Under the condition of a limited bandwidth, conventional encoders encode video frames indiscriminately. This may lead to poor video quality in some scenarios. For example, at 750 kbps, when all video frames are encoded indiscriminately, some video frames are of poor quality in H.264, H.265, iOS and other encoders. The disclosed methods and systems are directed to solve one or more problems set forth above and other problems.

SUMMARY

Embodiments of the present disclosure provide a video encoding method, a video decoding method, an apparatus, a computer device, and a readable storage medium, so that down-sampling information can be adaptively selected, thereby improving video quality under the condition of a limited bandwidth. The technical solutions are as follows:

According to an aspect of the present disclosure, a video coding method is provided for a computer device. The method includes obtaining an input video frame; determining down-sampling information corresponding to the input video frame in response to determining that a target processing manner corresponding to the input video frame is a down-sampling processing manner; encoding the input video frame according to the down-sampling information to obtain encoded data corresponding to the input video frame; and adding the down-sampling information to the encoded data according to a processing range corresponding to the down-sampling information. The down-sampling information is capable of identifying at least one of a down-sampling proportion and a down-sampling method for the input video frame or identifying a rule for identifying the at least one of a down-sampling proportion and a down-sampling method.

According to another aspect of the present disclosure, a video coding method is provided for a computer device. The method includes: obtaining encoded data corresponding to a current frame to be decoded; obtaining, from the encoded data, down-sampling information corresponding to the current frame in response to determining that a target processing manner corresponding to the current frame is a down-sampling processing manner; and decoding the encoded data according to the down-sampling information corresponding to the current frame, to obtain a corresponding decoded video frame. The down-sampling information is capable of identifying at least one of a down-sampling proportion and a down-sampling method for the current frame or identifying a rule for identifying the at least one of a down-sampling proportion and a down-sampling method.

According to another aspect of the present disclosure, a non-transitory computer-readable storage medium is provided. The non-transitory computer-readable storage medium stores computer program instructions executable by at least one processor to perform: obtaining an input video frame; determining down-sampling information corresponding to the input video frame in response to determining that a target processing manner corresponding to the input video frame is a down-sampling processing manner; encoding the input video frame according to the down-sampling information to obtain encoded data corresponding to the input video frame; and adding the down-sampling information to the encoded data according to a processing range corresponding to the down-sampling information. The down-sampling information is capable of identifying at least one of a down-sampling proportion and a down-sampling method for the input video frame or identifying a rule for identifying the at least one of a down-sampling proportion and a down-sampling method.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings for describing the embodiments. Apparently, the accompanying drawings in the following description show only some embodiments of the present disclosure, and a person of ordinary skill in the art may derive other drawings from these accompanying drawings without creative efforts.

DETAILED DESCRIPTION

To make the objectives, technical solutions, and advantages of the present disclosure clearer, the following further describes implementations of the present disclosure in detail with reference to the accompanying drawings.

Figure 1:
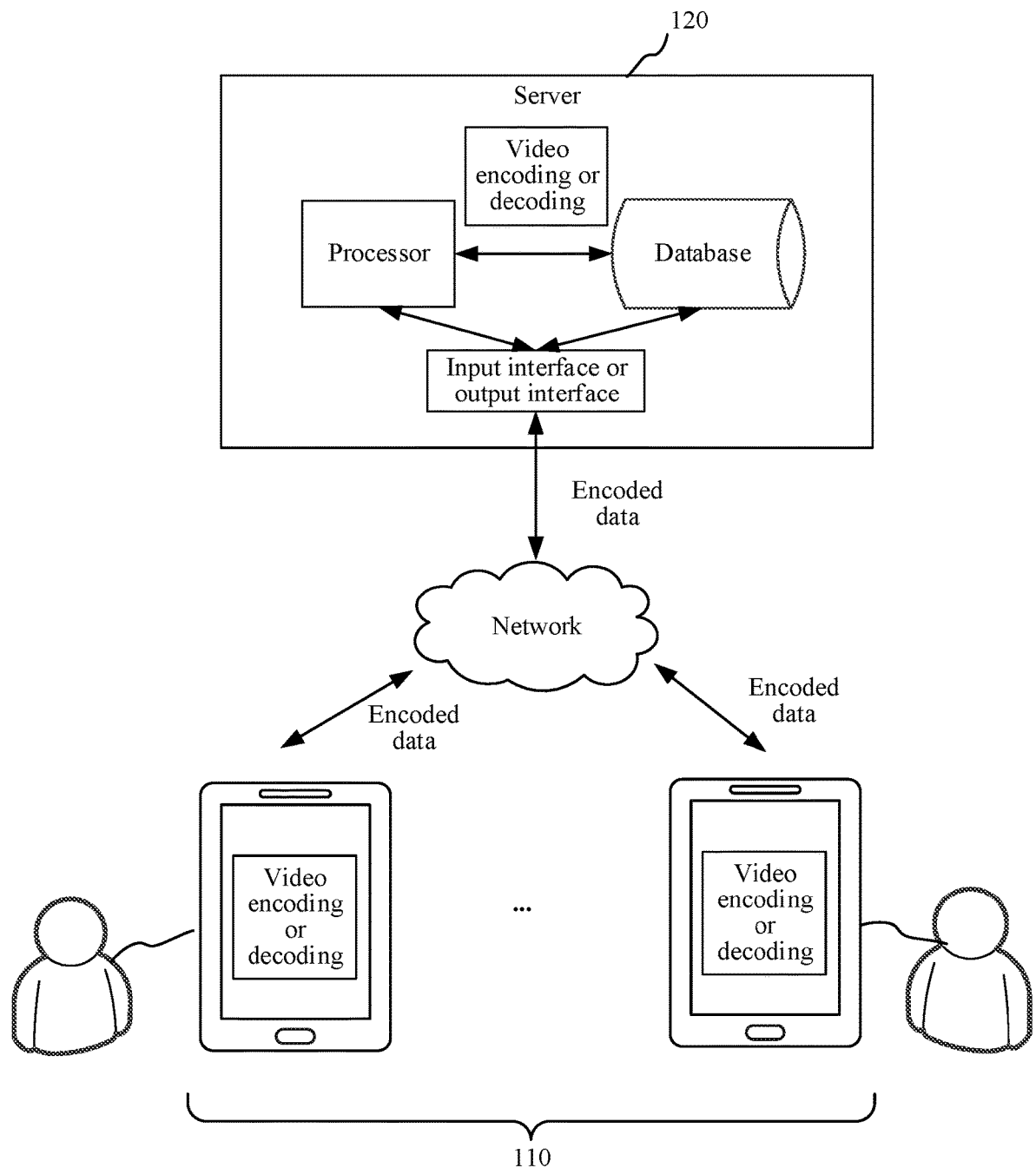
FIG. 1 is a diagram of an application environment of a video encoding method according to an embodiment of the present disclosure.

FIG. 1 is a diagram of an application environment of a video encoding method and a video decoding method according to an embodiment. As shown in FIG. 1, the application environment includes a terminal 110 and a server 120, where the terminal 110 communicates with the server 120 through a network. The terminal 110 may be specifically a desktop terminal or a mobile terminal, and the mobile terminal may be specifically at least one of a mobile phone, a tablet computer, a notebook computer, and the like. The server 120 may be implemented by an independent server or a server cluster formed by a plurality of servers.

Optionally, the video encoding method and the video decoding method may be implemented in the terminal 110 or the server 120, or may be implemented in an interactive scenario of the terminal 110 and the server 120. The terminal 110 or the server 120 may perform video encoding by using an encoder or video decoding by using a decoder. The terminal 110 or the server 120 may also perform video encoding by using a processor running a video encoding program or video decoding by using a processor running a video decoding program. After receiving, through an input interface, encoded data sent by the terminal 110, the server 120 may directly transfer the encoded data to the processor for decoding, or may store the encoded data in a database for subsequent decoding. After obtaining encoded data by using the processor encoding an original video frame, the server 120 may directly send the encoded data to the terminal 110 through an output interface, or may store the encoded data in a database for subsequent transfer.

Figure 2:
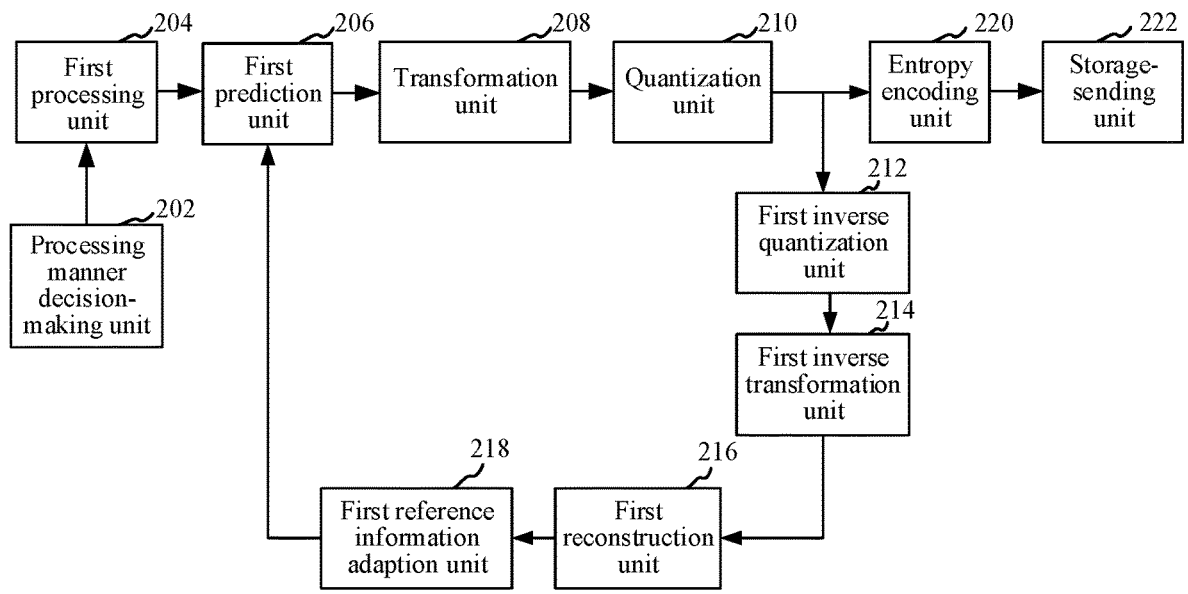
FIG. 2 is a diagram of an encoding framework corresponding to a video encoding method according to an embodiment of the present disclosure.

FIG. 2 is a diagram of an encoding framework corresponding to a video encoding method according to an embodiment. In the video encoding method provided in one embodiment of the present disclosure, each input video frame in an input video sequence may be obtained for encoding, to obtain corresponding encoded data, and the encoded data is stored and/or sent through a storage-sending unit 222. A processing manner decision-making unit 202 is configured to perform decision-making on a manner for processing an input video frame, to obtain a processing manner corresponding to the input video frame, a first processing unit 204 is configured to perform corresponding processing on the input video frame according to the processing manner, to obtain a to-be-encoded frame; a first prediction unit 206 is configured to perform intra prediction or inter prediction on each coded block of the to-be-encoded frame at a resolution of the to-be-encoded frame, and obtain a predicted value and a corresponding motion vector according to an image value of a reference block corresponding to the coded block, a predicted residual being obtained by subtracting an actual value of the coded block from the predicted value, and the motion vector representing a displacement of the coded block relative to the reference block; and a transformation unit 208 is configured to transform a predicted residual and vector information in a spatial domain to a frequency domain, and encode a transformation parameter or coefficient. Optionally, the method for transforming the predicted residual and the vector information to the frequency domain may be a discrete Fourier transformation manner, or may be a discrete cosine transformation manner, the vector information may be an actual motion vector or a motion vector difference representing a displacement, and the motion vector difference is a difference between the actual motion vector and a predicted motion vector.

Optionally, a quantization unit 210 is configured to map the transformed data, for example, dividing the transformed data by a quantization step to obtain a relatively small value as a mapping result for the transformed data. Optionally, a quantization step corresponds to a quantization parameter (QP) using a sequence number as the quantization step, and a corresponding quantization step may be found according to a QP. Optionally, a smaller QP indicates more details reserved in an image frame, and a corresponding higher code rate, and accordingly, a larger QP indicates a corresponding lower code rate, and fewer details reserved in an image, that is, more obvious image distortion. A principle of quantization is expressed by using the following formula: FQ=round (y/Qstep). y is a value corresponding to a video frame before quantization is performed, Qstep is a quantization step, and FQ is a quantized value obtained by quantizing y. The Round(x) function is used for performing rounding off to an even number on the value, that is, banker's rounding. Optionally, the correspondence between the QP and the quantization step may be specifically set according to a requirement. For example, in some video encoding standards, for brightness coding, the quantization step has 52 values that are integers from 0 to 51. For chroma coding, the quantization step has values that are integers from 0 to 39.

In addition, the quantization step increases as the QP increases. Each time the QP is increased by 6, the quantization step is doubled.

Optionally, an entropy encoding unit 220 is configured to perform entropy encoding. The entropy encoding refers to a data encoding manner of encoding data according to an entropy principle without loss of any information, and a smaller character may be used for expressing certain information. The entropy encoding method may be, for example, Shannon coding or Huffman coding.

Optionally, a first inverse quantization unit 212, a first inverse transformation unit 214, a first reconstruction unit 216, and a reference information adaption unit 218 are units corresponding to a reconstructed path, and the units of the reconstructed path are used for performing frame reconstruction to obtain a reference frame, so that reference frames in encoding and decoding can maintain consistent. The step performed by the first inverse quantization unit 212 is an inverse process of quantization, the step performed by the first inverse transformation unit 214 is an inverse process of transformation performed by the transformation unit 210, and the first reconstruction unit 216 is configured to add predicted data to residual data obtained through inverse transformation to obtain a reconstructed reference frame. The first reference information adaption unit 218 is configured to perform adaption on at least one piece of reference information such as a current reference frame obtained through reconstruction, location information corresponding to each coded block of a to-be-encoded frame, location information corresponding to each reference block of the current reference frame, and a motion vector at a resolution of the to-be-encoded frame, so that the first prediction unit 206 performs prediction according to the reference information obtained after the adaption.

Figure 3:
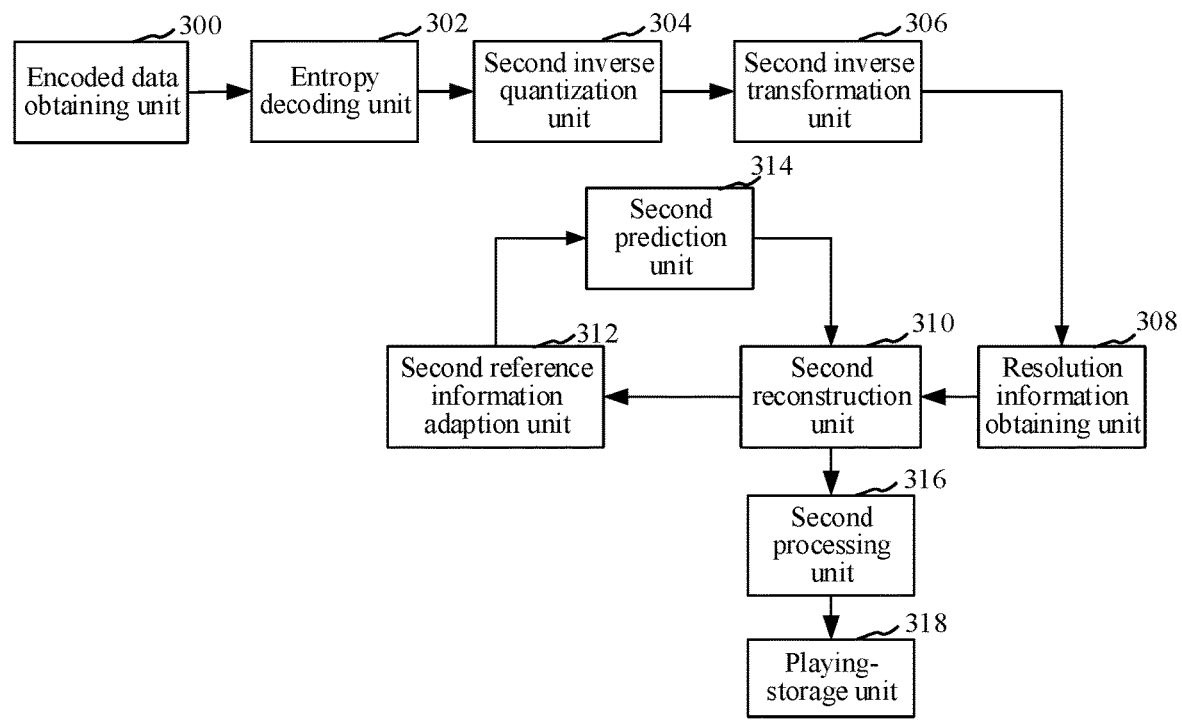
FIG. 3 is a diagram of a decoding framework corresponding to a video decoding method according to an embodiment of the present disclosure.

FIG. 3 is a diagram of a decoding framework corresponding to a video decoding method according to an embodiment. In the video decoding method provided in one embodiment of the present disclosure, an encoded data obtaining unit 300 may obtain encoded data corresponding to each to-be-decoded video frame of a to-be-decoded video sequence, an entropy decoding unit 302 may perform entropy decoding to obtain entropy decoded data, a second inverse quantization unit 304 may perform inverse quantization on the entropy decoded data, to obtain inversely quantized data, and a second inverse transformation unit 306 may perform inverse transformation on the inversely quantized data, to obtain inversely transformed data. The inversely transformed data may be consistent with data obtained after the first inverse transformation unit 214 in FIG. 2 performs inverse transformation. A resolution information obtaining unit 308 is configured to obtain resolution information corresponding to the to-be-decoded video frame.

A second reference information adaption unit 312 is configured to obtain a current reference frame obtained through reconstruction by a second reconstruction unit, and perform adaption on at least one piece of reference information such as the current reference frame, location information corresponding to each to-be-decoded block of the to-be-decoded video frame, location information corresponding to each reference block of the current reference frame, and a motion vector according to the resolution information of the to-be-decoded video frame. Prediction is performed according to the information obtained after the adaption. A second prediction unit 314 obtains a reference block corresponding to the to-be-decoded block according to the reference information obtained after the adaption, and obtains, according to an image value of the reference block, a predicted value consistent with the predicted value in FIG. 2. A second reconstruction unit 310 performs reconstruction according to the predicted value and the inversely transformed data, that is, a predicted residual, to obtain a reconstructed video frame. A second processing unit 316 processes the reconstructed video frame according to the resolution information corresponding to the to-be-decoded video frame, to obtain a corresponding decoded video frame. A playing-storage unit 318 may play or store or play and store the decoded video frame.

It may be understood that, the foregoing encoding framework diagram and decoding framework diagram are merely an example and do not constitute a limitation on the encoding method to which the solutions of the present disclosure are applied. Specifically, the diagram of the encoding framework and the diagram of the decoding framework may include more or fewer units than those shown in the figures, or combine some units, or have different component unit arrangements. For example, loop filtering may be further performed on the reconstructed video frame, to reduce blocking artifacts of the video frame, and improve video quality.

Figure 4:
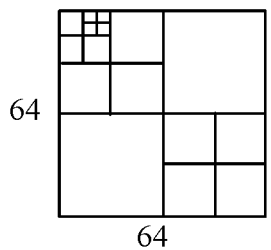
FIG. 4 is a schematic diagram corresponding to a coded block according to an embodiment of the present disclosure.

The to-be-encoded frame (i.e., the current frame) may be divided into a plurality of coded blocks, and a size of the coded block may be set according to a requirement or obtained through calculation. For example, the size of the coded block may be 8*8 pixels. Alternatively, rate-distortion costs corresponding to various division manners of the coded block may be calculated, and a division manner with a small rate-distortion cost may be selected to divide the coded block. FIG. 4 shows a schematic division diagram of an image block of 64*64 pixels, and one block represents one coded block. It may be learned from FIG. 4 that, the size of the coded block may include 32*32 pixels, 16*16 pixels, 8*8 pixels, and 4*4 pixels. Certainly, the size of the coded block may be another size, for example, may be 32*16 pixels or 64*64 pixels. It may be understood that, during decoding, the coded block and the to-be-decoded block are in a one-to-one correspondence, and therefore, the pixel size of the to-be-decoded block may also include 32*32 pixels, 16*16 pixels, 8*8 pixels, and 4*4 pixels.

In a possible application scenario, the video encoding method and the video decoding method provided in the embodiments of the present disclosure may be applied to an application program having a video call function. The application program may be a social application program or an instant messaging application program. When two terminals installed with the two application programs perform a video call process, a first terminal acquires a video frame through a camera, then encodes the video frame through a video encoding function of the application program, to obtain encoded data, and sends the encoded data to a background server of the application program. The background server forwards the encoded data to a second terminal. After receiving the encoded data, the second terminal decodes the encoded data through a video decoding function of the application program, to obtain a video frame through reconstruction, and further displays the video frame. Similarly, the second terminal may send, through the background server, the encoded data obtained through encoding to the first terminal, and the first terminal decodes and displays the encoded data, to implement the video call of the two terminals.

In another possible application scenario, the video encoding method and the video decoding method provided in the embodiments of the present disclosure may be applied to an application program having a video playing function. The application program may be a video streaming application program, a short video application program, or a video playing application program. A terminal installed with the application program may acquire a video frame through a camera, then encode the video frame through a video encoding function of the application program, to obtain encoded data, and send the encoded data to a background server of the application program. When another terminal requests to watch the video, the background server sends the encoded data of the video to the another terminal, and an application program in the another terminal decodes the encoded data, to play the video.

Certainly, the foregoing several possible application scenarios are only used for exemplary description, and the video encoding method and the video decoding method provided in the embodiments of the present disclosure may be further applied to other scenarios in which video encoding and decoding need to be performed. This is not limited in the embodiments of the present disclosure.

Figure 5:
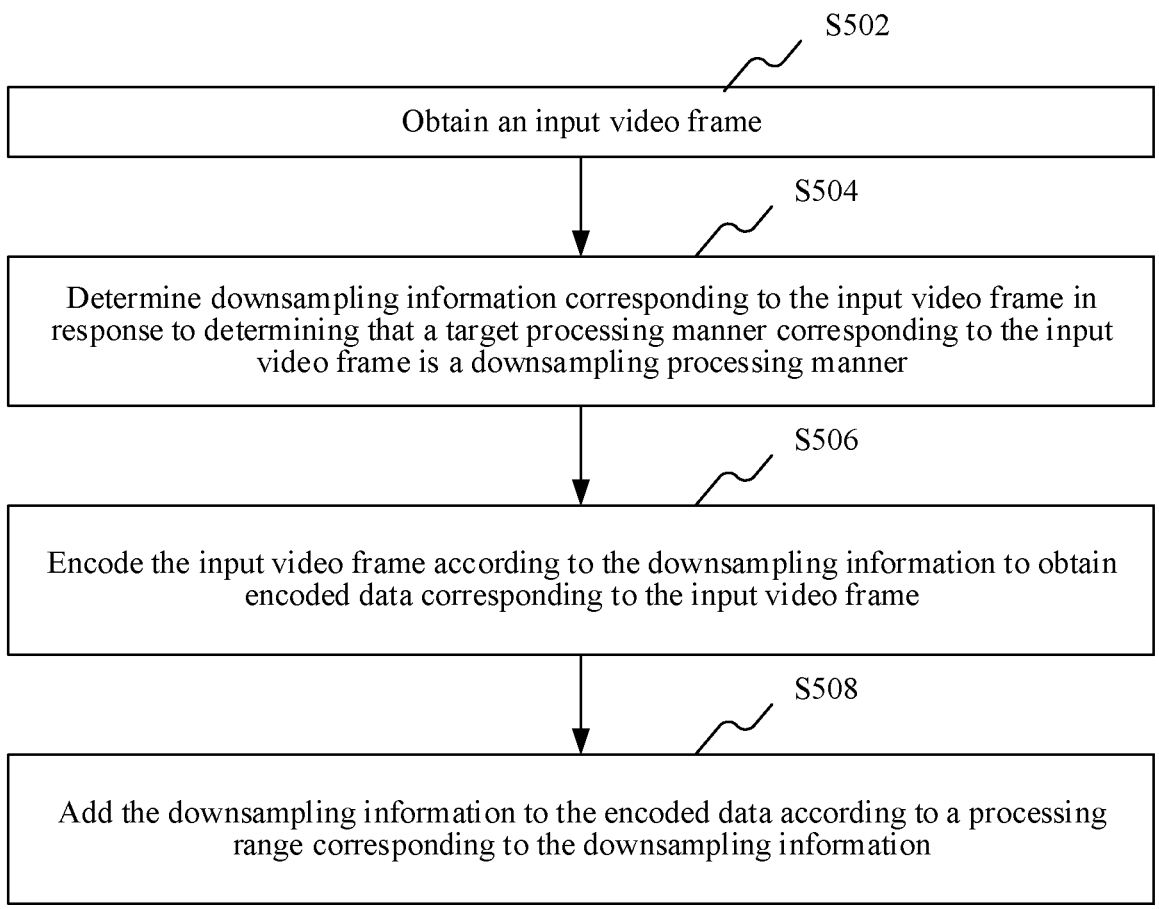
FIG. 5 is a flowchart of a video encoding method according to an embodiment of the present disclosure.

As shown in FIG. 5, in an embodiment, a video encoding method is provided. The video encoding method not only may be applied to a server but also may be applied to a terminal. An example in which the video encoding method is applied to a terminal is used for description. The video encoding method may specifically include the followings.

S502. Obtain an input video frame.

A video may be formed by a plurality of consecutive video frames, and the video is encoded by encoding each video frame.

The input video frame is a current frame to be encoded. The input video frame may be a video frame acquired in real time currently, for example, a video frame currently acquired for instant messaging may also be a video frame stored in a video.

S504. Determine down-sampling information corresponding to the input video frame in response to determining that a target processing manner corresponding to the input video frame is a down-sampling processing manner.

The down-sampling information is corresponding information when the input video frame is down-sampled. The down-sampling information includes at least one of a down-sampling proportion and a down-sampling method.

The processing manner for processing the input video frame includes: any one of a full resolution processing manner and a down-sampling processing manner; and down-sampling information corresponding to the input video frame is obtained when it is determined that a target processing manner corresponding to the input video frame is a down-sampling processing manner. In an embodiment, the target processing manner corresponding to the input video frame is selected from a candidate processing manner, and the candidate processing manner may be a full resolution processing manner or a down-sampling processing manner.

The method for obtaining the processing manner corresponding to the input video frame may be set according to an actual requirement. For example, the method may be obtaining a processing parameter corresponding to the input video frame, and obtaining a corresponding processing manner according to the processing parameter. The processing parameter is a parameter used for determining a processing manner, and a specifically used processing manner may be set according to a requirement. For example, the processing parameter may be obtained according to current coding information and/or image feature information corresponding to the input video frame.

After the processing manner is determined, processing manner information is added to encoded data, so that subsequently, a decoding end performs decoding according to the processing manner information in the encoded data. The processing manner information records the processing manner corresponding to the input video frame, that is, a full resolution processing manner or a down-sampling processing manner. After it is determined that the processing manner is the down-sampling processing the manner, corresponding down-sampling information further needs to be determined, so that encoding is performed subsequently according to the down-sampling information.

Optionally, the down-sampling method includes any one of horizontal (width) down-sampling, vertical (height) down-sampling, and horizontal and vertical down-sampling. Optionally, the down-sampling proportion refers to a ratio between resolutions before and after sampling, and includes a horizontal down-sampling proportion and a vertical down-sampling proportion. The sampling proportion may be represented by a ratio of a resolution after sampling to a resolution before sampling, or may be represented by a ratio of a resolution before sampling to a resolution after sampling. For example, on horizontal down-sampling, a resolution after horizontal down-sampling is half of that before the sampling. Therefore, if the sampling proportion is represented by a ratio of a resolution after sampling to a resolution before sampling, it is ½; and if the sampling proportion is represented by a ratio of a resolution before sampling to a resolution after sampling, it is 2.

For clarity of description, the down-sampling proportion and an up-sampling proportion in the following specification are represented by a ratio of a resolution before sampling to a resolution after sampling.

Optionally, the down-sampling proportion includes a vertical (height) down-sampling proportion and a horizontal (width) down-sampling proportion. For example, horizontal (width)-double down-sampling is performed on the input video frame, and the width of a sampled image is half of that of the original input video frame. If both width-double down-sampling and height-double down-sampling are performed on the input video frame, both the width and the height after the sampling are half of the original width and height, and the resolution after the sampling is ¼ of the original resolution. To adaptively select the down-sampling proportion, a plurality of down-sampling proportions may be preset for selection, for example, width-double down-sampling×height-double down-sampling, width-triple down-sampling×height-triple down-sampling, width-quadruple down-sampling×height-quadruple down-sampling, and width-double down-sampling×height-triple down-sampling. Alternatively, a rule of setting/getting the down-sampling proportion may be defined to determine the down-sampling proportion without explicitly setting the down-sampling proportion.

The down-sampling method refers to a specifically used sampling method, and common sampling methods include: snapshot, direct averaging, a filter, bilinear interpolation, bicubic interpolation, a convolutional neural network (CNN)-based algorithm, a statistical property-based method, and the like. Different sampling methods correspond to different calculation complexities. The down-sampling method may be adaptively selected according to an application environment. Alternatively, a rule of setting/getting the down-sampling method may be defined to determine the down-sampling method without explicitly setting the down-sampling method.

In an embodiment, the down-sampling method corresponding to the input video frame is related to a current environmental factor, for example, related to a level of a real-time requirement for a current video. If a relatively high real-time requirement is needed, a sampling method with a low calculation complexity is generally used, and if no high real-time requirement is needed, a sampling method with a relatively high calculation complexity is used. A higher calculation complexity of the down-sampling method indicates that better video quality is obtained accordingly. In an embodiment, the current environmental factor further includes at least one of a terminal type, CPU utilization, a quantity of CPU cores, and CPU memory. Generally, if the current environmental factor can process a higher calculation complexity, accordingly, a down-sampling method with a higher calculation complexity is selected; otherwise, a down-sampling method with a lower calculation complexity is selected, thereby helping improve an encoding speed while ensuring video quality.

In an embodiment, the down-sampling proportion corresponding to the input video frame is related to video frame information corresponding to the input video frame. The video frame information includes a frame type, image feature information, and the like. For example, if the frame type is a B frame, a resolution with a relatively high down-sampling proportion is inclined to be selected. A P frame may be used as a reference frame of the B frame, and image quality of the P frame affects image quality of the subsequent B frame. Therefore, if the frame type is the P frame, a resolution with a relatively low down-sampling proportion is inclined to be selected. The image feature information refers to a feature of an image itself corresponding to the video frame, and includes a motion feature, a texture complexity feature, and the like. Optionally, if a motion degree is larger, a texture feature is more complex, and under a limited bandwidth, a higher down-sampling proportion is more inclined to be selected.

S506. Encode the input video frame according to the down-sampling information to obtain encoded data corresponding to the input video frame.

Optionally, when the down-sampling information includes a down-sampling proportion, the input video frame is down-sampled according to the down-sampling proportion, to obtain a to-be-encoded frame, and then the to-be-encoded frame is encoded to obtain encoded data corresponding to the input video frame. The encoded data refers to data obtained through encoding.

When the down-sampling information includes a down-sampling method, the terminal down-samples the input video frame according to the down-sampling method, to obtain a to-be-encoded frame, and then encodes the to-be-encoded frame to obtain encoded data.

When the down-sampling information includes both a down-sampling proportion and a down-sampling method, the terminal first down-samples the input video frame according to the down-sampling proportion, to obtain a to-be-encoded frame, and then encodes the to-be-encoded frame by using the down-sampling method, to obtain encoded data corresponding to the input video frame.

S508. Add the down-sampling information to the encoded data according to a processing range corresponding to the down-sampling information.

The processing range refers to an action range when down-sampling is performed according to the down-sampling information. The down-sampling information is added to the encoded data according to the processing range corresponding to the down-sampling information, so that subsequently the decoding end performs decoding according to the down-sampling information in the encoded data.

Optionally, an action range of the down-sampling information may be only for one video frame, or may be for a plurality of video frames. If the action range is only for one video frame, that is, only the video frame uses the down-sampling information, the down-sampling information is added to header information corresponding to the video frame. If the processing range corresponding to the down-sampling information includes a plurality of video frames, that is, the plurality of video frames in the processing range correspond to the same down-sampling information. For the processing range including a plurality of video frames, the down-sampling information only needs to be added to header information of the processing range, and the down-sampling information does not need to be added to header information of each video frame. The processing range may be user-defined according to an actual requirement. For example, an entire video sequence may be used as the processing range, or one or more groups of pictures (GOPs) may be used as the processing range, or each video frame may be used as the processing range.

Thus, in the disclosed video encoding methods, the down-sampling information is added to the encoded data, so that subsequently the decoding end performs decoding according to the down-sampling information in the encoded data, so as to adaptively select the down-sampling information to perform encoding, thereby not only improving the encoding speed, but also helping ensure subjective quality.

In the foregoing video encoding method, an input video frame is obtained, down-sampling information corresponding to the input video frame is determined, then the input video frame is encoded according to the down-sampling information to obtain encoded data corresponding to the input video frame, and the down-sampling information is added to the encoded data according to a processing range corresponding to the down-sampling information. In the foregoing encoding method, the down-sampling information is added to the encoded data, so that more suitable down-sampling information can be selected flexibly and adaptively for each input video frame in an encoding process, and video quality is improved under a limited bandwidth.

In an embodiment, the adding the down-sampling information to the encoded data according to a processing range corresponding to the down-sampling information includes: obtaining the processing range corresponding to the down-sampling information, the processing range including any one of a sequence level range, a GOP level range, a frame level range, and a coded block level range; and adding the down-sampling information to header information corresponding to the processing range.

The processing range is classified into a sequence level range, a GOP level range, a frame level range, and a coded block level range. The sequence level range is for the entire video sequence, that is, each video frame in the video sequence corresponds to the same down-sampling information. The GOP refers to a group of consecutive pictures, and one GOP means that data segments including several P frames and B frames are included between a start location at which an I frame is received, and an end location at which a next I frame is received. The I frame is an intra coded frame, the P frame is a forward predictive frame, and the B frame is a bidirectional predictive frame. That is, the I frame is a complete picture, and the P frame and the B frame record changes relative to the I frame. Without the I frame, the P frame and the B frame cannot be decoded. The GOP level range is for a GOP, and for each video frame in a GOP in the processing range, down-sampling information corresponding to the GOP is used. The frame level range is for a video frame, that is, the down-sampling information is only for a current video frame. The coded block level range is for a coded block in the video frame.

Figure 6:
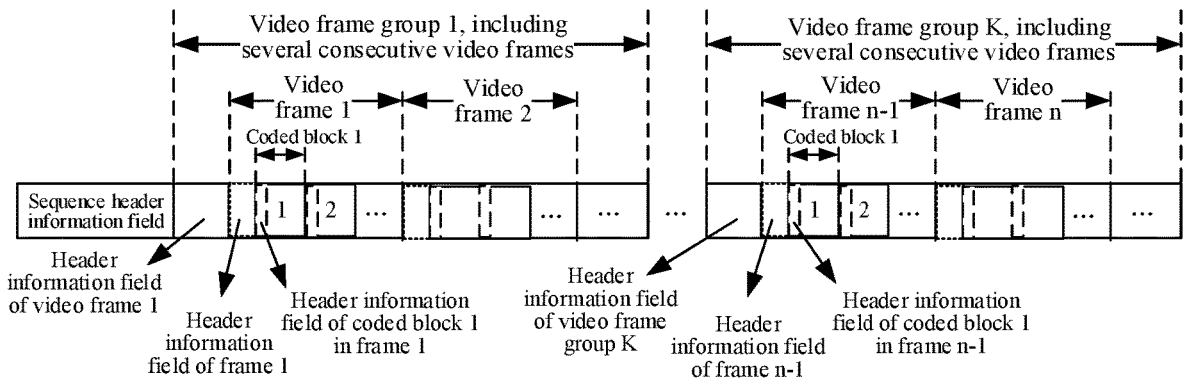
FIG. 6 is a schematic diagram of a location of a header information field according to an embodiment of the present disclosure.

If the down-sampling information is for a sequence level, the down-sampling information is added to header information of a video sequence, and a corresponding action range is the entire video sequence. If the down-sampling information is for a GOP level, the down-sampling information is added to header information corresponding to a GOP, and a corresponding action range is a video frame in the GOP. If the down-sampling information is for a frame level, the down-sampling information is added to header information corresponding to the frame level, and a corresponding action range is the current video frame. If the sampling method is for a coded block level, the down-sampling information is added to header information corresponding to a coded block, and a corresponding action range is the current coded block. FIG. 6 is a schematic diagram of locations of a sequence header information field, a GOP header information field, a frame level header information field, and a coded block header information field in an embodiment. A flag bit Down_Sampling Scale of corresponding down-sampling proportions may be assigned with different values, and then added to header information corresponding to the processing range to identify the corresponding down-sampling proportions. Likewise, a flag bit Down_Sampling_Method of corresponding down-sampling methods may be assigned with different values, and then added to the corresponding header information to identify the different down-sampling methods.

In certain embodiments, in additional to identify the down-sampling proportions and/or the down-sampling methods, the down-sampling information may also be a semantic element defining a specific rule to set/get the down-sampling proportion and/or down-sampling processing manner. That is, no specific down-sampling proportion or down-sampling processing manner may be defined explicitly, and the encoding/decoding process is based on the semantic element to determine a scheme to set/get the down-sampling proportion and/or down-sampling processing manner. After being determined by the scheme, and the down-sampling proportion and/or down-sampling processing manner may then be used in the encoding/decoding processing, as described in the present disclosure. For example, when the semantic element is defined at the frame level, different frames may use different down-sampling resolution: the first frame may be at ½, the second frame may be at ⅓, and so on.

Figure 7:
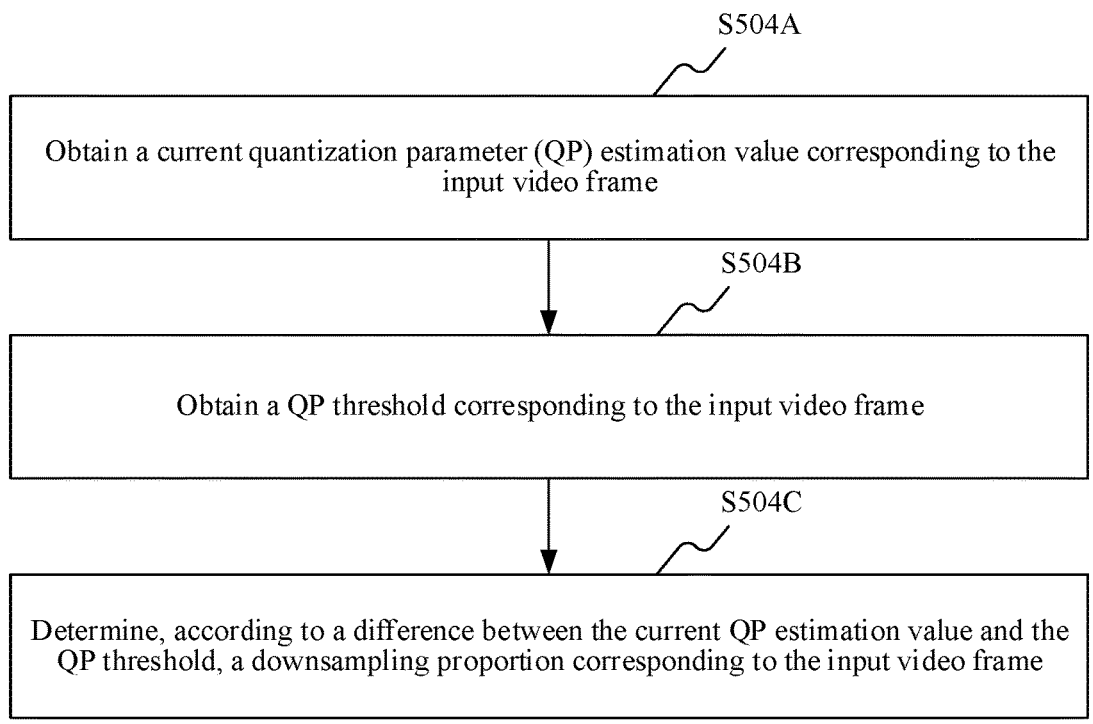
FIG. 7 is a flowchart of determining down-sampling information according to an embodiment of the present disclosure.

As shown in FIG. 7, in an embodiment, the foregoing down-sampling information includes a down-sampling proportion, and the foregoing step 504 may be further implemented as the following S504A to S504C. As shown in FIG. 7, the method further includes the followings. S504A. Obtain a current quantization parameter (QP) estimation value corresponding to the input video frame.

The QP is a parameter used for measuring a quantization step and can affect image quality. A smaller QP indicates that corresponding image quality is better. A QP and a compression rate are positively correlated. That is, a smaller QP indicates that a corresponding compression rate is smaller, and a larger QP indicates that a corresponding compression rate is larger. To determine a down-sampling proportion corresponding to the input video frame, a current QP corresponding to the input video frame needs to be estimated. In an embodiment, the QP estimation value is determined according to an encoding mode used by an encoder. The encoding mode includes fixed quality encoding and fixed code rate encoding. The fixed quality encoding refers to an encoding manner maintaining fixed video picture quality, and the fixed code rate encoding refers to an encoding manner maintaining a fixed video code rate. For different encoding manners, methods for calculating a QP estimation value of the input video frame are different.

In an embodiment, if the current encoding manner is fixed quality encoding, a QP corresponding to the fixed quality encoding is directly used as the QP estimation value of the input video frame, that is, an externally preset value of the encoder is used as the QP estimation value of the input video frame. Because QPs used by all encoding units in the fixed quality encoding manner are the same, a preset QP may be directly used as the QP estimation value of the input video frame.

If the current encoding manner is fixed code rate encoding, a QP of the first encoding unit of the current video frame is calculated according to an existing code rate control algorithm of the encoder, and the QP of the first encoding unit is used as a QP estimation value corresponding to the current video frame. For the fixed code rate encoding, QPs corresponding to different encoding units in the same video frame are different, or an average value of the QPs of different encoding units may be used as the QP estimation value corresponding to the current video frame.

In another embodiment, for the fixed code rate encoding, the QP estimation value of the current video frame is determined according to an average QP of a forward reference video frame. Optionally, the average QP of the forward reference video frame is calculated, and then a frame type of the forward reference video frame is obtained. If the frame type of the forward reference video frame is the same as that of the current video frame, the average QP is directly used as the QP estimation value of the current video frame. If the frame type of the forward reference video frame is different from that of the current video frame, a frame QP offset (preset) between the two frame types is obtained, and a sum of the average QP and the frame QP offset is used as the QP estimation value corresponding to the current video frame.

S504B. Obtain a QP threshold corresponding to the input video frame.

The QP threshold is a reference value used for measuring a QP. The current QP estimation value corresponding to the input video frame may be compared with the QP threshold, to determine the down-sampling proportion corresponding to the input video frame. QP thresholds corresponding to different video frames may be different. For example, different QP thresholds are set for different frame predictive types. In another embodiment, the setting of the QP threshold is related to an image content complexity of the video frame, and the QP threshold and the image content complexity are positively correlated. A larger image content complexity indicates that a corresponding larger QP threshold is set.

S504C. Determine, according to a difference between the current QP estimation value and the QP threshold, a down-sampling proportion corresponding to the input video frame.

The difference between the current QP estimation value and the QP threshold that correspond to the input video frame is calculated, and then the down-sampling proportion corresponding to the input video frame is determined according to the difference. The difference is in direct proportion to the down-sampling proportion, that is, a larger difference indicates that a corresponding down-sampling proportion is higher. The current QP estimation value is compared with the QP threshold, and then a suitable down-sampling proportion is selected according to the difference between them, thereby helping improve a video encoding speed while ensuring subjective quality.

In an embodiment, the determining, according to a difference between the current QP estimation value and the QP threshold, a down-sampling proportion corresponding to the input video frame includes: obtaining a correspondence between a candidate difference range and a candidate down-sampling proportion; determining, from the candidate difference range according to the difference between the current QP estimation value and the QP threshold, a target difference range corresponding to the difference; and determining, from the candidate down-sampling proportion according to the target difference range and the correspondence, the down-sampling proportion corresponding to the input video frame.

Optionally, the selection of the down-sampling proportion and the difference between the current QP estimation value and the QP threshold are positively correlated, and a larger difference indicates that a corresponding down-sampling proportion is larger.

In an embodiment, the obtaining a QP threshold corresponding to the input video frame includes: obtaining video frame information corresponding to the input video frame, the video frame information including at least one of coding information, image feature information, and a ratio of an intra coded block to an inter coded block of a preamble video frame; and determining, according to the video frame information, the QP threshold corresponding to the input video frame.

The coding information refers to video compression parameter information of an input video obtained previously during encoding, and includes at least one of a frame predictive type, a motion vector, a QP, a video source, a code rate, a frame rate, a resolution, and the like. The frame predictive type refers to the type of the video frame, and is classified into an intra predictive frame and an inter predictive frame. For example, an I frame is an intra predictive frame, and a P frame and a B frame are inter predictive frames. The I frame is usually the first frame or a frame in which image switching exists, and quality of the I frame affects quality of a subsequent P frame or B frame. Therefore, the intra predictive frame is inclined to select a lower down-sampling proportion, to ensure image quality, so that for the inter predictive frame, a larger QP threshold is usually set. Further, the P frame may be used as a reference frame of the B frame, and image quality of the P frame affects image quality of a subsequent B frame. Therefore, the P frame is more inclined to set a larger QP threshold compared with the B frame. The image feature information refers to information related to image content, and includes at least one of image motion feature information, image texture feature information, image detail richness, and a spatial correlation.

The coding information and/or the image feature information reflect a scenario, a detail complexity, motion intensity, and the like that correspond to a video frame. For example, a motion scenario may be determined by using a motion vector, a QP, a predicted residual, a code rate, and the like. A larger QP usually indicates higher motion intensity, and a large motion vector indicates that an image scenario is a large motion scenario. A fixed code rate indicates a limited amount of information that can be expressed. Therefore, under the condition of a fixed code rate, for situations of a scenario having higher motion intensity and a large motion scenario, an encoding manner with a relatively low resolution (a high down-sampling proportion) is inclined to be selected. Therefore, a relatively small QP threshold is set accordingly.

Each video frame includes a plurality of coded blocks, and each coded block corresponds to a predictive mode, such as an intra predictive coded block or an inter predictive coded block. The intra predictive coded block refers to a coded block for predicting a current block according to other coded blocks of a current frame, and the inter predictive coded block refers to a coded block for predicting a current block in a current frame according to a coded block in a reference frame of the current frame. The intra predictive frame includes only the intra predictive coded block. Because the intra predictive frame is usually the first frame or a frame with a relatively large motion change, full resolution encoding or encoding with a relatively small down-sampling proportion is inclined to be selected.

The inter predictive frame may include the intra predictive coded block or the inter predictive coded block. In an embodiment, for the inter predictive frame, the QP threshold corresponding to the current video frame may be determined according to a ratio of an intra coded block to an inter coded block of a preamble video frame. The preamble video frame refers to the previously encoded video frame, and may be one frame or may be multi-frame. Because the current video frame is adjacent to the preamble video frame, they correspond to similar content, that is, an intra-interframe proportion of the current video frame is similar to an intra-interframe proportion of the preamble video frame. If a larger proportion of the intra coded block is used, down-sampling does not generate great impact on video image quality, that is, a higher proportion of the intra coded block indicates that a larger down-sampling proportion is selected accordingly. Therefore, the down-sampling proportion is determined according to the difference between the QP estimation value and the QP threshold, and a larger difference indicates a larger down-sampling proportion. Therefore, a smaller QP threshold may be set accordingly. A higher proportion of the intra coded block indicates that a corresponding QP threshold is smaller, that is, a ratio of the intra coded block to the inter coded block and the QP threshold are negatively correlated.

In an embodiment, the foregoing down-sampling information includes a down-sampling method; and the foregoing S504 in FIG. 5 may be further implemented as: calculating an image content complexity corresponding to the input video frame; obtaining a correspondence between a candidate image content complexity and a candidate down-sampling method; and determining, according to the correspondence, a target down-sampling method corresponding to the image content complexity.

The image content complexity is used for representing a content complexity of a video frame image. Optionally, the image content complexity is related to at least one of a motion amplitude, a texture complexity, detail richness, and a spatial correlation. In an embodiment, an image gradient value may be used for representing the image content complexity. The image gradient value is obtained according to a sum of pixel gradient values corresponding to pixels. A larger image gradient value obtained through calculation indicates a larger image content complexity.

A correspondence between a candidate image content complexity and a candidate down-sampling method is preset. If the image content complexity is higher, in a case that the calculation complexity is allowed, a more complex down-sampling method with high quality is inclined to be used. Different down-sampling methods have different calculation complexities, and a down-sampling method with a higher calculation complexity obtains a better processing effect.

The target down-sampling method corresponding to the image content complexity is obtained according to the preset correspondence between the candidate image content complexity and the candidate down-sampling method. In an embodiment, a first down-sampling method with the highest complexity that can be used in a current hardware environment may be first determined according to the current hardware environment, and subsequently, the corresponding target down-sampling method is determined according to the image content complexity. If the calculation complexity of the target down-sampling method is greater than that of the first down-sampling method, the first down-sampling method is used as the target down-sampling method. If the calculation complexity of the target down-sampling method is not greater than that of the first down-sampling method, the target down-sampling method is directly used as a final down-sampling method.

In an embodiment, the down-sampling information includes a down-sampling method; and the foregoing S504 in FIG. 5 may be further implemented as: obtaining a current coded block of the input video frame; calculating a module gradient value corresponding to the current coded block; classifying the current coded block into a target module class in a module set according to the module gradient value, candidate module classes in the module class set respectively corresponding to different module gradient value ranges; obtaining a correspondence between a candidate module class and a candidate down-sampling method; and determining, according to the correspondence between the candidate module class and the candidate down-sampling method and the target module class, a target down-sampling method corresponding to the current coded block.

The video frame includes a plurality of coded blocks, and encoding the video is actually encoding the coded blocks. The current coded block refers to a current to-be-processed coded block. The module gradient value refers to an average gradient value corresponding to the coded block. Because the sizes of the coded blocks may be inconsistent, the used average gradient value can better reflect the content complexity of the coded block. The module gradient value of the coded block is equal to an average of a sum of the pixel gradient value of each pixel in the coded block. The module gradient value reflects the image complexity corresponding to the coded block. A larger module gradient value indicates that more details are included in the coded block. For example, if the coded block corresponds to an image edge, the gradient value is usually relatively large. In an embodiment, a Laplace filter may be used for calculating the pixel gradient value corresponding to each pixel, and then the module gradient value is obtained through calculation according to the pixel included in the coded block.

A plurality of module classes are obtained through classification in advance according to the module gradient values, and form a module set. The module set includes a plurality of module classes, and each module class corresponds to a corresponding module gradient value range. Different module classes correspond to different module gradient value ranges, and no module gradient value range corresponding to the module class is overlapped, that is, one module gradient value may only match one module class. Therefore, after the module gradient value is obtained, a corresponding target module class may be determined according to the module gradient value.

Different module classes correspond to different sampling methods, and the sampling method is used for sampling the coded block. If the module gradient value range corresponding to the module class includes a larger module gradient value, in a case that a sampling proportion is fixed, the corresponding sampling method obtains higher definition. A sampling method with a better processing effect has a higher calculation complexity, and a corresponding slower processing speed. To ensure a requirement of a user on definition, and meet a requirement on a processing speed, a plurality of sampling methods are combined for use. Because a coded block with a larger module gradient value includes more details, a sampling method with a high complexity and a good effect is used. Because a coded block with a smaller module gradient value includes less details, a sampling method with a low complexity is used. This is because people are more sensitive to definition of content with more details. Therefore, a sampling method with a good effect is preferentially used.

A corresponding sampling method is set for a candidate module class according to the module gradient value range corresponding to the candidate module class, and a larger module gradient value indicates a better processing effect of the corresponding sampling method. After the target module class is obtained, the target sampling method corresponding to the current coded block may be determined according to the correspondence between the candidate module class and the candidate sampling method. Different sampling methods are used for different coded blocks, that is, the coded blocks are processed with reference to a plurality of sampling methods, which not only can improve video encoding quality, but also can improve a video encoding speed.

For example, the coded blocks are classified into three module classes in advance according to the module gradient values. For example, a coded block whose a module gradient value is in a range of (0, 10] is used as a first module class, a coded block whose a module gradient value is in a range of (10, 30] is used as a second module class, and a coded block in a range of (30, +∞) is used as a third module class. A sampling method corresponding to the first module class is a bilinear interpolation algorithm, a sampling method corresponding to the second module class is a bicubic interpolation algorithm, and a sampling method corresponding to the third module class is a CNN algorithm. In the aspect of the processing effect, the CNN algorithm is superior to the bicubic interpolation algorithm, and the bicubic interpolation algorithm is superior to the bilinear interpolation algorithm. In the aspect of the processing speed, the bilinear interpolation algorithm is the fastest, the bicubic interpolation algorithm comes second, and the CNN algorithm is the slowest. The coded blocks are classified according to the module gradient values, and then processed respectively by using different sampling methods, so that the video encoding speed can be improved while ensuring subjective quality.

In an embodiment, the down-sampling information includes a down-sampling proportion; and the encoding the input video frame according to the down-sampling information to obtain encoded data corresponding to the input video frame, that is, the foregoing step 506 in FIG. 5, may be further implemented as: processing the input video frame according to the down-sampling information to obtain a to-be-encoded frame; obtaining a current reference frame corresponding to the to-be-encoded frame; and encoding the to-be-encoded frame according to the current reference frame, to obtain the encoded data corresponding to the input video frame.

The down-sampling information includes a down-sampling proportion, and the input video frame is down-sampled according to the down-sampling proportion to obtain the to-be-encoded frame. An inter coded frame needs to be encoded according to a reference frame during encoding. Therefore, the current reference frame corresponding to the to-be-encoded frame needs to be further obtained, and then the to-be-encoded frame is encoded according to the current reference frame, to obtain the encoded data corresponding to the input video frame.

Optionally, the process of encoding the input video frame according to the current reference frame to obtain the encoded data includes: obtaining down-sampling information corresponding to the to-be-encoded frame, processing the current reference frame according to the down-sampling information, to obtain a target reference frame; and encoding the to-be-encoded frame according to the target reference frame, to obtain the encoded data corresponding to the input video frame.

To better perform reference encoding, the resolution of the reference frame and the resolution of the to-be-encoded frame are processed to be consistent. After a down-sampling proportion corresponding to the to-be-encoded frame is obtained, the current reference frame is sampled according to the down-sampling proportion. In a case that the original resolution and the down-sampling proportion of the input video frame are known, resolution information of the to-be-encoded frame may be obtained obviously. Optionally, if the resolution of the current reference frame is less than the resolution of the to-be-encoded frame, the current reference frame is up-sampled to obtain the target reference frame; or if the resolution of the current reference frame is greater than the resolution of the to-be-encoded frame, the current reference frame is down-sampled to obtain the target reference frame, and then the to-be-encoded frame is encoded according to the target reference frame, to obtain the encoded data corresponding to the input video frame.

In an embodiment, the foregoing S504 in FIG. 5 may be further implemented as: obtaining a correspondence between a candidate environmental factor and candidate down-sampling information; obtaining a current environmental factor, and determining, according to the correspondence between the candidate environmental factor and the candidate down-sampling information, down-sampling information corresponding to the current environmental factor. The down-sampling information may be a down-sampling proportion and/or a down-sampling method. That is, a down-sampling proportion corresponding to the current environmental factor is determined according to a correspondence between a candidate environmental factor and a candidate down-sampling proportion; and/or a down-sampling method corresponding to the current environmental factor is determined according to a correspondence between a candidate environmental factor and a candidate down-sampling method.

Optionally, the foregoing candidate environmental factor includes at least one of a current application environment type, CPU utilization, a quantity of CPU cores, CPU memory, a main frequency, a system type, a terminal type, and the like.

Optionally, the current application environment type is used for distinguishing application environments according to different video real-time requirements. For example, the current application environment type includes a type having a high real-time requirement height and a type not having a high real-time requirement. A video having a high real-time requirement is inclined to select a higher down-sampling proportion, because a higher down-sampling proportion indicates less processing data and a faster processing speed accordingly. The system type refers to a type of an operating system used in a current terminal, for example, an IOS system, or an Android system, or a Windows system. In a case that other conditions are the same, different systems correspond to different processing capabilities. Therefore, the system type may be used as a condition for determining the down-sampling information. The CPU utilization, the quantity of CPU cores, the CPU memory, the main frequency, the terminal type, and the like are all parameters representing hardware processing capabilities. Optionally, if the processing capability is stronger, a lower down-sampling proportion is more inclined to be selected, that is, a processing resolution is higher; and/or, if the processing capability is stronger, a down-sampling method with a higher calculation complexity is more inclined to be selected, which helps improve encoding quality.

Figure 8:
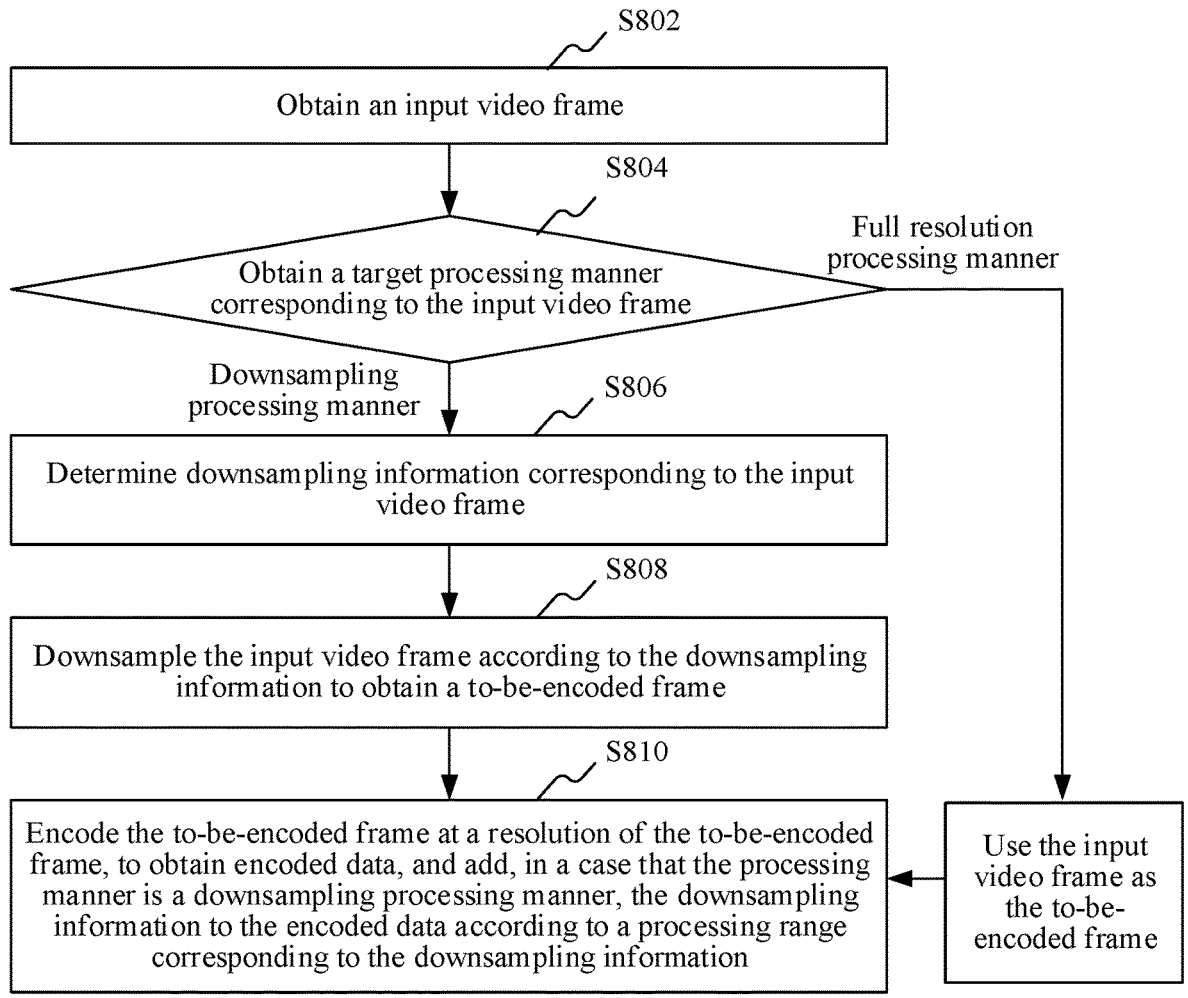
FIG. 8 is a flowchart of a video encoding method according to another embodiment of the present disclosure.

FIG. 8 is a flowchart of a video encoding method according to another exemplary embodiment of the present disclosure. As shown in FIG. 8, an example in which the method is applied to a terminal is used for description, and the method may specifically include the followings.

S802. Obtain an input video frame.

S804. Obtain a target processing manner corresponding to the input video frame, enter S806 in a case that the target processing manner is a down-sampling processing manner, and directly use the input video frame as a to-be-encoded frame and enter S810 in a case that the target processing manner is a full resolution processing manner.

A processing manner corresponding to the input video frame is selected from a candidate processing manner, and the candidate processing manner may be a full resolution processing manner or a down-sampling processing manner. Optionally, the method for obtaining the processing manner corresponding to the input video frame may be set according to an actual requirement.

In an embodiment, the processing parameter corresponding to the input video frame may be obtained according to at least one of current coding information and image feature information corresponding to the input video frame.

The current coding information refers to video compression parameter information of the video during encoding, for example, one or more of a frame predictive type, a motion vector, a QP, a video source, a code rate, a frame rate, and a resolution.

The image feature information refers to information related to image content, and includes one or more of image motion information and image texture information, such as an edge. The current coding information and the image feature information reflect a scenario, a detail complexity, motion intensity, or the like that correspond to a video frame. For example, a motion scenario may be determined by using one or more of a motion vector, a QP, or a code rate.

If the QP is large, generally, the motion is intense. Optionally, whether the motion between images is intense may also be determined according to a ratio of a code rate of an encoded I frame to that of an encoded P frame or a ratio of a code rate of an encoded I frame to that of an encoded B frame. If the ratio exceeds a first preset threshold, it is determined that the images are still images, or if the ratio is less than a second preset threshold, it may be determined that the images are images with high motion intensity.

Optionally, a large motion vector indicates that the image scenario is a large motion scenario. For example, a target object is tracked according to image content, and whether a scenario is a large motion scenario is determined according to a motion speed of the target object.

Optionally, a fixed code rate indicates a fixed amount of information that can be expressed. For a scenario with high motion intensity, an amount of information in a time domain is large, and accordingly, a code rate that can be used for expressing information in a spatial domain is small. Therefore, a relatively good image quality effect can be achieved by using a low resolution, and a down-sampling mode is more inclined to be selected for encoding. An image switching scenario may be determined according to the frame predictive type, and a preferred encoding mode may also be determined according to impact of the frame predictive type on other frames. For example, an I frame is usually the first frame or a frame in which image switching exists, and quality of the I frame affects quality of a subsequent P frame or B frame. Therefore, an intra predictive frame is more inclined to select a full resolution processing manner compared with an inter predictive frame, to ensure image quality. The P frame may be used as a reference frame of the B frame, and image quality of the P frame affects image quality of the subsequent B frame. Therefore, a full resolution processing manner is more inclined to be selected for encoding by using the P frame compared with encoding by using the B frame. A texture complexity of the to-be-encoded video frame is determined according to the image feature information, for example, image texture information. If a texture is complex and includes a large number of details, there is a large amount of image spatial information. If down-sampling is performed, a relatively large amount of detail information may be lost due to the down-sampling, and video quality is affected. Therefore, a to-be-encoded video frame having a complex texture is more inclined to select a full resolution processing manner compared with that having a simple texture.

In an embodiment, the resolution corresponding to the input video frame may be obtained according to a magnitude relationship between the current QP estimation value and the QP threshold that correspond to the input video frame. If the current QP estimation value is greater than the QP threshold, it is determined that the processing manner is a down-sampling processing manner; otherwise it is determined that the processing manner is a full resolution processing manner. The QP threshold may be obtained according to a proportion of the intra coded block in the encoded forward encoded video frame before the input video frame, and a correspondence between the proportion of the intra predictive block and the QP threshold may be preset, so that after the proportion of the intra predictive block of the forward encoded video frame is determined, the QP threshold corresponding to the proportion of the intra predictive block of the forward encoded video frame may be determined according to the correspondence. For the fixed QP encoding, the current QP estimation value may be a corresponding fixed QP value. For the fixed code rate encoding, the current QP estimation value corresponding to the input video frame may be obtained through calculation according to a code rate control model. Alternatively, the QP corresponding to the reference frame may be used as the current QP estimation value corresponding to the input video frame. In one embodiment of the present disclosure, a large current QP estimation value usually indicates higher motion intensity, and the down-sampling processing manner is more inclined to be selected for encoding in a scenario having higher motion intensity.

In an embodiment, a relationship between the proportion of the intra predictive block and the QP threshold is a positive correlation relationship. For example, according to experience, a correspondence between a proportion of the intra predictive block $Intra_0$ and a QP threshold $QP_{TH}$ may be pre-determined as:

$$QP_{TH} = \begin{cases} 33, & Intra_0 < 10\% \\ 31, & 10\% \leq Intra_0 < 50\% \\ 29, & Intra_0 \geq 50\% \end{cases} \quad \text{(Eq. 1)}$$

S806. Determine down-sampling information corresponding to the input video frame.

The down-sampling information includes at least one of a down-sampling proportion and a down-sampling method. Optionally, when the input video frame is processed by using a down-sampling processing manner, down-sampling may be further performed according to different down-sampling methods or down-sampling proportions, so that the manner for adaptively processing the input video frame is more flexible.

S808. Down-sample the input video frame according to the down-sampling information to obtain a to-be-encoded frame.

The to-be-encoded frame is obtained by processing the input video frame according to the processing manner. When the processing manner includes a full resolution processing manner, the input video frame may be used as the to-be-encoded frame. When the processing manner includes a down-sampling processing manner, the input video frame may be down-sampled, to obtain the to-be-encoded frame. For example, when the resolution of the input video frame is 800*800 pixels, the processing manner is that when 2/1 down-sampling is performed on the horizontal and vertical directions, the resolution of the down-sampled to-be-encoded frame is 400*400 pixels.

S810. Encode the to-be-encoded frame at a resolution of the to-be-encoded frame, to obtain encoded data, and add, in a case that the processing manner is a down-sampling processing manner, the down-sampling information to the encoded data according to a processing range corresponding to the down-sampling information.

The encoding may include at least one of prediction, transformation, quantization, and entropy encoding. When the to-be-encoded frame is an I frame, intra prediction is performed on the to-be-encoded frame at the resolution of the to-be-encoded frame. When the to-be-encoded frame is a P frame and a B frame, a current reference frame corresponding to the to-be-encoded frame may be obtained, prediction is performed according to the current reference frame to obtain a predicted residual, and transformation, quantization, and entropy encoding are performed on the predicted residual to obtain the encoded data corresponding to the input video frame. In the process of obtaining the encoded data, at least one of the current reference frame, location information corresponding to each coded block of the to-be-encoded frame, location information corresponding to each reference block of the current reference frame, and a motion vector is processed according to the resolution of the to-be-encoded frame. For example, when the predicted residual is calculated, the current reference frame may be processed according to resolution information of the to-be-encoded frame, to obtain a target reference frame, a target reference block corresponding to each coded block in the to-be-encoded frame is obtained from the target reference frame, prediction is performed according to the target reference block, to obtain a predicted value corresponding to the coded block, and then, the predicted residual is obtained according to a difference between an actual value of the coded block and the predicted value. When a target motion vector is calculated, if the resolution of the current reference frame is different from the resolution of the to-be-encoded frame, location information of a coded block or location information of a decoded block may be transformed according to the resolution information of the current reference frame and the resolution information of the to-be-encoded frame, so that the location information corresponding to the to-be-encoded frame and the location information of the current reference frame are in the same quantization scale, and then the target motion vector is obtained according to the transformed location information, to reduce the value of the target motion vector, and reduce the data amount of the encoded data. Alternatively, if resolution information corresponding to a target motion vector is different from the resolution information of the to-be-encoded frame, when a first motion vector corresponding to a coded block of the to-be-encoded frame is obtained through calculation at the resolution of the to-be-encoded frame, the first motion vector is transformed according to the resolution information of the to-be-encoded frame and target motion vector unit resolution information, to obtain the target motion vector at a target resolution. For example, assuming that the resolution of the to-be-encoded frame is 400*800 pixels, and the resolution of the current reference frame is 800*1600 pixels, 2/1 down-sampling may be performed on the current reference frame according to the resolution of the to-be-encoded frame, to obtain that the resolution of the target reference frame is 400*800 pixels, and then video encoding is performed according to the target reference frame.

The down-sampling information is added to the encoded data, so that subsequently the decoding end performs decoding according to the down-sampling information in the encoded data, so as to adaptively select the down-sampling information to perform encoding, thereby not only improving an encoding speed, but also helping ensure subjective quality.

In one embodiment, when the obtained processing manner is a down-sampling processing manner, down-sampling information needs to be further obtained, and then the input video frame is processed according to the down-sampling information to obtain the to-be-encoded frame. At the resolution of the to-be-encoded frame, the to-be-encoded frame is encoded to obtain the encoded data, and then the down-sampling information is added to the encoded data according to the processing range corresponding to the down-sampling information. The processing manner and the down-sampling information are selected flexibly and adaptively, so as to improve video quality under a limited bandwidth.

In an embodiment, the encoding the to-be-encoded frame at the resolution of the to-be-encoded frame to obtain the encoded data corresponding to the input video frame includes: adding processing manner information corresponding to the processing manner to the encoded data corresponding to the input video frame.

The processing manner information is used for describing a processing manner used for the input video frame, and a flag bit Frame_Resolution_Flag for describing a processing manner may be added to the encoded data, that is, syntactic elements for describing the processing manner information are added to the encoded data. Values of flag bits corresponding to processing manners may be set according to requirements. For example, when the processing manner is a full resolution processing manner, the corresponding Frame_Resolution_Flag may be 0, and when the processing manner is a down-sampling processing manner, the corresponding Frame_Resolution_Flag may be 1. In an embodiment, the processing manner information is added to frame level header information corresponding to the encoded data, for example, may be added to a preset location of the frame level header information. The frame level header information is header information of encoded data corresponding to an input video frame. Sequence level header information is header information of encoded data corresponding to a video sequence, and group level header information is header information of encoded data corresponding to a GOP. One video frame sequence may include a plurality of video groups, and one video group may include a plurality of video frames.

Figure 9:
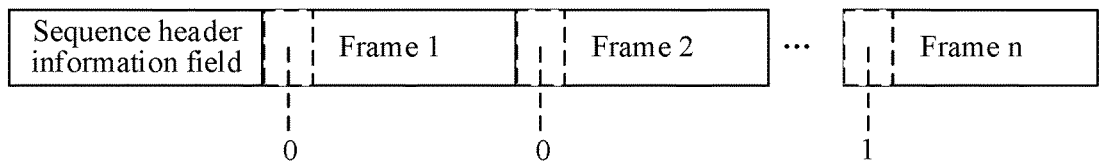
FIG. 9 is a schematic diagram of encoded data according to an embodiment of the present disclosure.

For example, referring to FIG. 9, the boxes indicated by dotted lines in FIG. 9 represent frame level header information of encoded data corresponding to input video frames, and Frame 1, Frame 2, and Frame n respectively represent encoded data corresponding to a first video frame, encoded data corresponding to a second video frame, and encoded data corresponding to an $n^{th}$ video frame. In FIG. 9, the processing manner corresponding to the first input video frame and the second input video frame is a full resolution processing manner, and the processing manner corresponding to the $n^{th}$ input video frame is a down-sampling processing manner.

In an embodiment, down-sampling information for down-sampling the input video frame may be further added to the encoded data corresponding to the input video frame, so that when the decoding end obtains the encoded data, a corresponding method for up-sampling the reconstructed video frame and an up-sampling proportion may be obtained according to the down-sampling information. The down-sampling information includes at least one of down-sampling method information and down-sampling proportion information. An adding location of the down-sampling method information in the encoded data may be any one of corresponding group level header information, sequence level header information, frame level header information, and block level header information, and the adding location of the down-sampling method information in the encoded data may be determined according to an action range corresponding to the down-sampling method. An adding location of the down-sampling proportion information in the encoded data may be any one of corresponding group level header information, sequence level header information, frame level header information, and block level header information. The adding location of the down-sampling proportion information in the encoded data may be determined according to an action range corresponding to the down-sampling proportion. For example, when the action range of the down-sampling proportion is a video sequence, the down-sampling proportion information is added to sequence level header information corresponding to the video sequence, indicating that the down-sampling proportion corresponding to the down-sampling proportion information is used for down-sampling the video frames of the video sequence.

In an embodiment, the obtaining a processing manner corresponding to the input video frame includes: obtaining a processing parameter corresponding to the input video frame, determining, according to the processing parameter, the processing manner corresponding to the input video frame; and the adding processing manner information corresponding to the processing manner to the encoded data corresponding to the input video frame includes: adding the processing manner information corresponding to the processing manner to the encoded data corresponding to the input video frame when the processing parameter cannot be reproduced in the decoding process.

The processing parameter may include at least one of image coding information and image feature information corresponding to the input video frame. That the processing parameter cannot be reproduced in the decoding process means that the processing parameter cannot be obtained or generated in the decoding process. For example, if the processing parameter is information corresponding to image content of the input video frame, and image information in the encoding process has a loss, a decoded video frame of the decoding end and the input video frame are different. Therefore, information corresponding to the image content of the input video frame cannot be obtained in the decoding process, that is, information corresponding to the image content cannot be reproduced in the decoding process. A rate-distortion cost needs to be calculated in the encoding process, and a rate-distortion cost is not calculated in the decoding process, so that when the processing parameter includes a rate-distortion cost, the processing parameter cannot be reproduced in the decoding process. Peak signal to noise ratio (PSNR) information of the reconstructed video frame and the input video frame obtained in the encoding process cannot be obtained in the decoding process. Therefore, the PSNR information cannot be reproduced in the decoding process.

Figure 10:
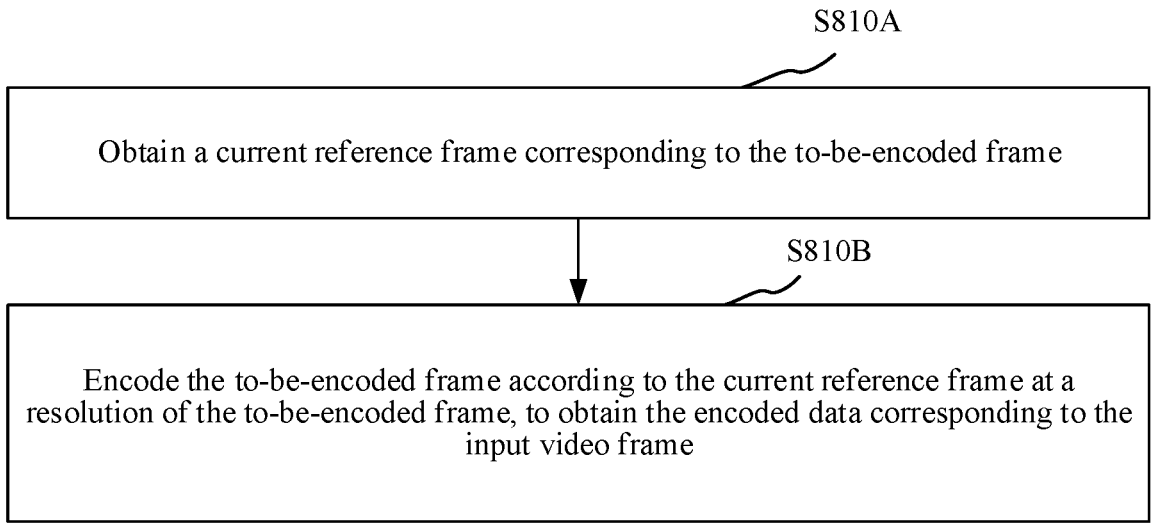
FIG. 10 is a flowchart of encoding a to-be-encoded frame to obtain encoded data according to an embodiment of the present disclosure.

In an embodiment, as shown in FIG. 10, at the resolution of the to-be-encoded frame, the to-be-encoded frame is encoded to obtain the encoded data corresponding to the input video frame, that is, the foregoing S810 may be further implemented as the following S810A and S810B.

S810A. Obtain a current reference frame corresponding to the to-be-encoded frame.

The current reference frame is a video frame that needs to be referenced for encoding the to-be-encoded frame, and the current reference frame is a video frame obtained by reconstructing data, obtained through previous encoding, of the to-be-encoded frame. There may be one or more current reference frames corresponding to the to-be-encoded frame. For example, when the to-be-encoded frame is a P frame, there may be one corresponding reference frame. When the to-be-encoded frame is a B frame, there may be two corresponding reference frames. The reference frame corresponding to the to-be-encoded frame may be obtained according to a reference relationship, and the reference relationship is determined according to each video encoding and decoding standard. For example, assuming that the second video frame in a GOP is a B frame, corresponding reference frames may be an I frame of the video group and the third frame of the video group, or may be the first frame and the fourth frame, which may be specifically user-defined.

In an embodiment, the obtaining a current reference frame corresponding to the to-be-encoded frame includes: obtaining a first reference rule, the first reference rule including a resolution magnitude relationship between the to-be-encoded frame and the current reference frame; and obtaining, according to the first reference rule, the current reference frame corresponding to the to-be-encoded frame.

The first reference rule determines a resolution magnitude restrictive relationship between the to-be-encoded frame and the current reference frame, and the resolution magnitude relationship includes at least one of resolutions of the to-be-encoded frame and the current reference frame being the same and different.

When the first reference rule includes the resolutions of the to-be-encoded video frame and the current reference frame being the same, the first reference rule may further include a processing manner reference rule of the resolutions of the to-be-encoded video frame and the current reference frame. For example, the processing manner reference rule may include one or two of that a reference frame of a full resolution processing manner may be referenced for a to-be-encoded frame of the full resolution processing manner and a reference frame of a down-sampling processing manner may be referenced for the to-be-encoded frame of the down-sampling processing manner.

When the first reference rule includes the resolutions of the to-be-encoded video frame and the reference frame being the different, the first reference rule may further include one or two of that the resolution of the to-be-encoded video frame is greater than the resolution of the reference frame and the resolution of the to-be-encoded video frame is less than the resolution of the reference frame. Therefore, in an embodiment, the first reference rule may specifically include one or more of that the down-sampling resolution reference frame may be referenced for the original resolution to-be-encoded frame, the original resolution reference frame may be referenced for the down-sampling resolution to-be-encoded frame, the original resolution reference frame may referenced for the original resolution to-be-encoded frame, and the down-sampling resolution reference frame may be referenced for the down-sampling resolution to-be-encoded frame. The original resolution to-be-encoded frame means that the resolution of the to-be-encoded frame is the same as the resolution of the corresponding input video frame, and the original resolution reference frame means that the resolution of the reference frame is the same as the resolution of the corresponding input video frame. The down-sampling resolution to-be-encoded frame means that the to-be-encoded frame is obtained by down-sampling the corresponding input video frame. The down-sampling resolution reference frame means that the reference frame is obtained by down-sampling the corresponding input video frame. After the first reference rule is obtained, the current reference frame corresponding to the to-be-encoded frame is obtained according to the first reference rule, so that the obtained current reference frame meets the first reference rule.

In an embodiment, S810, that is, the encoding the to-be-encoded frame at the resolution of the to-be-encoded frame to obtain encoded data corresponding to the input video frame includes: adding rule information corresponding to the first reference rule to the encoded data corresponding to the input video frame.

The rule information is used for describing the used reference rule, and a flag bit Resolution_Referencer_Rules for describing the reference rule may be added to the encoded data. A reference rule represented by a specific value of the flag bit may be set according to a requirement. An adding location of the rule information in the encoded data may be one or more of group level header information, sequence level header information, frame level header information, and block level header information, and the adding location of the rule information in the encoded data may be determined according to an action range of the first reference rule. For example, when the first reference rule is that the down-sampling resolution reference frame may be referenced for the original resolution to-be-encoded frame, the corresponding Resolution_Referencer_Rules may be 1, and when the first reference rule is that the down-sampling resolution reference frame may be referenced for the down-sampling resolution to-be-encoded frame, the corresponding Resolution_Referencer_Rules may be 2. If the video sequence uses the same first reference rule, the adding location of the rule information in the encoded data may be the sequence level header information. If the first reference rule is a reference rule used by one of the video groups, the adding location of the rule information in the encoded data is the group level header information corresponding to the video group using the first reference rule.

S810B. Encode the to-be-encoded frame according to the current reference frame at a resolution of the to-be-encoded frame, to obtain the encoded data corresponding to the input video frame.

The current reference frame corresponding to the to-be-encoded frame may be obtained, prediction is performed according to the current reference frame to obtain a predicted residual, and transformation, quantization, and entropy encoding are performed on the predicted residual to obtain the encoded data corresponding to the input video frame. After the current reference frame is obtained, a reference block corresponding to a coded block of the to-be-encoded frame may be obtained from the current reference frame, and the coded block is encoded according to the reference block. Alternatively, the current reference frame may be processed according to the resolution of the to-be-encoded frame, to obtain a corresponding target reference frame, a target reference block corresponding to a coded block of the to-be-encoded frame is obtained from the target reference frame, and the coded block is encoded according to the target reference block, to obtain the encoded data corresponding to the input video frame.

In an embodiment, the encoding the to-be-encoded frame at a resolution of the to-be-encoded frame to obtain the encoded data corresponding to the input video frame includes: obtaining, at the resolution of the to-be-encoded frame, a corresponding encoding manner when the to-be-encoded frame is encoded; and adding encoding manner information corresponding to the encoding manner to the encoded data corresponding to the input video frame.

The encoding manner is a processing manner related to encoding. For example, the encoding manner may include one or more of an up-sampling manner used, during encoding, by a video frame obtained after the reference frame is decoded and reconstructed, a rule corresponding to the reference rule, a sampling manner for sampling the reference frame, and a resolution corresponding to the motion vector. The encoding manner information corresponding to the encoding manner is added to the encoded data corresponding to the input video frame, and the encoded data corresponding to the to-be-decoded video frame may be decoded according to the encoding manner information during decoding.

In an embodiment, the encoding manner information corresponding to the encoding manner may not be added to the encoded data. Instead, an encoding manner is preset in an encoding and decoding standard, and a decoding manner corresponding to the encoding manner is set at the decoding end. Alternatively, the encoding end and the decoding end may obtain a matched encoding manner and decoding manner through calculation according to the same algorithm or corresponding algorithms. For example, that the method for up-sampling the current reference frame during encoding is the same as the method for up-sampling the current reference frame during decoding is preset in the encoding and decoding standard.

Figure 11:
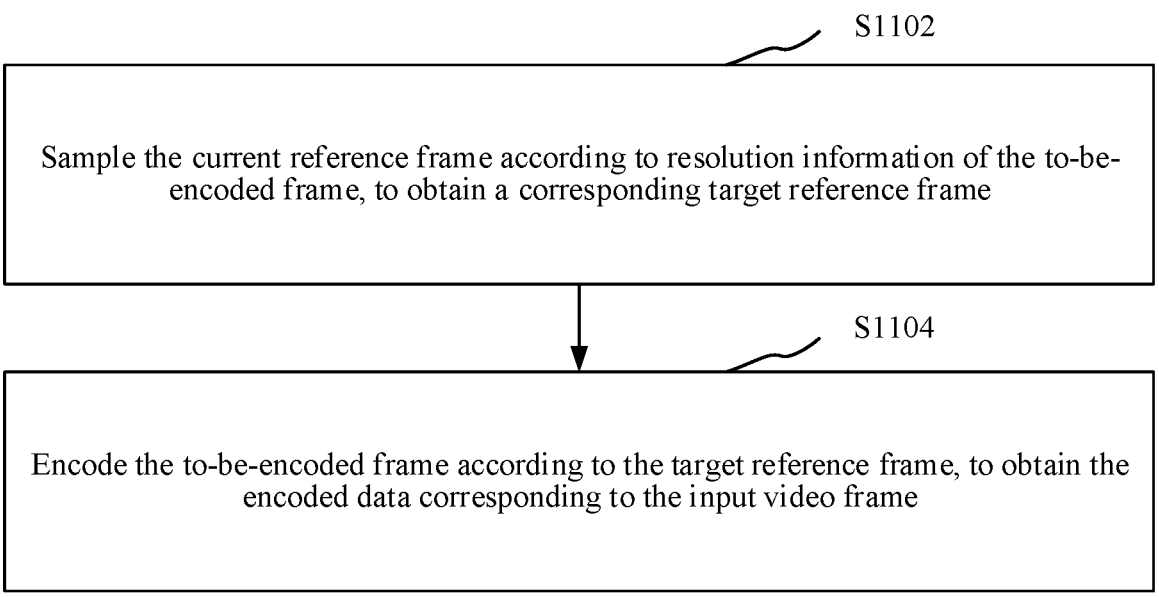
FIG. 11 is a flowchart of encoding a current reference frame to obtain encoded data according to an embodiment of the present disclosure.

In an embodiment, as shown in FIG. 11, the foregoing S810B may be further implemented as the following S1102 and S1104.

S1102. Sample the current reference frame according to resolution information of the to-be-encoded frame, to obtain a corresponding target reference frame.

The target reference frame is a video frame obtained after the current reference frame is sampled. The sampling is a process of sampling the current reference frame according to the resolution information of the to-be-encoded frame, to obtain matched resolution information of the target reference frame. During sampling, a sampling manner may be first determined, and the sampling manner includes one of a direct sub-pixel interpolation manner and a sub-pixel interpolation manner after sampling. The direct sub-pixel interpolation manner is directly performing sub-pixel interpolation processing on the current reference frame, and the sub-pixel interpolation manner after sampling is performing sub-pixel interpolation processing on the current reference frame after the current reference frame is sampled.

Figures 12, 13, 14:
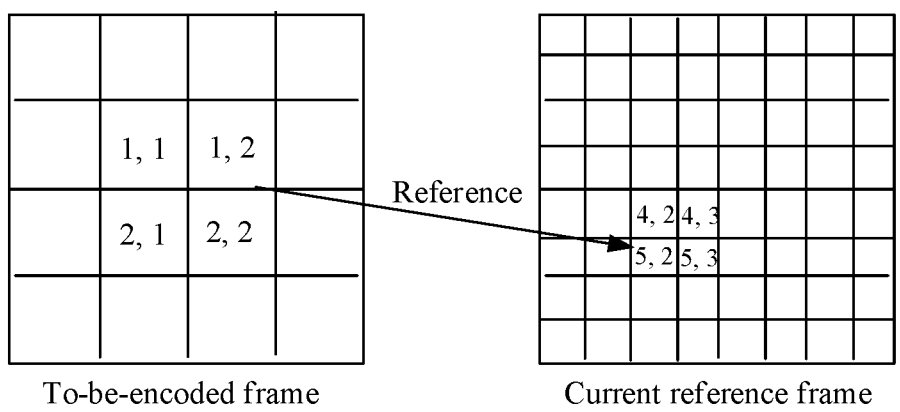
FIG. 12 is a schematic diagram of interpolating a current reference frame according to an embodiment of the present disclosure.
FIG. 13 is a schematic diagram of interpolating a current reference frame according to an embodiment of the present disclosure.
FIG. 14 is a schematic diagram of a current reference frame and a to-be-encoded frame according to an embodiment of the present disclosure.

Optionally, the sub-pixel interpolation is a process of interpolating reference data of integer pixels in the current reference frame to obtain reference data of sub-pixel levels. For example, FIG. 12 and FIG. 13 are schematic diagrams of interpolating the current reference frame according to an embodiment. Referring to FIG. 12, pixels such as A1, A2, A3, B1, B2, and B3 are 2*2 integer pixels in the current reference frame, reference data of sub-pixels is obtained through calculation according to reference data of the integer pixels. For example, reference data of a sub-pixel a23 may be obtained through calculation according to an average value of reference data of the three integer pixels A1, A2, and A3, reference data of a sub-pixel a21 may be obtained through calculation according to an average value of reference data of the three integer pixels A2, B2, and C2, and reference data of a sub-pixel a22 may be obtained through calculation according to the reference data of the sub-pixels a23 and a21, to implement ½ pixel precision interpolation on the current reference frame.

Referring to FIG. 13, pixels such as A1, A2, A3, B1 B2, and B3 are 4*4 integer pixels in the current reference frame, and reference data of 15 sub-pixels is obtained through calculation according to reference data of the integer pixels, to implement ¼ pixel precision interpolation on the current reference frame. For example, reference data of a sub-pixel a8 is obtained through calculation according to reference data of integer pixels A2 and B2, and reference data of a sub-pixel a2 is obtained through calculation according to reference data of the integer pixels A2 and A3. Likewise, the reference data of the 15 sub-pixels a1 to a15 is obtained through calculation, to implement ¼ pixel precision interpolation on the integer pixel A2. In the process of encoding the to-be-encoded frame, a motion search technology needs to be used in the current reference frame to find a reference block corresponding the coded block in the to-be-encoded frame. A motion vector is obtained through calculation according to motion information of the coded block relative to the reference block, and the motion vector is encoded to inform the decoding end of the location of the reference data corresponding to the reference block in the current reference frame. Therefore, sub-pixel interpolation processing is performed on the current reference frame to obtain the target reference frame, and motion estimation may be performed on the to-be-encoded frame according to a target reference frame with a higher resolution, thereby improving motion estimation accuracy, and improving encoding quality.

In an embodiment, the encoding end and the decoding end may set, in respective encoding and decoding rules, sampling manners used when the current reference frame is processed to obtain the target reference frame, and the used sampling manners need to be consistent. During encoding and decoding, the corresponding sampling manners for processing the current reference frame are determined according to configurations.

In an embodiment, the encoding the to-be-encoded frame at a resolution of the to-be-encoded frame to obtain the encoded data corresponding to the input video frame includes: adding sampling manner information corresponding to sampling on the current reference frame to the encoded data corresponding to the input video frame. An adding location of the sampling manner information corresponding to sampling on the current reference frame in the encoded data may be any one of corresponding sequence level header information, group level header information, frame level header information, and block level header information, and the adding location of the sampling manner information in the encoded data may be determined according to an action range corresponding to the sampling manner. The sampling manner information may be added to the frame level header information of the encoded data corresponding to the input video frame, indicating that when the input video frame is encoded, sub-pixel interpolation processing is performed on the corresponding current reference frame by using the sampling manner corresponding to the sampling manner information.

For example, when the frame level header information of the encoded data is used for determining that a flag bit Pixel_Sourse_Interpolation of the sampling manner is 0, it indicates that sub-pixel interpolation processing is directly performed on the current reference frame corresponding to the input video frame, and when the Pixel_Sourse_Interpolation is 1, it indicates that sub-pixel interpolation processing is performed on the current reference frame corresponding to the input video frame after the current reference frame is sampled. The decoding end may perform sub-pixel interpolation processing on the current reference frame according to a sub-pixel interpolation manner represented by the flag bit in the encoded data, to obtain the target reference frame, so that the encoded data may be decoded according to the target reference frame to obtain a reconstructed video frame.

In an embodiment, a sampling proportion for the current reference frame may be determined according to a proportion relationship between the resolution of the to-be-encoded frame and the resolution of the current reference frame. For example, if the resolution of the input video frame is 2M*2N, the current input video frame is processed according to a full resolution processing manner, that is, the current input video frame is directly used as the to-be-encoded frame, and the resolution of the to-be-encoded frame is 2M*2N. The input video frame that may be used as the reference frame is processed according to a down-sampling processing manner, to obtain that the resolution of the reference frame after down-sampling is M*2N, and the resolution of the corresponding current reference frame obtained through reconstruction is also M*2N. Therefore, it is determined to up-sample the current reference frame by using a sampling proportion of the width being ½ and the height being 1, to obtain the frame whose resolution is the same as the resolution of the to-be-encoded frame.

If the current input video frame is processed according to the down-sampling processing manner, the resolution of the to-be-encoded frame obtained after down-sampling is M*N, and the input video frame that may be used as the reference frame is processed according to the full resolution processing manner. Therefore, the resolution of the current reference frame obtained through reconstruction is 2M*2N. Therefore, it is determined to down-sample the current reference frame by using a sampling proportion of both the width and the height being 2/1, to obtain the frame whose resolution is the same as the resolution of the to-be-encoded frame.

In an embodiment, because the resolution of the input video frame is usually the same, down-sampling may be performed according to the input video frame to obtain the down-sampling proportion corresponding to the to-be-encoded frame, and the input video frame that may be used as the reference frame is down-sampled to obtain a down-sampling proportion corresponding to a to-be-encoded reference frame, to determine the sampling proportion for the current reference frame. For example, if the input video frame is down-sampled by using a 2/1 sampling proportion to obtain the to-be-encoded frame, and the input video frame that may be used as the reference frame is down-sampled by using a 4/1 sampling proportion to obtain the to-be-encoded reference frame, the down-sampling proportion corresponding to the current reference frame obtained through reconstruction according to encoded data of the to-be-encoded reference frame is also 4/1. Therefore, according to a multiple relationship between down-sampling proportions thereof, it may be determined to up-sample the current reference frame by using the ½ sampling proportion to obtain the frame whose resolution is the same as the resolution of the to-be-encoded frame.

In an embodiment, the sampling method for sampling the current reference frame matches a sampling algorithm by which the input video frame is down-sampled to obtain the to-be-encoded frame, that is, if the current reference frame needs to be down-sampled, a down-sampling algorithm is the same as a down-sampling algorithm by which the to-be-encoded video frame is down-sampled to obtain the to-be-encoded frame. If the current reference frame needs to be up-sampled, an up-sampling algorithm is an opposite sampling algorithm matching the down-sampling algorithm by which the input video frame is down-sampled to obtain the current frame.

In one embodiment, the sampling algorithm for sampling the current reference frame matches the sampling algorithm by which the to-be-encoded video frame is down-sampled to obtain a current encoded video frame, to further improve a degree of image matching between the current reference frame and the current encoded video frame, thereby further improving inter prediction accuracy, reducing predicted residuals, and improving quality of the encoded image.

S1104. Encode the to-be-encoded frame according to the target reference frame, to obtain the encoded data corresponding to the input video frame.

After the target reference frame is obtained, the target reference frame is searched to obtain an image block similar to the coded block as the reference block, and a pixel difference between the coded block and the reference block is calculated to obtain a predicted residual. A first motion vector is obtained according to a displacement between the coded block and the corresponding target reference block. The encoded data is obtained according to the first motion vector and the predicted residual.

In an embodiment, the first motion vector may be transformed according to the target motion vector unit resolution information, to obtain a target motion vector at a target resolution, and the encoded data is generated according to the target motion vector and the predicted residual.

In an embodiment, the foregoing S1102, that is, the sampling the current reference frame according to resolution information of the to-be-encoded frame, to obtain a corresponding target reference frame may be further implemented as: sampling the current reference frame according to the resolution information of the to-be-encoded frame and motion estimation pixel precision, to obtain the corresponding target reference frame.

The motion estimation pixel precision is a unit length of the motion vector corresponding to the coded block in the to-be-encoded frame. When the encoding end encodes the coded block in the to-be-encoded frame, the unit length of the motion vector corresponding to the coded block may be refined according to the obtained motion estimation pixel precision, and the obtained motion vector is more refined and accurate. Therefore, the current reference frame needs to be sampled according to the obtained motion estimation pixel precision to obtain the target reference frame, then a first motion vector corresponding to each coded block in the to-be-encoded frame is calculated according to the target reference frame, and encoding is performed based on the first motion vector to obtain the encoded data corresponding to the to-be-encoded frame.

The resolution information of the current reference frame may be obtained, and the sampling method performed on the current reference frame, the sampling proportion corresponding to the sampling and the pixel interpolation precision are determined according to the sub-pixel interpolation manner used by the to-be-encoded frame, the resolution information of the to-be-encoded frame, the resolution information of the current reference frame, and the motion estimation pixel precision corresponding to the to-be-encoded frame. The magnitude of the motion estimation pixel precision may be set according to a requirement, for example, ½ pixel precision, ¼ pixel precision, or ⅛ pixel precision.

In an embodiment, the corresponding motion estimation pixel precision may be configured for the to-be-encoded frame according to the image feature information of the to-be-encoded frame. The image feature information is, for example, the size of the to-be-encoded frame, texture information, and a motion speed, and the motion estimation pixel precision corresponding to the to-be-encoded frame may be determined with reference to various image feature information. If the image data carried in the to-be-encoded frame is more complex, the image information is richer, and the corresponding motion estimation pixel precision is higher. For example, when inter prediction is performed on the P frame, higher motion estimation pixel precision may be used for calculating the motion vector corresponding to each coded block in the P frame, and when inter prediction is performed on the B frame, lower motion estimation pixel precision may be used for calculating the motion vector corresponding to each coded block in the B frame.

In an embodiment, the sampling the current reference frame according to the resolution information of the to-be-encoded frame and motion estimation pixel precision, to obtain the corresponding target reference frame includes: obtaining pixel interpolation precision through calculation according to the resolution information of the to-be-encoded frame and the motion estimation pixel precision; and performing sub-pixel interpolation processing directly on the current reference frame according to the pixel interpolation precision, to obtain the corresponding target reference frame.

The pixel interpolation precision is pixel precision corresponding to sub-pixel interpolation performed on the current reference frame. When the sub-pixel interpolation manner is the direct sub-pixel interpolation manner, it indicates that sub-pixel interpolation processing may be directly performed on the current reference frame to obtain the target reference frame. Therefore, the pixel interpolation precision may be obtained through calculation according to the resolution information of the to-be-encoded frame and the motion estimation pixel precision. The proportion of the resolution information of the current reference frame to the resolution information of the to-be-encoded frame may be calculated, and the pixel interpolation precision is obtained according to the proportion and the motion estimation pixel precision.

In an embodiment, when the resolution of the current reference frame is greater than the resolution of the to-be-encoded frame, data of some sub-pixels in the current reference frame may be directly multiplexed, and may be used as data corresponding to sub-pixels corresponding to the motion estimation pixel precision. For example, the resolution of the to-be-encoded frame is M*N, and the resolution of the current reference frame is 2M*2N. If the motion estimation pixel precision is ½, and the pixel interpolation precision is 1, the current reference frame may be directly used as the target reference frame. If the motion estimation pixel precision is ¼, the pixel interpolation precision obtained through calculation is ½, and sub-pixel interpolation processing of ½ pixel interpolation precision may be performed on the current reference frame to obtain the target reference frame.

In an embodiment, when the resolution represented by the resolution information of the to-be-encoded frame is the same as the resolution of the current reference frame, sub-pixel interpolation processing is directly performed on the current reference frame according to the motion estimation pixel precision, to obtain the corresponding target reference frame.

When the input video frame is processed by using the full resolution processing manner to obtain the to-be-encoded frame, and the resolution of the current reference frame may also be the original resolution, the resolution of the to-be-encoded frame is the same as the resolution of the current reference frame. Alternatively, when the input video frame is processed by using the down-sampling processing manner to obtain the to-be-encoded frame, and the current reference frame is also obtained by reconstructing the encoded data obtained through encoding by using the down-sampling processing manner with the same sampling proportion, the resolution of the to-be-encoded frame is the same as the resolution of the current reference frame. Therefore, sub-pixel interpolation processing may be directly performed on the current reference frame based on the motion estimation pixel precision to obtain the target reference frame, and pixel interpolation precision and motion estimation pixel precision corresponding to the sub-pixel interpolation processing are the same.

In an embodiment, the sampling the current reference frame according to the resolution information of the to-be-encoded frame and motion estimation pixel precision, to obtain the corresponding target reference frame includes: sampling the current reference frame according to the resolution information of the to-be-encoded frame, to obtain an intermediate reference frame; and performing sub-pixel interpolation processing on the intermediate reference frame according to the motion estimation pixel precision, to obtain the target reference frame.

When the sub-pixel interpolation manner corresponding to the to-be-encoded frame is the sub-pixel interpolation manner after sampling, it indicates that the current reference frame is sampled first, to obtain an intermediate reference frame whose resolution is the same as the resolution of the to-be-encoded frame, and then sub-pixel interpolation processing is performed on the intermediate reference frame to obtain the corresponding target reference frame.

Optionally, when the resolution represented by the resolution information of the to-be-encoded frame is less than the resolution of the current reference frame, the current reference frame is down-sampled according to the resolution information of the to-be-encoded frame, to obtain an intermediate reference frame, and then sub-pixel interpolation processing is performed on the intermediate reference frame based on the motion estimation pixel precision corresponding to the to-be-encoded frame to obtain the target reference frame. For example, if the input video frame whose the resolution is 2M*2N is down-sampled by using the down-sampling processing manner, to obtain a to-be-encoded frame whose resolution is M*N, and the resolution of the current reference frame is 2M*2N (a full resolution processing manner), the current reference frame is down-sampled according to a 2/1 sampling proportion to obtain an intermediate reference frame whose resolution is M*N. If the motion estimation pixel precision corresponding to the obtained to-be-encoded frame is ½, and then sub-pixel interpolation processing is performed on the intermediate reference frame according to the pixel interpolation precision the same as the motion estimation pixel precision, that is, ½ sub-pixel interpolation precision, to obtain the target reference frame. If the motion estimation pixel precision corresponding to the obtained to-be-encoded frame is ¼, sub-pixel interpolation processing is performed on the intermediate reference frame according to ¼ sub-pixel interpolation precision, to obtain the target reference frame.

When the resolution represented by the resolution information of the to-be-encoded frame is greater than the resolution of the current reference frame, the current reference frame is up-sampled according to the resolution information of the to-be-encoded frame, to obtain an intermediate reference frame, and then sub-pixel interpolation processing is performed on the intermediate reference frame based on the motion estimation pixel precision corresponding to the to-be-encoded frame to obtain the target reference frame. For example, if the resolution of the to-be-encoded frame is 2M*2N, and the resolution of the current reference frame is ½M*½N, the current reference frame needs to be up-sampled according to a sampling proportion ¼ to obtain an intermediate reference frame whose resolution is the same the resolution of the to-be-encoded frame. If the motion estimation pixel precision is ½, sub-pixel interpolation processing continues to be performed on the obtained intermediate reference frame according to the ½ pixel interpolation precision, to obtain the target reference frame. If the motion estimation pixel precision is ¼, sub-pixel interpolation processing continues to be performed on the obtained intermediate reference frame according to the ¼ pixel interpolation precision, to obtain the target reference frame.

In an embodiment, the foregoing S810B, that is, the encoding the to-be-encoded frame according to the current reference frame at a resolution of the to-be-encoded frame, to obtain the encoded data corresponding to the input video frame may be further implemented as: determining a first vector transformation parameter according to the resolution information of the to-be-encoded frame and first resolution information, the first resolution information including the resolution information of the current reference frame or the target motion vector unit resolution information corresponding to the input video frame, and obtaining, according to the first vector transformation parameter, a target motion vector corresponding to each coded block in the to-be-encoded frame.

The first vector transformation parameter is used for transforming obtained location information of a motion vector or an obtained motion vector. The resolution information is information related to a resolution, for example, may be the resolution itself or a down-sampling proportion. The first vector transformation parameter may be a proportion between the resolution information of the to-be-encoded frame and the first resolution information. For example, assuming that the down-sampling proportion of the current reference frame is 3/1, and the down-sampling proportion of the to-be-encoded frame is 6/1, the first vector transformation parameter may be 6 divided by 3 and equal to 2.

In an embodiment, after the first vector transformation parameter is obtained, the obtained motion vector or location information corresponding to the motion vector is transformed according to the first vector transformation parameter, to obtain the target motion vector. When the first vector transformation parameter is used for transforming the target motion vector, the target motion vector is a motion vector at a target resolution represented by the target motion vector unit resolution information, and the target motion vector unit resolution information is information corresponding to a target resolution corresponding to a unit of the target motion vector, for example, may be the target resolution itself or the down-sampling proportion. When the first vector transformation parameter is used for transforming the location information corresponding to the motion vector, the location information corresponding to the to-be-encoded frame and the location information of the current reference frame are in the same quantization scale, and a second motion vector is obtained according to the transformed location information, to transform the second motion vector to the target motion vector at the target resolution.

In an embodiment, the determining a first vector transformation parameter according to the resolution information of the to-be-encoded frame and first resolution information includes: determining the first vector transformation parameter according to the resolution information of the to-be-encoded frame and the resolution information of the current reference frame. The obtaining, according to the first vector transformation parameter, a motion vector corresponding to each coded block in the to-be-encoded frame includes: obtaining first location information corresponding to a current coded block, obtaining second location information corresponding to a target reference block corresponding to the current coded block; and obtaining, through calculation according to the first vector transformation parameter, the first location information, and the second location information, the target motion vector corresponding to the current coded block.

The current coded block is a coded block that is in the input video frame and on which prediction encoding needs to be performed currently. The target reference block is an image block that is in the reference frame and that is used for performing prediction encoding on the current coded block. The first location information corresponding to the current coded block may be represented by using coordinates of pixels. The first location information corresponding to the current coded block may include coordinates corresponding to all pixels of the current coded block, or the first location information corresponding to the current coded block may include coordinates of one or more pixels of the current coded block. The second location information corresponding to the target reference block may include coordinates corresponding to all pixels of the target reference block, or the second location information corresponding to the target reference block may include coordinates of one or more pixels of the target reference block. For example, coordinates of a first pixel of a current image block may be used as a coordinate value of the current coded block, and coordinates of a first pixel of the target reference block may be used as a coordinate value of the target reference block.

In an embodiment, the first vector transformation parameter may be used for transforming the first location information, to obtain corresponding first transformation location information, and the target motion vector is obtained according to a difference between the first transformation location information and the second location information. Alternatively, the first vector transformation parameter may be used for transforming the second location information, to obtain corresponding second transformation location information, and the target motion vector is obtained according to a difference between the first location information and the second transformation location information.

In an embodiment, the first vector transformation parameter is a proportion obtained by dividing high resolution information by low resolution information in the resolution of the to-be-encoded frame and the resolution information of the current reference frame. The resolution corresponding to the high resolution information is greater than the resolution corresponding to the low resolution information. The first vector transformation parameter is used for transforming location information of frames in the low resolution information of the to-be-encoded frame and the current reference frame. For example, if the resolution of the to-be-encoded frame is 1200*1200 pixels, and the resolution of the current reference frame is 600*600 pixels, the high resolution is 1200*1200 pixels, and the low resolution is 600*600 pixels. The first vector transformation parameter may be 2. Assuming that the first location information is (6, 8) and the second location information is (3, 3), the target motion vector is (6, 8)−(3*2, 3*2)=(0, 2). In one embodiment of the present disclosure, the location information corresponding to the frames of the low resolution information may be transformed to reduce the value of the target motion vector, and reduce the data amount of the encoded data.

In an embodiment, the first vector transformation parameter is a proportion obtained by dividing low resolution information by high resolution information in the resolution of the to-be-encoded frame and the resolution information of the current reference frame. The first vector transformation parameter is used for transforming location information of frames of the high resolution information in the to-be-encoded frame and the current reference frame. For example, if the resolution of the to-be-encoded frame is 1200*1200 pixels, and the resolution of the current reference frame is 600*600 pixels, the first vector transformation parameter may be ½. Assuming that the first location information is (6, 8) and the second location information is (3, 3), the target motion vector is (6*½, 8*½)−(3, 3)=(0, 1).

In one embodiment of the present disclosure, the location information may be transformed according to the first vector transformation parameter, so that the obtained location information is in the same quantization scale, to reduce the value of the target motion vector, and reduce the data amount of the encoded data. For example, as shown in FIG. 14, the resolution of the current reference frame is double of the resolution of the to-be-encoded frame, the current coded block is formed by pixels (1, 1), (1, 2), (2, 1), and (2, 2), and a corresponding target reference block is formed by pixels (4, 2), (4, 3), (5, 2), and (5, 3). If no transformation is performed, the target motion vector is (−3, −1), and if when the target motion vector is calculated, the location information corresponding to the to-be-encoded frame is multiplied by 2, and then the target motion vector is calculated, the target motion vector is (−2, 0), which is less than (−3, −1).

In an embodiment, the determining a first vector transformation parameter according to the resolution information of the to-be-encoded frame and first resolution information includes: obtaining target motion vector unit resolution information; and determining the first vector transformation parameter according to the resolution information of the to-be-encoded frame and the target motion vector unit resolution information. The obtaining, according to the first vector transformation parameter, a target motion vector corresponding to each coded block in the to-be-encoded frame includes: obtaining a first motion vector according to a displacement between the current coded block and the corresponding target reference block; and obtaining, according to the first vector transformation parameter and the first motion vector, the target motion vector corresponding to the current coded block.

The target motion vector unit resolution information refers to information corresponding to a target resolution corresponding to a unit of the target motion vector, for example, may be a target resolution or a corresponding down-sampling proportion. The target motion vector is calculated by using a vector unit at the resolution as a standard. To-be-encoded frames corresponding to an input video sequence may have some resolutions the same as the original resolution of the input video frame, and some other resolutions of the to-be-encoded frames smaller than the original resolution of the input video frame, that is, the to-be-encoded frames in the video sequence have a plurality of resolutions. Therefore, the resolution corresponding to the unit of the target motion vector needs to be determined. The resolution corresponding to the unit of the target motion vector may be set before encoding or obtained according to parameters of the encoding process, which may be specifically set according to a requirement.

The first motion vector is obtained according to the displacement between the current coded block and the corresponding target reference block, and the target reference block may be obtained from the current reference frame, or may be obtained from the target reference frame obtained after the current reference frame is processed. After the first motion vector is obtained, the first vector transformation parameter may be multiplied by the first motion vector, and the obtained product is used as the target motion vector. For example, assuming that the resolution corresponding to the unit of the target motion vector is the original resolution, and the down-sampling proportion corresponding to the to-be-encoded frame is 2/1. The resolution corresponding to unit of the target motion vector is the original resolution, and the first motion vector is obtained through calculation at the resolution of the to-be-encoded frame. Therefore, the first motion vector needs to be transformed, and the first vector transformation parameter is equal to 2. When the obtained first motion vector is (2, 2), the target motion vector is (4, 4). After the target motion vector is obtained, encoding may be performed according to the target motion vector. For example, the target motion vector and the predicted residual corresponding to the current coded block may be encoded, to obtain the encoded data.

In an embodiment, when the target reference block is obtained from the current reference frame, it may be understood that, for the same coded block, the first motion vector may be equal to the second motion vector.

In an embodiment, the resolution corresponding to the unit of the target motion vector may be the resolution corresponding to the input video frame, that is, the original resolution, or the resolution corresponding to the unit of the target motion vector may be the resolution corresponding to the to-be-encoded frame. The first vector transformation parameter may be a proportion of the resolution information corresponding to the unit of the target motion vector to the resolution information of the to-be-encoded frame. For example, assuming that the resolution corresponding to the unit of the target motion vector is the original resolution, the sampling proportion corresponding to the unit of the target motion vector is 1, and the sampling proportion of the resolution of the to-be-encoded frame is 2/1, the first vector transformation parameter may be 2 divided by 1 and equal to 2.

Alternatively, assuming that the resolution corresponding to the unit of the target motion vector is the original resolution, which is 900*900 pixels, and the sampling proportion of the resolution of the to-be-encoded frame is 450*600 pixels, two first vector transformation parameters: a first vector transformation parameter of a horizontal direction and a first vector transformation parameter of a vertical direction, may be included. The first vector transformation parameter of the horizontal direction is 900/450=2, and the first vector transformation parameter of the vertical direction is 900/600=1.5.

In an embodiment, the target motion vector unit resolution information may be obtained according to a calculation capability of an encoding device. For example, when the encoding device can only perform calculation on integers or have time-consuming calculation when the values are decimals, the resolution corresponding to the unit of the target motion vector may be the original resolution corresponding to the input video frame. When the encoding device can perform calculation on decimals quickly, the resolution corresponding to the unit of the target motion vector may be the resolution corresponding to the to-be-encoded frame.

In an embodiment, when the resolution information of the to-be-encoded frame is consistent with the target motion vector unit resolution information, the first vector transformation parameter is 1, and the first motion vector is the same as the target motion vector. Therefore, the foregoing S802 may be skipped, and the first motion vector is used as the target motion vector. When the resolution information of the to-be-encoded frame is inconsistent with the target motion vector unit resolution information, S802 is performed.

In one embodiment of the present disclosure, when the resolution corresponding to the unit of the target motion vector is the resolution corresponding to the input video frame, that is, the original resolution, for video sequences with unified resolutions, target resolutions corresponding to the input video frames are consistent, and the uniformity of the target motion vector may be maintained. When the resolution corresponding to the unit of the target motion vector is the resolution corresponding to the to-be-encoded video frame, because the resolution information of the to-be-encoded frame is consistent with the target motion vector unit resolution information, the first motion vector does not need to be transformed, and the calculation time can be reduced.

In an embodiment, identification information representing the target motion vector unit resolution information may be added to the encoded data, so that the decoding end may obtain the target resolution corresponding to the target motion vector. If no identification information is carried, the encoding end and the decoding end may agree on the target resolution corresponding to the target motion vector. The identification information is used for representing resolution information corresponding to the target motion vector. An adding location of the identification information in the encoded data may be one or more of group level header information, sequence level header information, frame level header information, and block level header information. The block level header information refers to header information of encoded data corresponding to a coded block. The adding location of the identification information in the encoded data may be determined according to an action range of the target motion vector unit resolution information. For example, if resolutions corresponding to the vector units in the video sequence are consistent, the adding location may be the sequence level header information. Resolution information represented by a specific value of the flag bit may be set according to a requirement. For example, when the resolution corresponding to the target motion vector unit resolution information is the original resolution, the corresponding flag bit MV_Scale_Adaptive is 0. When the resolution corresponding to the target motion vector unit resolution information is the resolution corresponding to the to-be-encoded frame, the corresponding flag bit MV_Scale_Adaptive is 1.

Figure 15:
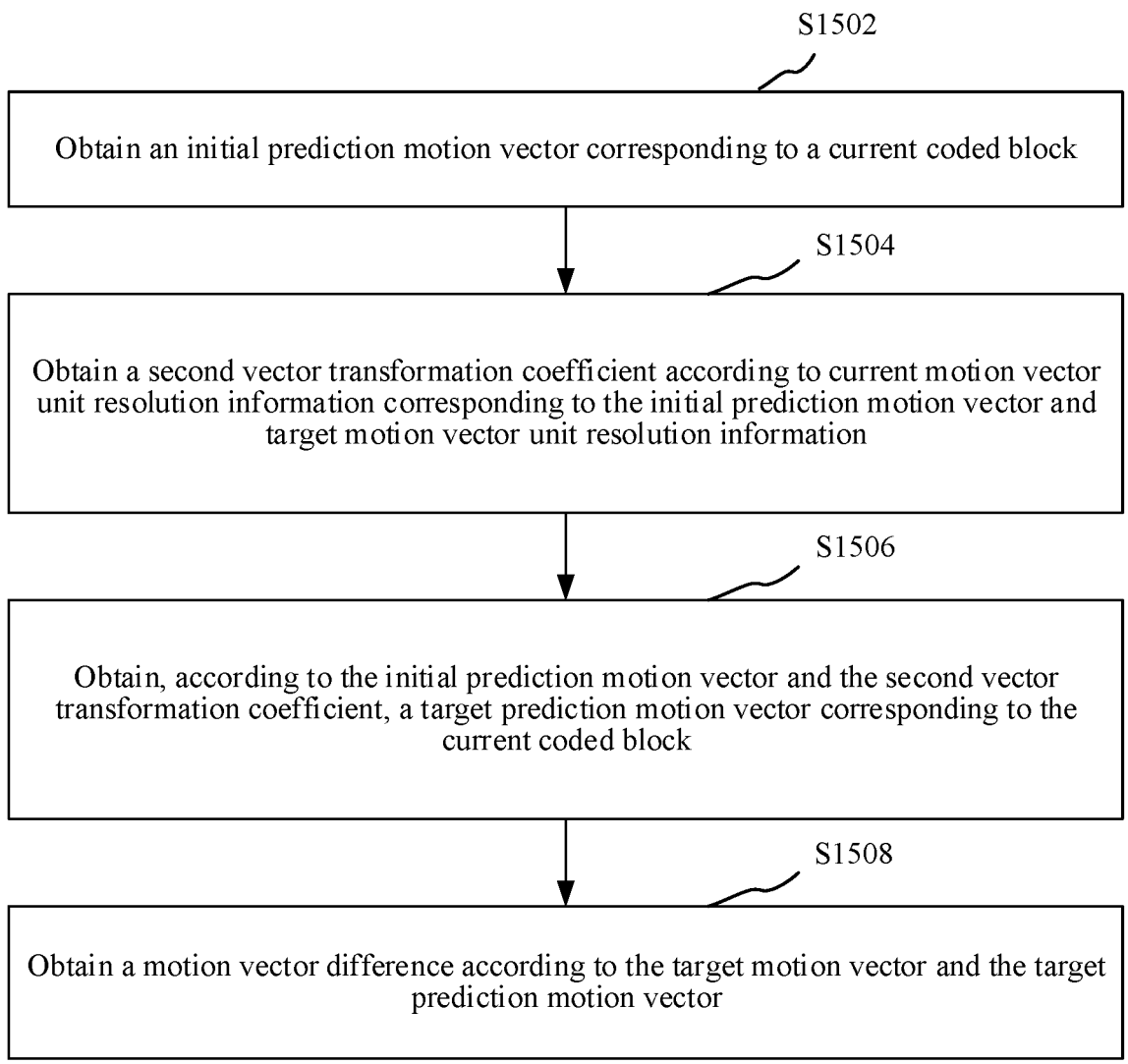
FIG. 15 is a flowchart of encoding a to-be-encoded frame to obtain encoded data according to another embodiment of the present disclosure.

In an embodiment, as shown in FIG. 15, the foregoing S808, that is, the encoding the to-be-encoded frame according to the current reference frame, to obtain encoded data corresponding to the input video frame may be further implemented as the following S1502 to S1508. For details, refer to FIG. 15:

S1502. Obtain an initial prediction motion vector corresponding to a current coded block.

To reduce the number of bits used for the encoded data, a motion vector of the current coded block may be predicted, to obtain a predicted value, a difference between the target motion vector and the predicted value is calculated, to obtain a motion vector difference, and the motion vector difference is encoded. The initial prediction motion vector is used for predicting the motion vector of the current coded block. There may be one or more initial prediction motion vectors. This may be specifically set according to a requirement. An obtaining rule of the initial prediction motion vector may be set according to a requirement. Because the current coded block and its adjacent coded blocks usually have a spatial correlation, a target motion vector value corresponding to one or more adjacent coded blocks corresponding to the current coded block may be used as the initial prediction motion vector. For example, a first motion vector value corresponding to adjacent coded blocks of the upper right corner and the upper left corner of the current coded block may be used as the initial prediction motion vector. Alternatively, a motion vector value of the target reference block corresponding to the current coded block may be used as the initial prediction motion vector.

S1504. Obtain a second vector transformation parameter according to current motion vector unit resolution information corresponding to the initial prediction motion vector and target motion vector unit resolution information.

The current motion vector unit resolution information refers to information corresponding to a current resolution corresponding to a unit of the initial prediction motion vector, for example, may be a current resolution or a down-sampling proportion. The resolution corresponding to the unit of the initial prediction motion vector means that the unit of the initial prediction motion vector is calculated by using a vector unit at the current resolution as a standard, that is, a motion vector at the current resolution. When the current motion vector unit resolution information corresponding to the initial prediction motion vector is different from the target motion vector unit resolution information, the second vector transformation parameter needs to be obtained according to the current motion vector unit resolution information corresponding to the initial prediction motion vector and the target motion vector unit resolution information. The second vector transformation parameter is used for transforming the initial prediction motion vector into a motion vector at a target resolution, and the second vector transformation parameter may be a proportion of resolution information corresponding to the unit of the target motion vector to the current motion vector unit resolution information. For example, assuming that the resolution corresponding to the unit of the target motion vector is 200*200 pixels, and the current motion vector unit resolution information is 100*100 pixels, the second vector transformation parameter may be 2.

S1506. Obtain, according to the initial prediction motion vector and the second vector transformation parameter, a target prediction motion vector corresponding to the current coded block.

After the second vector transformation parameter is obtained, calculation is performed according to the initial prediction motion vector and the second vector transformation parameter, to obtain the target prediction motion vector, the target prediction motion vector being a prediction motion vector at the target resolution. For example, when there is one initial prediction motion vector, the product of the initial prediction motion vector and the second vector transformation parameter is used as the target prediction motion vector. When there are a plurality of initial prediction motion vectors, the initial prediction motion vector may be calculated, to obtain a calculation result, and the target motion vector is obtained according to the calculation result and the second vector transformation parameter. The calculation result may be one or more of a minimum value, an average value, and a median value in the initial prediction motion vector. It may be understood that, an algorithm of obtaining the target prediction motion vector according to the initial prediction motion vector and the second vector transformation parameter may be user-defined, and the decoding end may use a consistent user-defined algorithm to obtain the same target prediction motion vector through calculation.

S1508. Obtain a motion vector difference according to the target motion vector and the target prediction motion vector.

A difference between the target motion vector and the target prediction motion vector is used as the motion vector difference, and encoding is performed according to the motion vector difference, to obtain the encoded data, and reduce the data amount of the encoded data.

In one embodiment of the present disclosure, the initial prediction motion vector is transformed, to obtain the target prediction motion vector at the target resolution, so that units of the target prediction motion vector and the target motion vector are in a matched quantization scale. Therefore, a small motion vector difference is obtained, and the data amount of the encoded data is reduced.

In an embodiment, S804, that is, the obtaining a processing manner corresponding to the input video frame includes: calculating a proportion of a target predictive type coded block in a forward encoded video frame corresponding to the input video frame; and determining, according to the proportion, the processing manner corresponding to the input video frame.

The predictive type coded block is a coded block corresponding to a frame predictive type. The proportion of the target predictive type may be one or two of a proportion corresponding to an intra coded block and a proportion corresponding to an inter coded block. The proportion of the target predictive type coded block in the forward encoded video frame corresponding to the input video frame may be a proportion of the target predictive type coded block to another predictive type coded block, or may be a proportion of the type coded block to a total quantity of coded blocks. This may be specifically set according to a requirement. For example, a first quantity of intra coded blocks in the forward encoded video frame and a second quantity of inter coded blocks in the forward encoded video frame may be obtained. A proportion of the intra coded block to the inter coded block is obtained through calculation according to the first quantity and the second quantity, or a third quantity of all coded blocks of the forward encoded video frame is counted, and a proportion of the intra coded block to a third data amount is obtained through calculation according to the first quantity and the third quantity. A proportion of the inter coded block to the third data amount may also be obtained through calculation according to the second quantity and the third quantity.

The forward encoded video frame refers to a video frame encoded before the input video frame is encoded, and a specific quantity of the obtained forward encoded video frames may be user-defined. For example, the forward encoded video frame may be a previous encoded video frame of the input video frame, or the forward encoded video frame may be the first three encoded video frames of the input video frame. After the corresponding proportion of the target predictive type coded block in the forward encoded video frame is obtained through calculation, the processing manner corresponding to the input video frame is determined according to the proportion obtained through calculation. If a plurality of forward encoded video frames are obtained, corresponding proportions of different types of coded blocks in each forward encoded video frame may be obtained through calculation, weighting calculation is performed according to the proportions to obtain a total proportion, and then the target processing manner corresponding to the input video frame is determined according to the total proportion and a preset threshold. A weight corresponding to a forward video frame and an encoding distance between the forward encoded video frame and the input video frame may be negatively correlated.

In an embodiment, the proportion of the intra coded block in the forward encoded video frame in the forward encoded video frame may be calculated, and when the proportion is to greater than a target threshold, it is determined that the processing manner is a down-sampling processing manner.

For the proportion corresponding to the intra coded block, it may be that when the proportion is greater than the target threshold, it is determined that the target processing manner corresponding to the input video frame is the down-sampling processing manner; otherwise, it is determined that the target processing manner corresponding to the video frame is the full resolution processing manner. For example, when the proportion is greater than the target threshold, it is determined that the processing manner corresponding to the input video frame is the down-sampling processing manner; otherwise, it is determined that the target processing manner corresponding to the video framer is the full resolution processing manner.

In one embodiment of the present disclosure, if the intra coded block has a large proportion, it indicates that the video is relatively complex or correlations between video frames are relatively low. Therefore, a relatively large predicted residual is obtained. Therefore, the down-sampling processing manner is more inclined to be used for encoding, to reduce the amount of the encoded data.

The target threshold may be determined according to the processing manner of the reference frame corresponding to the input video frame. When the processing manner of the reference frame corresponding to the input video frame is the down-sampling processing manner, a first preset threshold T1 is obtained, and the first preset threshold T1 is used as the target threshold. Likewise, when the processing manner of the reference frame corresponding to the input video frame is the full resolution processing manner, a second preset threshold T2 is obtained, and the second preset threshold T2 is used as the target threshold. Further, after the target threshold is obtained according to the resolution information of the reference frame corresponding to the input video frame, the processing manner of the input video frame is determined according to the target threshold and the proportion of the intra coded block in the forward encoded video frame in the forward encoded video frame. When the proportion of the intra coded block in the forward encoded video frame in the forward encoded video frame is greater than the target threshold, the processing manner corresponding to the input video frame is determined as the down-sampling processing manner.

In an embodiment, the second preset threshold is greater than the first preset threshold. In this way, when the processing manner corresponding to the current reference frame is a full resolution processing manner, the input video frame is more inclined to use the full resolution processing manner, and when the processing manner corresponding to the current reference frame is a down-sampling processing manner, the input video frame is more inclined to use the down-sampling processing manner.

Figure 16:
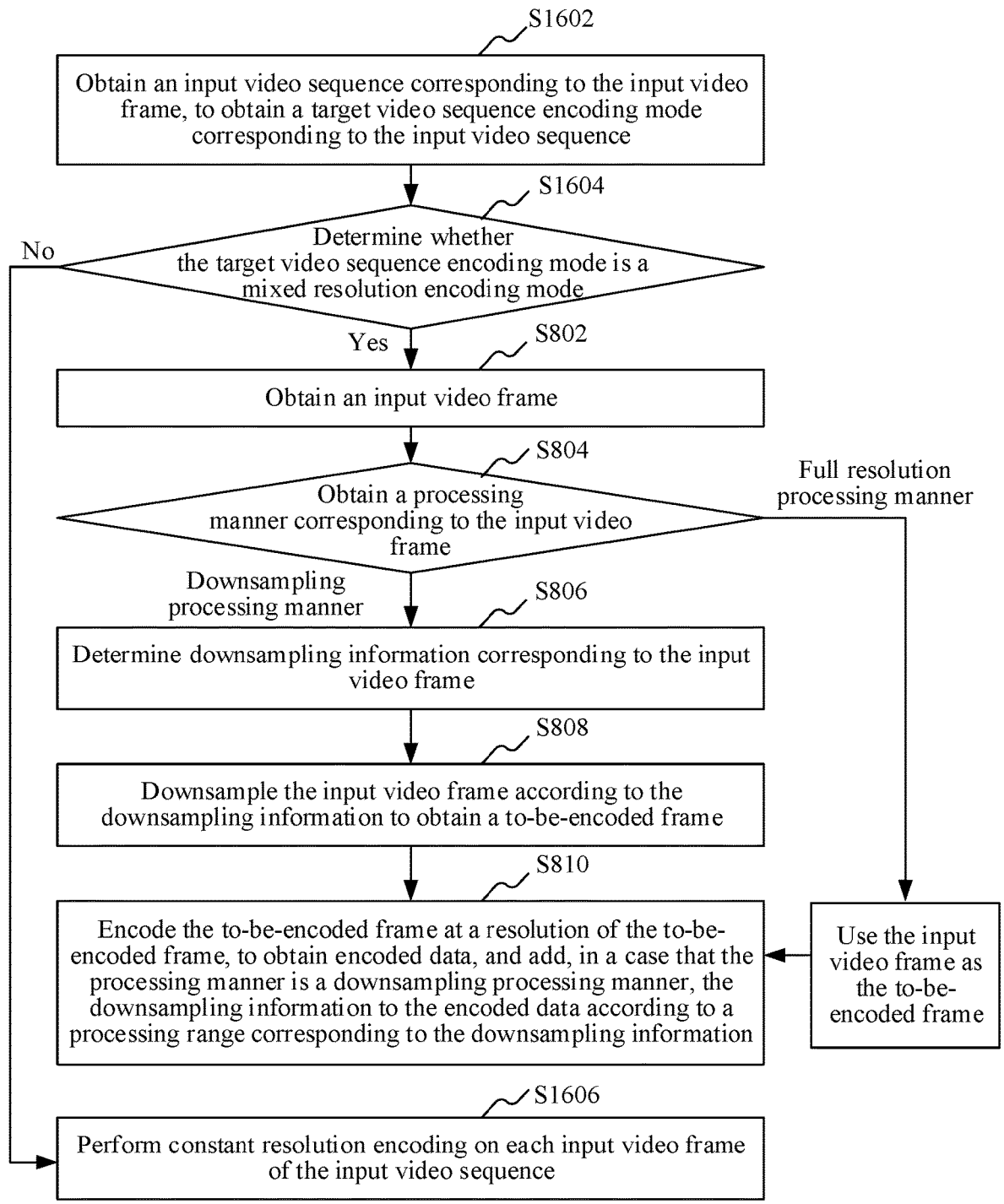
FIG. 16 is a flowchart of a video encoding method according to another embodiment of the present disclosure.

In an embodiment, as shown in FIG. 16, with reference to the embodiment shown in FIG. 8, in the foregoing S802, that is, before obtaining an input video frame, the video encoding method further includes the followings.

S1602. Obtain an input video sequence corresponding to the input video frame, and obtain a target video sequence encoding mode corresponding to the input video sequence, the target video sequence encoding mode including a constant resolution encoding mode or a mixed resolution encoding mode.

The input video sequence may include a plurality of input video frames. When the target video sequence encoding mode is the constant resolution encoding mode, the input video frames in the input video sequence are encoded at the same resolution, for example, at a full resolution. When the target video sequence encoding mode is the mixed resolution encoding mode, a processing manner corresponding to each input video frame is obtained, the input video frame is processed according to the processing manner, to obtain a to-be-encoded frame, and encoding is performed according to the to-be-encoded frame. A resolution of the to-be-encoded frame may be the same as a resolution of the input video frame, or may be less than the resolution of the input video frame. The input video sequence includes to-be-encoded frames at different resolutions. Therefore, when the video sequence encoding mode is the mixed resolution encoding mode, the video encoding method provided in the foregoing embodiment is performed.

In an embodiment, the obtaining a video sequence encoding mode corresponding to a to-be-encoded video sequence includes: obtaining current environment information, the current environment information including at least one of current encoding environment information and current decoding environment information; and determining, according to the current environment information, the target video sequence encoding mode corresponding to the input video sequence.

The environment information may include one or more of a processing capability of a device for performing the video encoding method, a processing capability of a device for performing the video decoding method, and current application scenario information. The processing capability may be represented by a processing speed. For example, for a device with a strong processing capability, because the processing speed is fast, the corresponding target video sequence encoding mode is a full resolution encoding manner, and when a current application scenario corresponding to the current application scenario information is a real-time application scenario, the video sequence encoding mode is the mixed resolution encoding mode. When the current application scenario corresponding to the current application scenario information is a non-real-time application scenario, the video sequence encoding mode is the constant resolution encoding mode. A correspondence between the current environment information and the video sequence encoding mode may be set, and after the current environment information is obtained, the target video sequence encoding mode corresponding to the input video sequence is obtained according to the correspondence between the current environment information and the video sequence encoding mode.

For example, a correspondence between an average value of a processing speed of the device for performing the video encoding method and a processing speed of the device for performing the video decoding method and the video sequence encoding mode may be set. After a processing speed of the device for performing the video encoding method and a processing speed of the device for performing the video decoding method are obtained, an average value is calculated, and the target video sequence encoding mode is obtained according to the average value. Whether the current application scenario is a real-time application scenario may be set according to a requirement. For example, a video call application scenario and a game application scenario are real-time application scenarios, and application scenarios corresponding to video encoding on a video website and off-line video encoding may be non-real-time application scenarios.

S1604. Determine whether the target video sequence encoding mode is the mixed resolution encoding mode.

If yes, enter S802; and if not, enter S1606.

S1606. Perform constant resolution encoding on each input video frame of the input video sequence.

When the video sequence encoding mode is the constant resolution encoding mode, constant resolution encoding is performed on each input video frame of the input video sequence.

In an embodiment, at the resolution of the to-be-encoded frame, the to-be-encoded frame is encoded to obtain the encoded data corresponding to the input video frame; and video sequence encoding mode information corresponding to the target video sequence encoding mode is added to the encoded data.

The video sequence encoding mode information is used for describing an encoding mode used by the input video sequence, and a flag bit Sequence_Mix_Resolution_Flag for describing the video sequence encoding mode may be added to the encoded data. A specific value of the flag bit may be set according to a requirement. An adding location of the video sequence encoding mode information in the encoded data may be sequence level header information. For example, when the Sequence_Mix_Resolution_Flag is 1, the corresponding target video sequence encoding mode may be the mixed resolution encoding mode. When the Sequence_Mix_Resolution_Flag is 0, the corresponding target video sequence encoding mode may be the constant resolution encoding mode.

Figure 17:
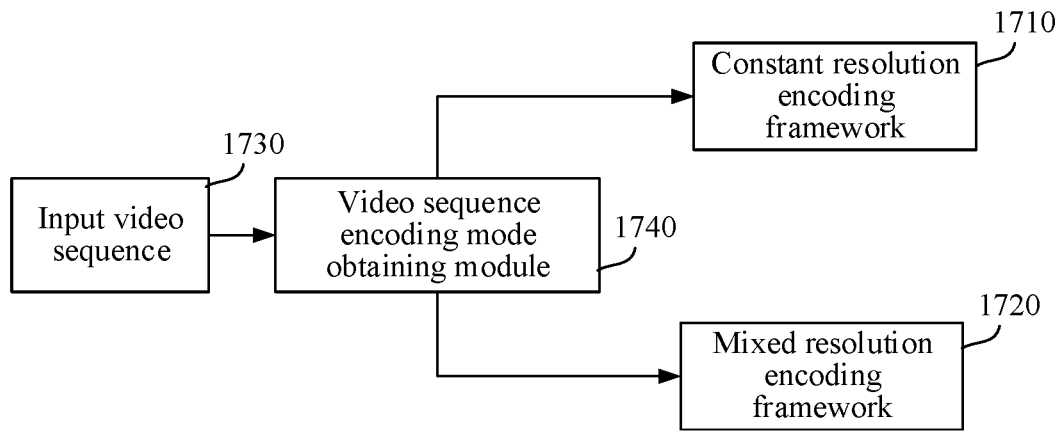
FIG. 17 is a schematic diagram of a video encoding framework according to an embodiment of the present disclosure.

In an embodiment, a video encoding framework is shown in FIG. 17. The video encoding framework includes a constant resolution encoding framework 1710 and a mixed resolution encoding framework 1720, and the mixed resolution encoding framework 1720 may correspond to the encoding framework in FIG. 2. After an input video sequence 1730 is obtained, decision-making is performed on an encoding mode of the video sequence 1730 at a video sequence encoding mode obtaining module 1740. When a target video sequence encoding mode is a mixed resolution encoding mode, encoding is performed by using the mixed resolution encoding framework 1720. When the target video sequence encoding mode is a constant resolution encoding mode, the constant resolution encoding framework 1710 in FIG. 17 is used for performing constant resolution encoding. The constant resolution encoding framework 1710 may be a current HEVC encoding framework, H.265 encoding framework, or the like.

The following assumes that a video sequence A includes three input video frames: a, b, and c, to describe the video encoding method.

1. A target video sequence encoding mode corresponding to the video sequence A is obtained, and because a current environment is a video call environment, the target video sequence encoding mode is a mixed resolution encoding mode.

2. A processing decision-making unit in a mixed resolution encoding framework is used for performing decision-making on the first input video frame a, to obtain that the processing manner is a down-sampling processing manner and a down-sampling proportion is 2/1. Down-sampling is performed on a, to obtain a down-sampled video frame a1, intra encoding is performed on a1, to obtain encoded data d1 corresponding to a1, and the encoded data corresponding to a1 is reconstructed, to obtain a corresponding reconstructed video frame a2.

3. The processing decision-making unit in the mixed resolution encoding framework is used for performing decision-making on the second input video frame b, to obtain that the processing manner is a down-sampling processing manner and a sampling proportion is 4/1. Down-sampling is performed on b, to obtain b1, b1 is encoded, to obtain encoded data corresponding to b, and the encoded data carries sampling proportion information corresponding to the down-sampling proportion and processing manner information corresponding to the processing manner.

The encoding process includes: because b is an inter predictive frame, a2 needs to be used as a current reference frame, and because b1 and a2 have different resolutions, a2 needs to be sampled. The sampling manner for determining a2 is a direct sub-pixel interpolation, and the motion estimation precision is ¼. Therefore, the pixel interpolation precision is ¼*2=½, and ½ sub-pixel interpolation is performed on a2 according to the pixel interpolation precision, to obtain a target reference frame a3. A first motion vector MV1 of the current coded block in b1 and a target reference block in the target reference frame is calculated, and the predicted residual is p1. The obtained target resolution is an original resolution. Therefore, a target motion vector is 4MV1. An initial prediction vector being MV2 is obtained through calculation, and the initial prediction vector is obtained through calculation at a resolution corresponding to a 4/1 down-sampling proportion. Therefore, a target predict vector is 4MV2, and a motion vector difference MVD1 corresponding to the current coded block is equal to 4MV1-4MV2. Transformation, quantization, and entropy encoding are performed on MVD1 and p1, to obtain the encoded data.

4. The processing decision-making unit in the mixed resolution encoding framework is used for performing decision-making on the third input video frame c, to obtain that the processing manner is a down-sampling processing manner and the sampling proportion is 8/1. c is down-sampled, to obtain c1, and c1 is encoded, to obtain encoded data d2 corresponding to c.

The encoding process includes: because c is an inter predictive frame, the corresponding current reference frame is a reconstructed video frame b2 obtained by reconstructing the encoded data of b, and because c1 and b2 have different resolutions, b2 needs to be sampled. The sampling manner for determining b2 is a direct sub-pixel interpolation, and the motion estimation precision is ¼. Therefore, the pixel interpolation precision is ¼*2=½, and ½ sub-pixel interpolation is performed on b2 according to the pixel interpolation precision, to obtain a target reference frame b3. A first motion vector MV3 of the current coded block in c1 and a target reference block in the target reference frame is calculated, and the predicted residual is p2. The obtained target resolution is an original resolution. Therefore, the target motion vector is 8MV3. The obtained initial prediction vector is MV4, and the initial prediction vector is obtained through calculation at a resolution corresponding to a 4/1 down-sampling proportion. Therefore, the target predict vector is 4MV4, and a motion vector difference MVD2 corresponding to the current coded block is equal to 8MV3-4MV4. Transformation, quantization, and entropy encoding are performed on MVD2 and p2, to obtain the encoded data d3.

5. d1, d2 and d3 form an encoded data packet and are used as encoded data corresponding to the video sequence, and sent to a receiving terminal. The encoded data corresponding to the video sequence carries a flag bit for describing the target video sequence encoding mode as the mixed resolution encoding mode.

Figure 18:
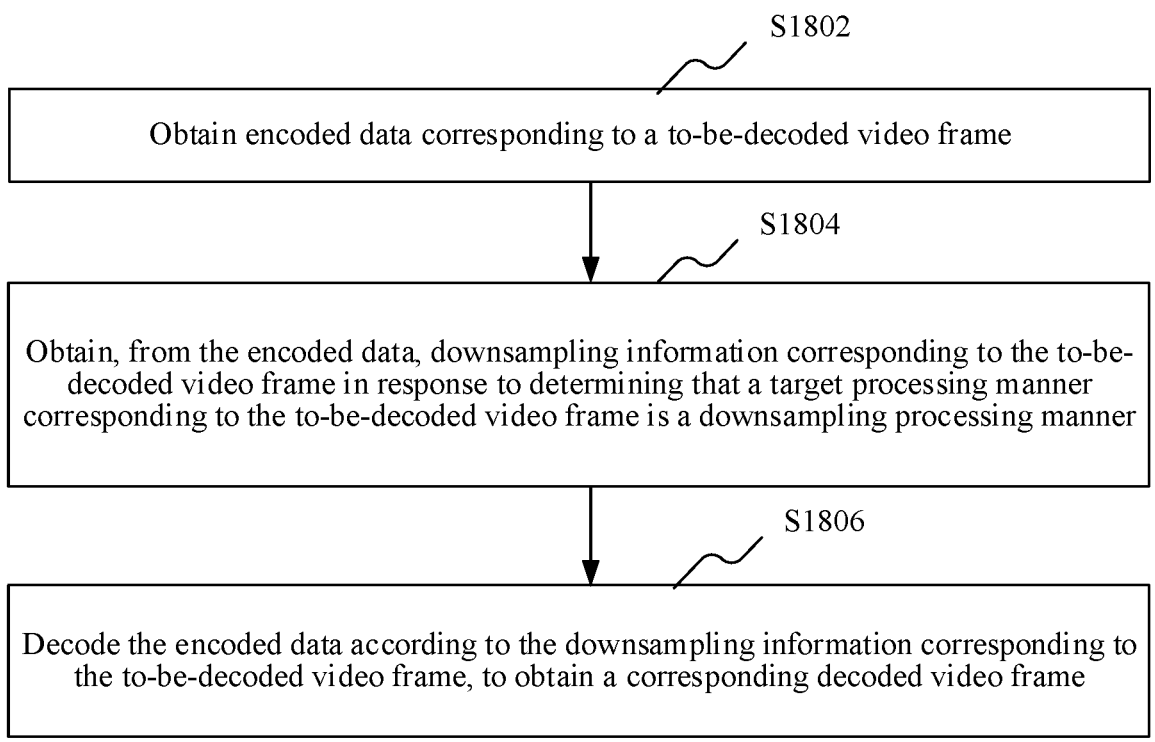
FIG. 18 is a flowchart of a video decoding method according to an embodiment of the present disclosure.

FIG. 18 is a flowchart of a video decoding method according to an exemplary embodiment of the present disclosure. The method may be applied to a terminal, or may be applied to a server. As shown in FIG. 18, the method includes the following steps:

S1802. Obtain encoded data corresponding to a to-be-decoded video frame (i.e., a current frame).

The encoded data refers to data obtained through encoding. A decoding end obtains the encoded data corresponding to the to-be-decoded video frame, and decodes the encoded data to obtain a decoded video frame.

S1804. Obtain, from the encoded data, down-sampling information corresponding to the to-be-decoded video frame in response to determining that a target processing manner corresponding to the to-be-decoded video frame is a down-sampling processing manner.

A processing manner flag bit corresponding to a preset location in the encoded data is obtained. When the processing manner flag is a down-sampling processing manner, flag bits of down-sampling information in the encoded data continue to be read, and the down-sampling information corresponding to the to-be-decoded video frame is obtained by using the flag bits of the down-sampling information. The down-sampling information includes at least one of a down-sampling proportion and a down-sampling method.

S1806. Decode the encoded data according to the down-sampling information corresponding to the to-be-decoded video frame, to obtain a corresponding decoded video frame.

After the down-sampling information is obtained, the encoded data is decoded according to the down-sampling information, to obtain the corresponding decoded video frame. If the down-sampling information includes a down-sampling proportion, an up-sampling proportion corresponding to the down-sampling proportion is used for decoding the encoded data to obtain the corresponding decoded video frame. If the down-sampling information includes a down-sampling method, an up-sampling method corresponding to the down-sampling method is used for decoding the encoded data to obtain the corresponding decoded video frame. The sampling methods used by the up-sampling method and the down-sampling method may the same or may be different. For example, it may be that both use a bilinear interpolation sampling method, or one uses a bilinear interpolation sampling method, and the other uses a CNN sampling method.

In the foregoing video decoding method, encoded data corresponding to a to-be-decoded video frame is obtained, then down-sampling information corresponding to the to-be-decoded video frame is obtained from the encoded data, and the encoded data is decoded according to the down-sampling information corresponding to the to-be-decoded video frame, to obtain a corresponding decoded video frame. The down-sampling information corresponding to the to-be-decoded video frame is obtained from the encoded data and then decoding is performed according to the down-sampling information, thereby providing decoding support for the encoded data obtained by encoding adaptively selected down-sampling information.

In an embodiment, the obtaining, from the encoded data, down-sampling information corresponding to the to-be-decoded video frame includes: reading the down-sampling information from the encoded data, determining, according to a location of the down-sampling information in the encoded data, a processing range corresponding to the down-sampling information, the processing range including a sequence level range, a GOP level range, a frame level range, and a coded block level range; and determining, according to the processing range, the down-sampling information corresponding to the to-be-decoded video frame.

The location of the down-sampling information determines the processing range of the down-sampling information. The down-sampling information corresponding to the to-be-decoded video frame may be determined according to the processing range of the down-sampling information. If the down-sampling information is in sequence header information, the processing range of the down-sampling information is a sequence level range, that is, all video frames in the video sequence correspond to the same down-sampling information. If the down-sampling information is in header information of a GOP, the processing range of the down-sampling information is a GOP level range, and video frames in the GOP correspond to the same down-sampling information. If the down-sampling information is in header information of a current video frame, only the current video frame corresponds to the down-sampling information, and if the down-sampling information is in header information of a coded block in a video frame, only the current coded block corresponds to the down-sampling information.

That is, when the processing range is a sequence level range, down-sampling information is determined from header information of a video sequence; when the processing range is a GOP level range, down-sampling information is determined from header information corresponding to a GOP; when the processing range is a frame level range, down-sampling information is determined from header information corresponding to a frame level; and when the processing range is a coded block level range, down-sampling information is determined from header information corresponding to a coded block.

In an embodiment, the down-sampling information includes a down-sampling proportion; and the decoding the encoded data according to the down-sampling information corresponding to the to-be-decoded video frame, to obtain a corresponding decoded video frame includes: decoding the encoded data according to the down-sampling proportion corresponding to the to-be-decoded video frame, to obtain a reconstructed video frame corresponding to the to-be-decoded video frame; and up-sampling the reconstructed video frame according to an up-sampling proportion corresponding to the down-sampling proportion, to obtain the decoded video frame.

The down-sampling information includes a down-sampling proportion. The up-sampling proportion selected for up-sampling the reconstructed video frame and a down-sampling proportion of an encoding end are the reciprocal of each other. First, the encoded data is decoded according to the down-sampling proportion to obtain the reconstructed video frame. Because the reconstructed video frame has a relatively low resolution, the reconstructed video frame needs to be up-sampled to obtain a final decoded video frame.

In an embodiment, the decoding the encoded data according to the down-sampling proportion corresponding to the to-be-decoded video frame, to obtain a reconstructed video frame corresponding to the to-be-decoded video frame includes: obtaining a current reference frame corresponding to the to-be-decoded video frame; and decoding the encoded data according to the down-sampling proportion corresponding to the to-be-decoded video frame and the current reference frame, to obtain the reconstructed video frame corresponding to the to-be-decoded video frame.

During encoding, encoding needs to be performed according to a reference frame. Likewise, during decoding, decoding also needs to be performed according to a reference frame. The current reference frame corresponding to the to-be-decoded video frame is obtained, resolution information corresponding to the current reference frame is determined according to the down-sampling proportion, then the current reference frame is sampled (up-sampled or down-sampled) according to the resolution information to obtain a target reference frame having resolution information the same as that of the to-be-decoded video frame, then the encoded data is decoded according to the target reference frame to obtain the reconstructed video frame, and further up-sampling is performed according to the reconstructed video frame to obtain the decoded video frame.

In an embodiment, the decoding the encoded data according to the down-sampling proportion corresponding to the to-be-decoded video frame and the current reference frame, to obtain the reconstructed video frame corresponding to the to-be-decoded video frame includes: determining, according to the down-sampling proportion corresponding to the to-be-decoded video frame, resolution information corresponding to the to-be-decoded video frame; processing the current reference frame according to the resolution information, to obtain a target reference frame; and decoding the encoded data according to the target reference frame, to obtain the reconstructed video frame corresponding to the to-be-decoded video frame.

The resolution information of the to-be-decoded video frame may be determined according to the down-sampling proportion. Because the down-sampling proportion is relative to an original resolution, in a case that the original resolution is known, the resolution information of the to-be-decoded video frame may be determined according to the down-sampling proportion. Because the current reference frame of the to-be-decoded video frame needs to be consistent with the resolution of the to-be-decoded video frame to perform decoding, the current reference frame needs to be processed according to the resolution information to obtain a target reference frame. The target reference frame is a reference frame consistent with the obtained resolution information. Then the encoded data is decoded according to the target reference frame, then the corresponding reconstructed video frame is obtained, and subsequently the reconstructed video frame is up-sampled according to an up-sampling proportion corresponding to the down-sampling proportion to obtain the decoded video frame.

In an embodiment, the down-sampling information includes a down-sampling method; and the decoding the to-be-decoded video frame according to the down-sampling information corresponding to the to-be-decoded video frame, to obtain a corresponding decoded video frame includes: decoding the encoded data, to obtain a reconstructed video frame corresponding to the to-be-decoded video frame; and processing the reconstructed video frame according to an up-sampling method corresponding to the down-sampling method, to obtain the decoded video frame.

The down-sampling information includes a down-sampling method. After the encoded data is decoded to obtain the reconstructed video frame, a matched up-sampling method is obtained according to the obtained down-sampling method, and then the reconstructed video frame is up-sampled according to the up-sampling method to obtain the decoded video frame.

Figure 19:
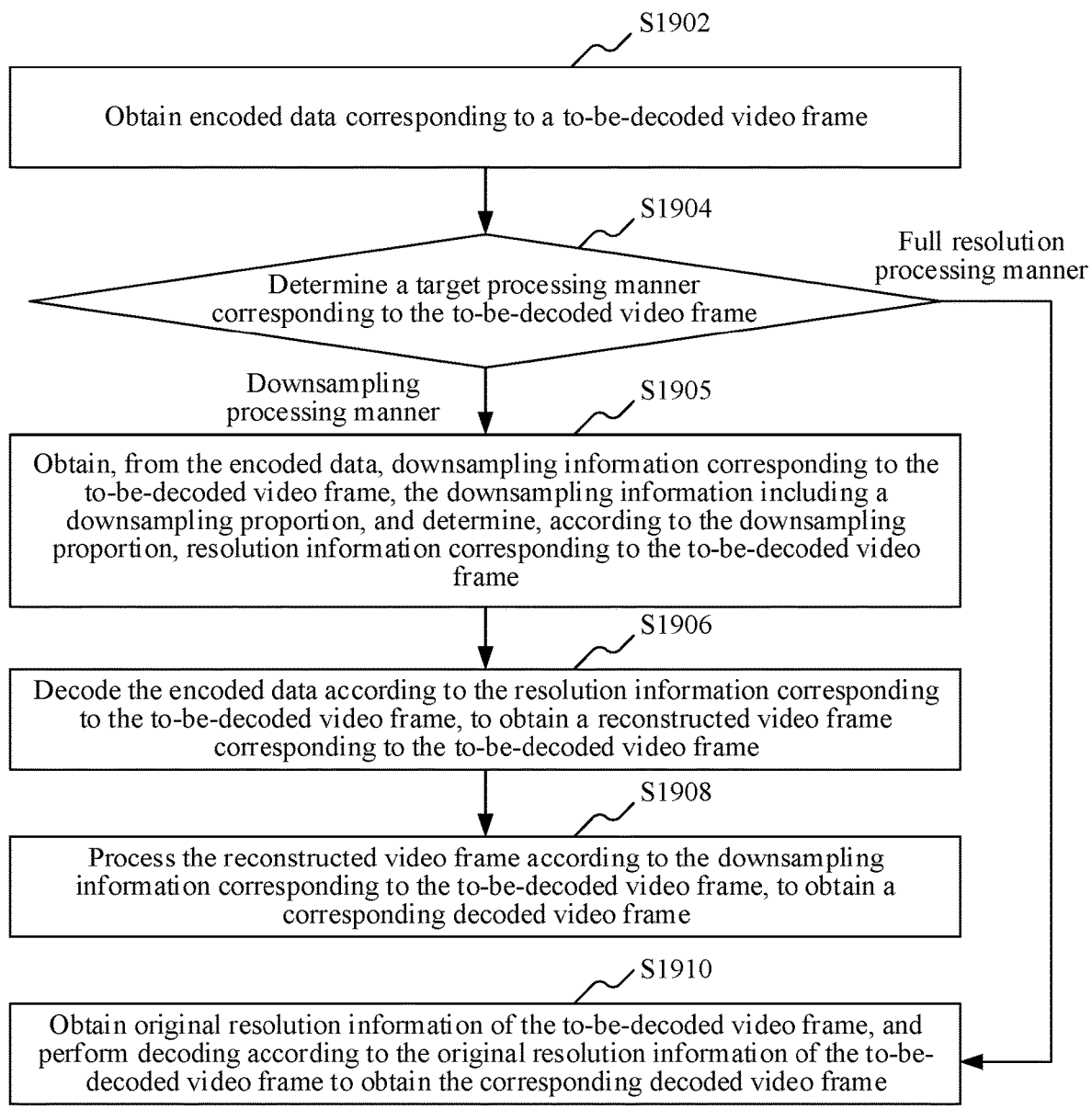
FIG. 19 is a flowchart of a video decoding method according to another embodiment of the present disclosure.

As shown in FIG. 19, in an embodiment, a video decoding method is provided. The method may specifically include the following steps:

S1902. Obtain encoded data corresponding to a to-be-decoded video frame.

Optionally, one to-be-decoded video sequence may include a plurality of to-be-decoded video frames. The to-be-decoded video frame may be a video frame obtained in real time, or may be a video frame obtained in a pre-stored to-be-decoded video sequence.

S1904. Determine a target processing manner corresponding to the to-be-decoded video frame, enter S1905 in a case that the target processing manner is a down-sampling processing manner, and enter S1910 in a case that the target processing manner is a full resolution processing manner.

Optionally, a processing manner flag bit corresponding to a preset location in the encoded data is obtained to obtain the target processing manner through reading. When the processing manner flag bit is a down-sampling processing manner, flag bits of down-sampling information in the encoded data continue to be read, and down-sampling information corresponding to the to-be-decoded video frame is obtained by using the flag bits of the down-sampling information. The down-sampling information includes at least one of a down-sampling proportion and a down-sampling method. When the processing manner flag bit is a full resolution processing manner, decoding is performed directly according to the original resolution of the to-be-encoded video frame to obtain a decoded video frame.

S1905. Obtain, from the encoded data, down-sampling information corresponding to the to-be-decoded video frame, the down-sampling information including a down-sampling proportion, and determine, according to the down-sampling proportion, resolution information corresponding to the to-be-decoded video frame.

The resolution information is information related to a resolution, and may be the resolution itself or may be a down-sampling proportion. The resolution information corresponding to the to-be-decoded video frame may be carried from the encoded data or may be obtained through calculation by a decoding device.

In an embodiment, the encoded data may carry resolution information corresponding to the to-be-decoded video frame, for example, may carry the resolution corresponding to the to-be-decoded video frame or the down-sampling proportion.

In an embodiment, the encoded data may carry processing manner information, and the decoding device obtains the processing manner information from the encoded data, and obtains, according to the processing manner information, the resolution information corresponding to the to-be-decoded video frame. For example, if the encoded data may carry that the processing manner corresponding to the processing manner information is a down-sampling processing manner, and it is determined in an encoding standard and a decoding standard that the down-sampling proportions are 2/1 or the encoded data carries corresponding down-sampling proportions, the obtained resolution information is that the down-sampling proportion is 2/1.

S1906. Decode the encoded data according to the resolution information corresponding to the to-be-decoded video frame, to obtain a reconstructed video frame corresponding to the to-be-decoded video frame.

The reconstructed video frame is a video frame obtained through decoding and reconstruction. It may be understood that, resolution information corresponding to the reconstructed video frame corresponds to resolution information of a to-be-encoded frame in an encoding process. If image information in the encoding process has no loss, the reconstructed video frame and the to-be-encoded frame are the same, and if image information in the encoding process has a loss, a difference between the reconstructed video frame and the to-be-encoded frame corresponds to a loss value. The encoded data is decoded in the resolution information corresponding to the to-be-decoded video frame. The decoding may include at least one of prediction, inverse transformation, inverse quantization, and entropy decoding, and is specifically determined according to an encoding process. During decoding, at least one of a current reference frame, location information corresponding to each to-be-decoded block (or each block to be decoded) of the to-be-decoded video frame, location information corresponding to each reference block of the current reference frame, and a motion vector is performed according to the resolution information of the to-be-decoded video frame. The processing method matches the processing method of an encoding end during encoding. For example, a current reference frame corresponding to the to-be-decoded video frame may be obtained, the current reference frame is processed according to the resolution information corresponding to the to-be-decoded video frame to obtain a target reference frame, a target reference block is obtained according to carried motion vector information, a predicted value corresponding to the to-be-decoded block is obtained according to the target reference block, and the reconstructed video frame is obtained according to a predicted residual in the encoded data and the predicted value.

In an embodiment, when the encoding end transforms the location information, corresponding location information is obtained in a decoding process, and corresponding transformation needs to be performed on the location information to maintain consistency of the target reference blocks obtained by the encoding end and the decoding end.

In an embodiment, when the motion vector information carried in the encoded data is a target motion vector, the target motion vector may be transformed according to target motion vector unit resolution information and the resolution information corresponding to the to-be-decoded video frame, to obtain a first motion vector under the resolution information corresponding to the to-be-decoded video frame, and a target reference block corresponding to the to-be-decoded block is obtained according to the first motion vector.

In an embodiment, when the motion vector information carried in the encoded data is a motion vector difference, an initial prediction motion vector corresponding to the current to-be-decoded block is obtained, the motion vector difference and the initial prediction motion vector corresponding to each to-be-decoded block are processed at the same resolution to obtain a first motion vector that corresponds to the to-be-decoded block and that is at the resolution of the to-be-decoded video frame, and a target reference block corresponding to the to-be-decoded block is obtained according to the first motion vector.

The motion vector difference and the initial prediction motion vector are transformed to the corresponding motion vectors at the same resolution. For example, the initial prediction motion vector may be transformed to a target prediction motion vector at a target resolution, a target motion vector is obtained according to the target prediction motion vector and the motion vector difference, and then the target motion vector is transformed to the first motion vector at the resolution of the to-be-decoded video frame. Alternatively, the initial prediction motion vector may be transformed to a prediction motion vector at the resolution of the to-be-decoded video frame, the motion vector difference is transformed to the motion vector difference at the resolution of the to-be-decoded video frame, and the first motion vector is obtained according to the motion vector difference at the resolution of the to-be-decoded video frame and the prediction motion vector at the resolution of the to-be-decoded video frame.

S1908. Process the reconstructed video frame according to the down-sampling information corresponding to the to-be-decoded video frame, to obtain a corresponding decoded video frame.

The processing for the reconstructed video frame may be sampling, for example, up-sampling. A method for processing the reconstructed video frame may correspond to a method for processing an input video frame during encoding. For example, when the processing manner of the input video frame is a down-sampling processing manner, and the down-sampling proportion is 2/1, the reconstructed video frame is up-sampled, and the up-sampling proportion may be ½.

The down-sampling information includes at least one of a down-sampling proportion and a down-sampling method. According to an up-sampling proportion corresponding to the down-sampling proportion, an up-sampling method corresponding to the down-sampling method is used for up-sampling the reconstructed video frame to obtain the decoded video frame.

In an embodiment, when the decoding end determines, from header information of the encoded data, that the encoded data is obtained through encoding in a down-sampling processing manner, the decoding end may further obtain the used down-sampling proportion information or down-sampling method information from the header information, and up-sample the obtained reconstructed video frame by using an up-sampling proportion and an up-sampling method matching the down-sampling proportion information or the down-sampling method information, to obtain the decoded video frame. For example, if a sampling proportion corresponding to the down-sampling proportion information is 2/1, the decoding end needs to up-sample the reconstructed video frame according to the sampling proportion ½ and the up-sampling method matching the down-sampling method information, to obtain the decoded video frame. The decoding end may obtain, from any one of sequence level header information, group level header information, frame level header information, and block level header information, down-sampling proportion information or down-sampling method information corresponding to the current encoded data.

S1910. Obtain original resolution information of the to-be-decoded video frame, and perform decoding according to the original resolution information of the to-be-decoded video frame to obtain the corresponding decoded video frame.

When the target processing manner is a full resolution processing manner, decoding is directly performed according to the original resolution information of the to-be-decoded video frame, to obtain the decoded video frame. In the foregoing video decoding method, encoded data corresponding to a to-be-decoded video frame is obtained, down-sampling information corresponding to the to-be-decoded video frame is obtained, the down-sampling information including a down-sampling proportion, the encoded data is decoded according to the down-sampling information corresponding to the to-be-decoded video frame, to obtain a reconstructed video frame corresponding to the to-be-decoded video frame, and the reconstructed video frame is processed according to the down-sampling information corresponding to the to-be-decoded video frame, to obtain a corresponding decoded video frame. Therefore, during decoding, decoding can be flexibly performed according to the down-sampling information corresponding to the to-be-decoded video frame, to obtain the decoded video frame, thereby improving quality of a video obtained through video decoding under a condition of a limited bandwidth.

In an embodiment, the reconstructed video frames corresponding to to-be-decoded video frames in the to-be-decoded video sequence are processed into the same resolution, for example, the reconstructed video frames are processed into decoded video frames whose resolutions are the same as the original resolution of the input video frame.

In an embodiment, S1906, that is, the decoding the encoded data according to the resolution information corresponding to the to-be-decoded video frame, to obtain a reconstructed video frame corresponding to the to-be-decoded video frame includes: obtaining a current reference frame corresponding to the to-be-decoded video frame; and decoding the encoded data according to the resolution information corresponding to the to-be-decoded video frame and the current reference frame, to obtain the reconstructed video frame corresponding to the to-be-decoded video frame.

There may be one or more reference frames corresponding to the to-be-decoded video frame. For example, when the to-be-decoded video frame is a P frame, there may be one corresponding reference frame. When the to-be-decoded video frame is a B frame, there may be two corresponding reference frames. The reference frame corresponding to the to-be-encoded frame may be obtained according to a reference relationship, and the reference relationship may vary according to video encoding and decoding standards. For example, if the second video frame in a video GOP is a B frame, a corresponding to-be-decoded video frame may be an I frame of the video GOP and the fourth frame of the video GOP. Alternatively, the current reference frame corresponding to the to-be-decoded video frame may be the first one or two in forward encoded frames. It may be understood that, the current reference frame is consistent with the current reference frame in the encoding process.

In an embodiment, the obtaining a current reference frame corresponding to the to-be-decoded video frame includes: obtaining a second reference rule, the second reference rule including a resolution magnitude relationship between the to-be-decoded video frame and the current reference frame; and obtaining, according to the second reference rule, the current reference frame corresponding to the to-be-decoded video frame.

The second reference rule determines a resolution magnitude restrictive relationship between the to-be-decoded video frame and the current reference frame. It may be understood that, to ensure the consistency of the current reference frame obtained in the encoding process and the reference frame obtained in the decoding process, the first reference rule is consistent with the second reference rule. The first reference rule and the second reference rule may be preset in an encoding and decoding standard.

Alternatively, during encoding, the first reference rule may be selected according to an encoding application scenario, a real-time requirement, and the like, and the encoded data carries reference rule information. The decoder obtains the second reference rule according to the reference rule information in the encoded data. The resolution magnitude relationship includes at least one of the resolutions of the to-be-decoded video frame and the reference frame being the same and different. When the second reference rule includes the resolutions of the to-be-decoded video frame and the reference frame being the same, the second reference rule may further include a processing manner reference rule of the resolutions of the to-be-decoded video frame and the current reference frame. For example, the processing manner reference rule may include one or two of that a current reference frame of a full resolution processing manner may be referenced for a to-be-decoded video frame of the full resolution processing manner and a current reference frame of a down-sampling processing manner may be referenced for the to-be-to decoded video frame of the down-sampling processing manner.

When the second reference rule includes the resolutions of the to-be-decoded video frame and the reference frame being the different, the second reference rule may further include one or two of that the resolution of the to-be-decoded video frame is greater than the resolution of the current reference frame and the resolution of the to-be-decoded video frame is less than the resolution of the current reference frame. Therefore, the second reference rule may include one or more of that the down-sampling resolution reference frame may be referenced for the original resolution to-be-decoded video frame, the original resolution reference frame may be referenced for the down-sampling resolution to-be-decoded video frame, the original resolution reference frame may referenced for the original resolution to-be-decoded video frame, and the down-sampling resolution reference frame may be referenced for the down-sampling resolution to-be-decoded video frame. The original resolution to-be-decoded video frame means that the resolution of the to-be-decoded video frame is the same as the resolution of the corresponding input video frame, and the original resolution reference frame means that the resolution of the reference frame is the same as the resolution of the corresponding input video frame. The down-sampling resolution to-be-decoded video frame means that the resolution information corresponding to the to-be-decoded video frame is down-sampling. The down-sampling resolution reference frame means that resolution information corresponding to the reference frame is down-sampling. After the second reference rule is obtained, the current reference frame corresponding to the to-be-decoded video frame is obtained according to the second reference rule, so that the obtained current reference frame meets the second reference rule.

In an embodiment, a reference block corresponding to a to-be-decoded block of the to-be-decoded video frame may be obtained from the current reference frame, and the to-be-decoded block is decoded according to the reference block. Alternatively, the current reference frame may be processed according to resolution information of the to-be-decoded video frame, to obtain a corresponding target reference frame, a target reference block corresponding to the to-be-decoded block of the to-be-decoded video frame is obtained from the target reference frame, and the coded block is decoded according to the target reference block, to obtain a reconstructed video frame corresponding to the to-be-decoded video frame.

In an embodiment, the decoding the encoded data according to the resolution information corresponding to the to-be-decoded video frame and the current reference frame, to obtain a reconstructed video frame corresponding to the to-be-decoded video frame includes: sampling the current reference frame according to the resolution information corresponding to the to-be-decoded video frame, to obtain a corresponding target reference frame; and decoding the to-be-decoded video frame according to the target reference frame, to obtain the reconstructed video frame corresponding to the to-be-decoded video frame.

A target reference block is obtained from the target reference frame according to carried motion vector information, a predicted value corresponding to the to-be-decoded block is obtained according to the target reference block, and the reconstructed video frame is obtained according to a predicted residual in the encoded data and the predicted value.

In an embodiment, the sampling the current reference frame according to the resolution information corresponding to the to-be-decoded video frame, to obtain a corresponding target reference frame includes: sampling the current reference frame according to the resolution information of the to-be-decoded video frame and motion estimation pixel precision, to obtain the corresponding target reference frame.

In an embodiment, the sampling the current reference frame according to the resolution information of the to-be-decoded video frame and motion estimation pixel precision, to obtain the corresponding target reference frame includes: obtaining pixel interpolation precision through calculation according to the resolution information of the to-be-decoded video frame and the motion estimation pixel precision; and performing sub-pixel interpolation processing directly on the current reference frame according to the pixel interpolation precision, to obtain the corresponding target reference frame.

In an embodiment, the sampling the current reference frame according to the resolution information of the to-be-decoded video frame and motion estimation pixel precision, to obtain the corresponding target reference frame includes: sampling the current reference frame according to the resolution information of the to-be-decoded video frame, to obtain an intermediate reference frame; and performing sub-pixel interpolation processing on the intermediate reference frame according to the motion estimation pixel precision, to obtain the target reference frame.

The resolution of the to-be-decoded video frame is consistent with that of the to-be-encoded video frame, and the obtained target reference frame is also consistent. Therefore, the method for sampling the current reference frame according to the resolution information corresponding to the to-be-decoded video frame, to obtain the corresponding target reference frame is consistent with that the current reference frame is sampled according to the resolution information of the to-be-encoded frame at the encoding end, to obtain the corresponding target reference frame. Details are not provided in one embodiment of the present disclosure herein again.

In an embodiment, the decoding end may further obtain, from header information of the encoded data, sampling manner information corresponding to the to-be-decoded video frame. Specifically, the sub-pixel interpolation manner information corresponding to the to-be-decoded video frame may be obtained from any one of sequence level header information, group level header information, frame level header information, and block level header information.

Figure 20:
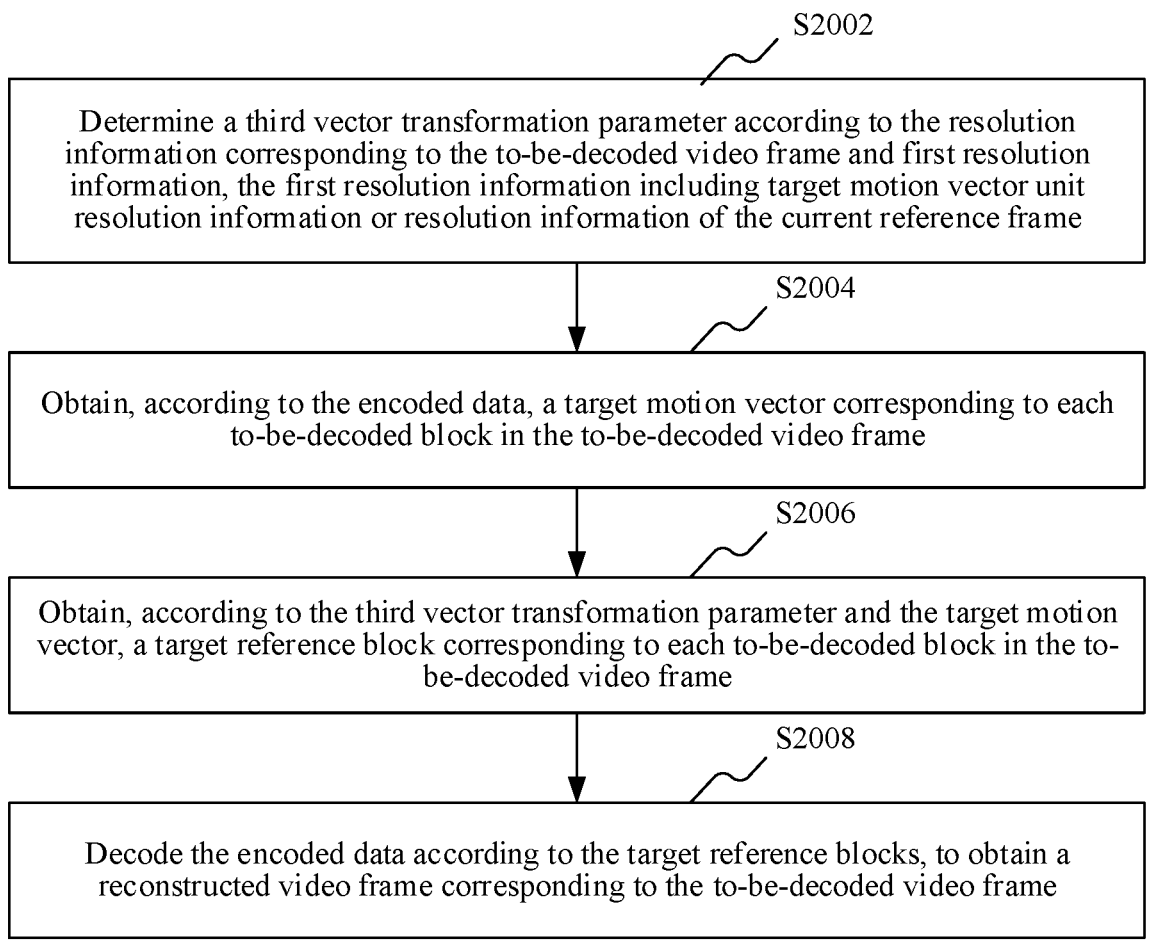
FIG. 20 is a flowchart of obtaining a reconstructed video frame according to an embodiment of the present disclosure.

As shown in FIG. 20, in an embodiment, the foregoing S1906, that is, the decoding the encoded data according to the resolution information corresponding to the to-be-decoded video frame and the current reference frame, to obtain a reconstructed video frame corresponding to the to-be-decoded video frame may be further implemented as the following S2002 to S2008:

S2002. Determine a third vector transformation parameter according to the resolution information corresponding to the to-be-decoded video frame and first resolution information, the first resolution information including target motion vector unit resolution information or resolution information of the current reference frame.

The third vector transformation parameter is used for transforming obtained location information of a motion vector or an obtained motion vector. The third vector transformation parameter may be a proportion between the first resolution information and the resolution information of the to-be-decoded video frame, and the third vector transformation parameter corresponds to the first vector transformation parameter. When the third vector transformation parameter is used for transforming the target motion vector, the target motion vector may be transformed into a motion vector corresponding to the resolution corresponding to the to-be-decoded video frame, and the third vector transformation parameter may be the reciprocal of the first vector transformation parameter.

When the third vector transformation parameter is used for transforming the location information corresponding to the motion vector, if the first vector transformation parameter in the encoding end is used for transforming the first location information, because the location information of the to-be-decoded block and the location information of the coded block are the same, the third vector transformation parameter and the first vector transformation parameter are the same. If the first vector transformation parameter in the encoding end is used for transforming the second location information, because a location value obtained through calculation according to the target motion vector and the first location information is a location value obtained after second location information is transformed according to the first vector transformation parameter in the encoding end, the third vector transformation parameter is the reciprocal of the first vector transformation parameter.

S2004. Obtain, according to the encoded data, a target motion vector corresponding to each to-be-decoded block in the to-be-decoded video frame.

When the encoded data carries the target motion vector, the target motion vector is read from the encoded data. When the encoded data carries a motion vector difference, a target prediction motion vector may be obtained through calculation, and the target motion vector is obtained according to the motion vector difference and the target prediction motion vector.

S2006. Obtain, according to the third vector transformation parameter and the target motion vector, a target reference block corresponding to each to-be-decoded block in the to-be-decoded video frame.

After the third vector transformation parameter is obtained, the obtained motion vector or the location information corresponding to the motion vector is transformed according to the third vector transformation parameter, to obtain the location information corresponding to the target reference blocks, thereby obtaining the target reference blocks.

S2008. Decode the encoded data according to the target reference blocks, to obtain a reconstructed video frame corresponding to the to-be-decoded video frame.

After the target reference block is obtained, according to a pixel value of the target reference block and a predicted residual of the to-be-decoded block carried in the encoded data, pixel values of image blocks of the reconstructed video frame are obtained, to obtain the reconstructed video frame.

In an embodiment, S2002, that is, the determining a third vector transformation parameter according to the resolution information corresponding to the to-be-decoded video frame and first resolution information includes: determining the third vector transformation parameter according to the resolution information corresponding to the to-be-decoded video frame and the resolution information of the current reference frame; and S2006, that is, the obtaining, according to the third vector transformation parameter and the target motion vector, a target reference block corresponding to each to-be-decoded block in the to-be-decoded video frame includes: obtaining first location information corresponding to a current to-be-decoded block; and obtaining, according to the first location information, the third vector transformation parameter, and the target motion vector, the target reference block corresponding to the current to-be-decoded block.

A second location information corresponding to the target reference block may be obtained according to the first location information, the third vector transformation parameter, and the target motion vector, and the target reference block is obtained according to the second location information. Due to the correspondence between encoding and decoding, if the first vector transformation parameter in the encoding end is used for transforming the first location information, because the location information of the to-be-decoded block and the location information of the coded block are the same, the third vector transformation parameter and the first vector transformation parameter are the same. If the first vector transformation parameter in the encoding end is used for transforming the second location information, because a location value obtained through calculation according to the target motion vector and the first location information is a location value obtained after the second location information is transformed according to the first vector transformation parameter in the encoding end, the third vector transformation parameter is the reciprocal of the first vector transformation parameter.

For example, the resolution of the to-be-decoded video frame is 1200*1200 pixels, and the resolution of the current reference frame is 600*600 pixels. The first vector transformation parameter is used for transforming the second location information, the first vector transformation parameter is 2, and the third vector transformation parameter is ½. Assuming that the first location information is (6, 8), and the target motion vector is (0, 2), intermediate location information is (6, 8)–(0, 2)=(6, 6), and the second location information corresponding to the target reference block is (6*½, 6*½)=(3, 3).

For example, the resolution of the to-be-decoded video frame is 1200*1200 pixels, and the resolution of the current reference frame is 600*600 pixels. The first vector transformation parameter is used for transforming the first location information, the first vector transformation parameter is ½, and the third vector transformation parameter is ½. Assuming that the first location information is (6, 8), and the target motion vector is (0, 1), the second location information is (6*½, 8*½) (0, 1)=(3, 3).

In an embodiment, S2002, that is, the determining a third vector transformation parameter according to the resolution information corresponding to the to-be-decoded video frame and first resolution information includes: determining the third vector transformation parameter according to the resolution information corresponding to the to-be-decoded video frame and target motion vector unit resolution information; and S2006, that is, the obtaining, according to the third vector transformation parameter and the target motion vector, a target reference block corresponding to each to-be-decoded block in the to-be-decoded video frame includes: obtaining a first motion vector according to the target motion vector and the third vector transformation parameter; and obtaining, according to the first motion vector, the target reference block corresponding to a current to-be-decoded block.

The third vector transformation parameter is determined according to the resolution information corresponding to the to-be-decoded video frame and the target motion vector unit resolution information, and is used for transforming the target motion vector into the first motion vector corresponding to the resolution corresponding to the to-be-decoded frame. After the third vector transformation parameter is obtained, the third vector transformation parameter and the target motion vector may be multiplied, and the obtained product is used as the first motion vector. It may be understood that, the process of obtaining the first motion vector according to the third vector transformation parameter and the target motion vector is an inverse process of obtaining, according to the first vector transformation parameter and the first motion vector, the target motion vector corresponding to the current coded block. For example, if the first vector transformation parameter of the coded block corresponding to the to-be-decoded block is equal to 2 in the encoding end, the obtained first motion vector is (2, 2), and the target motion vector obtained according to the product of the first vector transformation parameter and the first motion vector (2, 2) is (4, 4). Therefore, in the decoding process, the third vector transformation parameter is ½, the obtained target motion vector is (4, 4), and the first motion vector obtained according to the product of the third vector transformation parameter ½ and the target motion vector (4, 4) is (2, 2).

In an embodiment, when the encoded data carries a motion vector difference, the obtaining, according to the encoded data, a target motion vector corresponding to each to-be-decoded block in the to-be-decoded video frame includes: obtaining, according to the encoded data, the motion vector difference corresponding to the current to-be-decoded block in the to-be-decoded video frame.

An initial prediction motion vector corresponding to the current to-be-decoded block is obtained; a second vector transformation parameter is obtained according to current motion vector unit resolution information corresponding to the initial prediction motion vector and target motion vector unit resolution information; a target prediction motion vector corresponding to the current decoded block is obtained according to the initial prediction motion vector and the second vector transformation parameter; and the target motion vector is obtained according to the target prediction motion vector and the motion vector difference.

Because in the decoding and encoding processes, the to-be-decoded block corresponds to the to-be-encoded block, and the initial prediction motion vector obtaining rules are the same, the initial prediction motion vector corresponding to the current to-be-decoded block is consistent with the initial prediction motion vector corresponding to the current to-be-encoded block. For the method for obtaining the target prediction motion vector, reference may be made to the method in the encoding process, which is not specifically described again. The target motion vector is a sum of the target prediction motion vector and the motion vector difference.

In an embodiment, a proportion of a target predictive type decoded block in a forward decoded video frame corresponding to the to-be-decoded video frame may be further calculated; a processing manner corresponding to the to-be-decoded video frame is determined according to the proportion; and resolution information corresponding to the to-be-decoded video frame is obtained according to the processing manner.

The target predictive type decoded block corresponds to the target predictive type coded block. The forward decoded video frame is a video frame decoded in the to-be-decoded video frame, and the forward decoded video frame also corresponds to the forward encoded video frame. Therefore, the calculation method and result for the proportion of the target predictive type coded block obtained by the encoding end are also consistent with those for the proportion of the target predictive type decoded block obtained by the decoding end. For the method for obtaining the proportion of the target predictive type decode block, reference may be made to the method for obtaining the proportion of the target predictive type coded block, which is not described herein again. After the processing manner is obtained, when the processing manner is a full resolution processing manner, the corresponding resolution information is an original resolution. When the processing manner is a down-sampling processing manner, a preset down-sampling proportion is obtained or a down-sampling proportion is obtained from header information of the encoded data.

In an embodiment, a proportion of an intra decoded block in the forward decoded video frame in the forward decoded video frame may be calculated, and when the proportion is greater than a target threshold, it is determined that the processing manner is the down-sampling processing manner.

For the proportion corresponding to the intra decoded block, it may be that when the proportion is greater than the target threshold, it is determined that a target processing manner corresponding to the to-be-decoded video frame is the down-sampling processing manner; otherwise, it is determined that the target processing manner corresponding to the video frame is the full resolution processing manner. For example, when the proportion is greater than the target threshold, the processing manner corresponding to the to-be-decoded video frame is determined as the down-sampling processing manner; otherwise, the target processing manner corresponding to the video framer is determined as the full resolution processing manner.

The target threshold may be determined according to the processing manner of the reference frame corresponding to the to-be-decoded video frame. When the processing manner of the reference frame corresponding to the to-be-decoded video frame is the down-sampling processing manner, a first preset threshold T1 is obtained, and the first preset threshold T1 is used as the target threshold. Likewise, when the processing manner of the reference frame corresponding to the to-be-decoded video frame is the full resolution processing manner, a second preset threshold T2 is obtained, and the second preset threshold T2 is used as the target threshold. Further, after the target threshold is obtained according to the resolution information of the reference frame corresponding to the to-be-decoded video frame, the processing manner of the to-be-decoded video frame is determined according to the target threshold and the proportion of the intra decoded block in the forward decoded video frame in the forward decoded video frame. When the proportion of the intra decoded block in the forward decoded video frame in the forward decoded video frame is greater than the target threshold, it is determined that the processing manner corresponding to the to-be-decoded video frame is the down-sampling processing manner.

In an embodiment, before obtaining encoded data corresponding to the to-be-decoded video frame, the method further includes: obtaining a to-be-decoded video sequence corresponding to the to-be-decoded video frame, obtaining a video sequence decoding mode corresponding to the to-be-decoded video sequence, the video sequence decoding mode including a constant resolution encoding mode or a mixed resolution encoding mode; performing a mixed resolution decoding method on each to-be-decoded video frame of the to-be-decoded video sequence when the video sequence decode mode is the mixed resolution encoding mode; and performing constant resolution decoding on the to-be-decoded video sequence when the video sequence decode mode is the constant resolution encoding mode.

Video sequence encoding mode information may be obtained from the encoded data, and a video sequence decoding mode is obtained according to the video sequence encoding mode information. For example, when the video sequence encoding mode corresponding to the video sequence encoding mode information is the constant resolution encoding mode, the corresponding video sequence decoding mode is the constant resolution decoding mode, and in the constant resolution decoding mode, resolutions of the to-be-decoded video frames in the video sequence are consistent. When the video sequence encoding mode corresponding to the video sequence encoding mode information is the mixed resolution encoding mode, a corresponding video sequence decoding mode is a mixed resolution decoding mode.

In an embodiment, a decoding framework corresponding to the to-be-decoded video frame may be determined from the header information of the encoded data. The decoding end may obtain, from sequence level header information corresponding to the encoded data, the encoding framework used when each input video frame in the input video frame sequence corresponding to the current encoded data is encoded, thereby determining a matched decoding framework of the to-be-decoded video frame. For example, when a flag bit Sequence_Mix_Flag that is in the sequence level header information of the encoded data and that is used for determining the used encoding framework is 0, it indicates that the constant resolution encoding framework is used when each input video frame in the input video frame sequence is encoded, and the decoding end may use the constant resolution decoding framework to decode the encoded data to obtain the reconstructed video frame corresponding to the to-be-decoded video frame. When Sequence_Mix_Flag is 1, it indicates that the mixed resolution encoding framework is used when each input video frame in the input video frame sequence is encoded, so that the decoding end may use the mixed resolution decoding framework to decode the encoded data to obtain the reconstructed video frame sequence.

In an embodiment, the obtaining a video sequence decoding mode corresponding to the to-be-decoded video sequence may include: obtaining current environment information, the current environment information including at least one of current encoding environment information and current decoding environment information; and determining, according to the current environment information, a target video sequence decoding mode corresponding to the to-be-decoded video sequence.

The decoding end may also obtain the corresponding target video sequence decoding mode according to a method for calculating a video sequence encoding mode at the encoding end. Therefore, in one embodiment of the present disclosure, the determining a target video sequence decoding mode according to the current environment information is consistent with the determining a target video sequence encoding mode according to the current environment information, which is not described herein again.

In an embodiment, the current environment information includes an application scenario corresponding to the to-be-decoded video sequence, and a video sequence decoding mode corresponding to the to-be-decoded video sequence may be obtained according to the application scenario.

An example in which encoded data corresponding to video sequence A is decoded is used below to describe the video decoding method. It is assumed that names of to-be-decoded video frames corresponding to input video frames a, b, and c at the decoding end are respectively e, f, and g.

1. A receiving terminal obtains encoded data corresponding to video sequence A, obtains, from sequence header information corresponding to the encoded data, that a target video sequence encoding mode is a mixed resolution encoding mode. Therefore, a mixed resolution decoding framework is used for decoding the encoded data.

2. A resolution information obtaining unit of the mixed resolution decoding framework obtains resolution information corresponding to the first to-be-decoded video frame e. It may be understood that, encoded data corresponding to e is data obtained by encoding a1. Intra decoding is performed on e, to obtain a reconstructed video frame e1, and because resolution information corresponding to e is ½, the reconstructed video frame e1 may be up-sampled with a sampling proportion ½, to obtain a decoded video frame e2.

3. The resolution information obtaining unit of the mixed resolution decoding framework obtains resolution information corresponding to the second to-be-decoded video frame f. It may be understood that, encoded data corresponding to f is data obtained by encoding b1. Inter decoding is performed on f, to obtain a reconstructed video frame f1, and because resolution information corresponding to f is 4/1, the reconstructed video frame f1 may be up-sampled with a sampling proportion ¼, to obtain a decoded video frame f2.

The decoding process is as follows: Because f is an inter predictive frame, the reconstructed video frame e1 needs to be used as a current reference frame. It may be understood that, e1 and a2 are the same, and sampling the same as that on a2 is performed on e1, to obtain e3. e3 and a3 herein are the same, and are target reference frames. A motion vector difference corresponding to a current to-be-decoded block obtained from the encoded data is MVD1. Because MVD1 is at a target resolution, that is, at an original resolution, MVD1 needs to be transformed into at the resolution corresponding to f. Therefore, it may be obtained that MVD3 is MVD1/4. An obtained initial prediction vector is MV2. The initial prediction vector is obtained through calculation at a resolution corresponding to a 4/1 down-sampling proportion, which is the same as the resolution corresponding to f Therefore, it may be obtained that the first motion vector is MV1 and equal to MVD1/4+MV2. A target reference block is obtained according to MV1. A predicted value corresponding to the to-be-decoded block is obtained according to the target reference block, and a predicted residual p1 is added by the predicted value to obtain, through reconstruction, a reconstructed block corresponding to the reconstructed video frame f1.

4. The resolution information obtaining unit of the mixed resolution decoding framework obtains encoded data corresponding to the third to-be-decoded video frame g. It may be understood that, the encoded data corresponding to g is data obtained by encoding c1. Inter decoding is performed on g, to obtain a reconstructed video frame g1, and because resolution information corresponding to g is ⅛, the reconstructed video frame g1 may be up-sampled with a sampling proportion ⅛, to obtain a decoded video frame g2.

The decoding process is as follows: Because g is an inter predictive frame, the reconstructed video frame f1 needs to be used as a current reference frame. It may be understood that, f1 and b2 are the same, and sampling the same as that on b2 is performed on f1, to obtain f3. f3 and b3 herein are the same, and are target reference frames. A motion vector difference corresponding to the current to-be-decoded block obtained from the encoded data is MVD2. Because MVD2 is at a target resolution, that is, at an original resolution, MVD2 needs to be transformed into at the resolution corresponding to g. Therefore, it may be obtained that MVD2 is MVD1/8. An obtained initial prediction vector is MV4. The initial prediction vector is obtained through calculation at a resolution corresponding to a 4/1 down-sampling proportion, and needs to be transformed into at the resolution corresponding to f, and the down-sampling proportion corresponding to f is 8/1. Therefore, it may be obtained that the first motion vector is MV3 and equal to MVD2/8+MV4/2. A target reference block is obtained according to MV3. A predicted value corresponding to the to-be-decoded block is obtained according to the target reference block, and a predicted residual p2 is added by the predicted value to obtain, through reconstruction, a reconstructed block corresponding to the reconstructed video frame g1.

5. The receiving terminal plays e2, f2, and g2.

Figure 21:
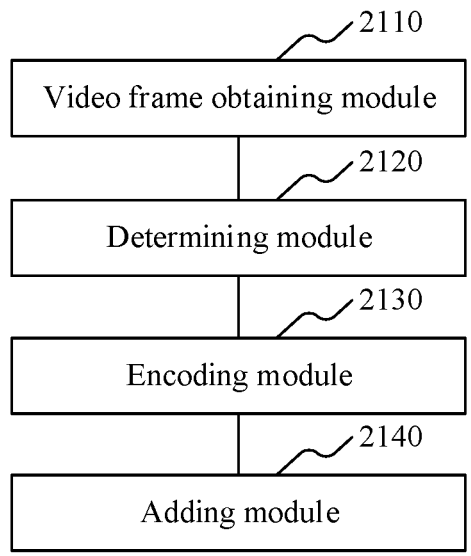
FIG. 21 is a structural block diagram of a video encoding apparatus according to an embodiment of the present disclosure.

FIG. 21 is a structural block diagram of a video encoding apparatus according to an exemplary embodiment of the present disclosure. The apparatus may be applied to a terminal, or may be applied to a server. As shown in FIG. 21, the apparatus includes: a video frame obtaining module 2110, a determining module 2120, an encoding module 2130, and an adding module 2140.

The video frame obtaining module 2110 is configured to obtain an input video frame. The determining module 2120 is configured to determine down-sampling information corresponding to the input video frame. The encoding module 2130 is configured to encode the input video frame according to the down-sampling information to obtain encoded data corresponding to the input video frame. The adding module 2140 is configured to add the down-sampling information to the encoded data according to a processing range corresponding to the down-sampling information.

In an embodiment, the adding module 2140 is further configured to obtain the processing range corresponding to the down-sampling information, the processing range including any one of a sequence level range, a GOP level range, a frame level range, and a coded block level range; and add the down-sampling information to header information corresponding to the processing range.

In an embodiment, the adding module 2140 is further configured to add the down-sampling information to header information of a video sequence in a case that the processing range is the sequence level range; or the adding module 2140 is further configured to add the down-sampling information to header information corresponding to a GOP in a case that the processing range is the GOP level range; or the adding module 2140 is further configured to add the down-sampling information to header information corresponding to a frame level in a case that the processing range is the frame level range; or the adding module 2140 is further configured to add the down-sampling information to header information corresponding to a coded block in a case that the processing range is the coded block level range.

In an embodiment, the down-sampling information includes a down-sampling proportion; and the determining module 2120 is further configured to obtain a current QP estimation value corresponding to the input video frame; obtain a QP threshold corresponding to the input video frame; and determine, according to a difference between the current QP estimation value and the QP threshold, the down-sampling proportion corresponding to the input video frame.

In an embodiment, the determining module 2120 is further configured to obtain a correspondence between a candidate difference range and a candidate down-sampling proportion; determine, from the candidate difference range according to the difference between the current QP estimation value and the QP threshold, a target difference range corresponding to the difference; and determine, from the candidate down-sampling proportion according to the target difference range and the correspondence, the down-sampling proportion corresponding to the input video frame.

In an embodiment, the determining module 2120 is further configured to obtain video frame information corresponding to the input video frame, the video frame information including at least one of coding information, image feature information, and a ratio of an intra coded block to an inter coded block of a preamble video frame; and determine, according to the video frame information, the QP threshold corresponding to the input video frame.

In an embodiment, the down-sampling information include a down-sampling method; and the determining module 2120 is further configured to calculate an image content complexity corresponding to the input video frame; obtain a correspondence between a candidate image content complexity and a candidate down-sampling method; and determine, according to the correspondence, a target down-sampling method corresponding to the image content complexity.

In an embodiment, the down-sampling information includes a down-sampling method; and the determining module 2120 is further configured to obtain a current coded block of the input video frame; calculate a module gradient value corresponding to the current coded block; classify the current coded block into a target module class in a module set according to the module gradient value, candidate module classes in the module class set respectively corresponding to different module gradient value ranges; obtain a correspondence between a candidate module class and a candidate down-sampling method; and determine, according to the correspondence between the candidate module class and the candidate down-sampling method and the target module class, a target down-sampling method corresponding to the current coded block.

In an embodiment, the down-sampling information includes a down-sampling proportion; and the encoding module 2130 is further configured to process the input video frame according to the down-sampling proportion to obtain a to-be-encoded frame; obtain a current reference frame corresponding to the to-be-encoded frame; and encode the to-be-encoded frame according to the current reference frame, to obtain the encoded data corresponding to the input video frame.

In an embodiment, the encoding module 2130 is further configured to obtain a down-sampling proportion corresponding to the to-be-encoded frame, process the current reference frame according to the down-sampling proportion, to obtain a target reference frame; and encode the to-be-encoded frame according to the target reference frame, to obtain the encoded data corresponding to the input video frame.

In an embodiment, the determining module 2120 is further configured to obtain a correspondence between a candidate environmental factor and candidate down-sampling information; obtain a current environmental factor, and determine, according to the correspondence between the candidate environmental factor and the candidate down-sampling proportion, the down-sampling information corresponding to the current environmental factor.

Figure 22:
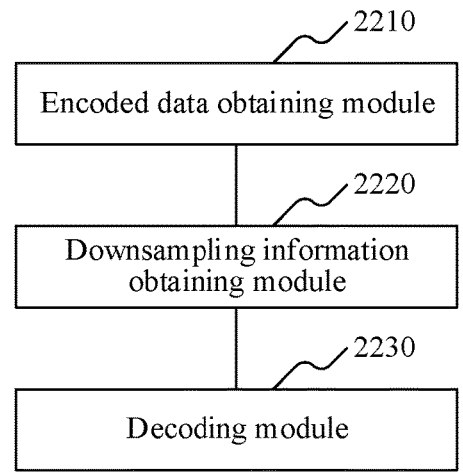
FIG. 22 is a structural block diagram of a video decoding apparatus according to an embodiment of the present disclosure.

FIG. 22 is a structural block diagram of a video decoding apparatus according to an exemplary embodiment of the present disclosure. The apparatus may be applied to a terminal, or may be applied to a server. As shown in FIG. 22, the apparatus includes: an encoded data obtaining module 2210, a down-sampling information obtaining module 2220, and a decoding module 2230.

The encoded data obtaining module 2210 is configured to obtain encoded data corresponding to a to-be-decoded video frame; the down-sampling information obtaining module 2220 is configured to obtain, from the encoded data, down-sampling information corresponding to the to-be-decoded video frame; and the decoding module 2230 is configured to decode the encoded data according to the down-sampling information corresponding to the to-be-decoded video frame, to obtain a corresponding decoded video frame.

In an embodiment, the down-sampling information obtaining module 2220 is further configured to read the down-sampling information from the encoded data, determine, according to a location of the down-sampling information in the encoded data, a processing range corresponding to the down-sampling information, the processing range including any one of a sequence level range, a GOP level range, a frame level range, and a coded block level range; and determine the down-sampling information corresponding to the to-be-decoded video frame according to the processing range.

In an embodiment, the down-sampling information obtaining module 2220 is further configured to determine the down-sampling information from header information of a video sequence in a case that the processing range is the sequence level range; or the down-sampling information obtaining module 2220 is further configured to determine the down-sampling information from header information corresponding to a GOP in a case that the processing range is the GOP level range; or the down-sampling information obtaining module 2220 is further configured to determine the down-sampling information from header information of a frame level in a case that the processing range is the frame level range; or the down-sampling information obtaining module 2220 is further configured to determine the down-sampling information from header information of a coded block in a case that the processing range is the coded block level range.

In an embodiment, the down-sampling information includes a down-sampling proportion; and the decoding module 2230 is further configured to decode the encoded data according to the down-sampling proportion corresponding to the to-be-decoded video frame, to obtain a reconstructed video frame corresponding to the to-be-decoded video frame; and up-sample the reconstructed video frame according to an up-sampling proportion corresponding to the down-sampling proportion, to obtain a decoded video frame.

In an embodiment, the decoding module 2230 is further configured to obtain a current reference frame corresponding to the to-be-decoded video frame; decode the encoded data according to the down-sampling proportion corresponding to the to-be-decoded video frame and the current reference frame, to obtain the reconstructed video frame corresponding to the to-be-decoded video frame.

In an embodiment, the decoding module 2230 is further configured to determine, according to the down-sampling proportion corresponding to the to-be-decoded video frame, resolution information corresponding to the to-be-decoded video frame; process the current reference frame according to the resolution information to obtain a target reference frame; and decode the encoded data according to the target reference frame, to obtain the reconstructed video frame corresponding to the to-be-decoded video frame.

In an embodiment, the down-sampling information includes a down-sampling method; and the decoding module 2230 is further configured to decode the encoded data, to obtain a reconstructed video frame corresponding to the to-be-decoded video frame; and process the reconstructed video frame according to an up-sampling method corresponding to the down-sampling method, to obtain a decoded video frame.

Figure 23:
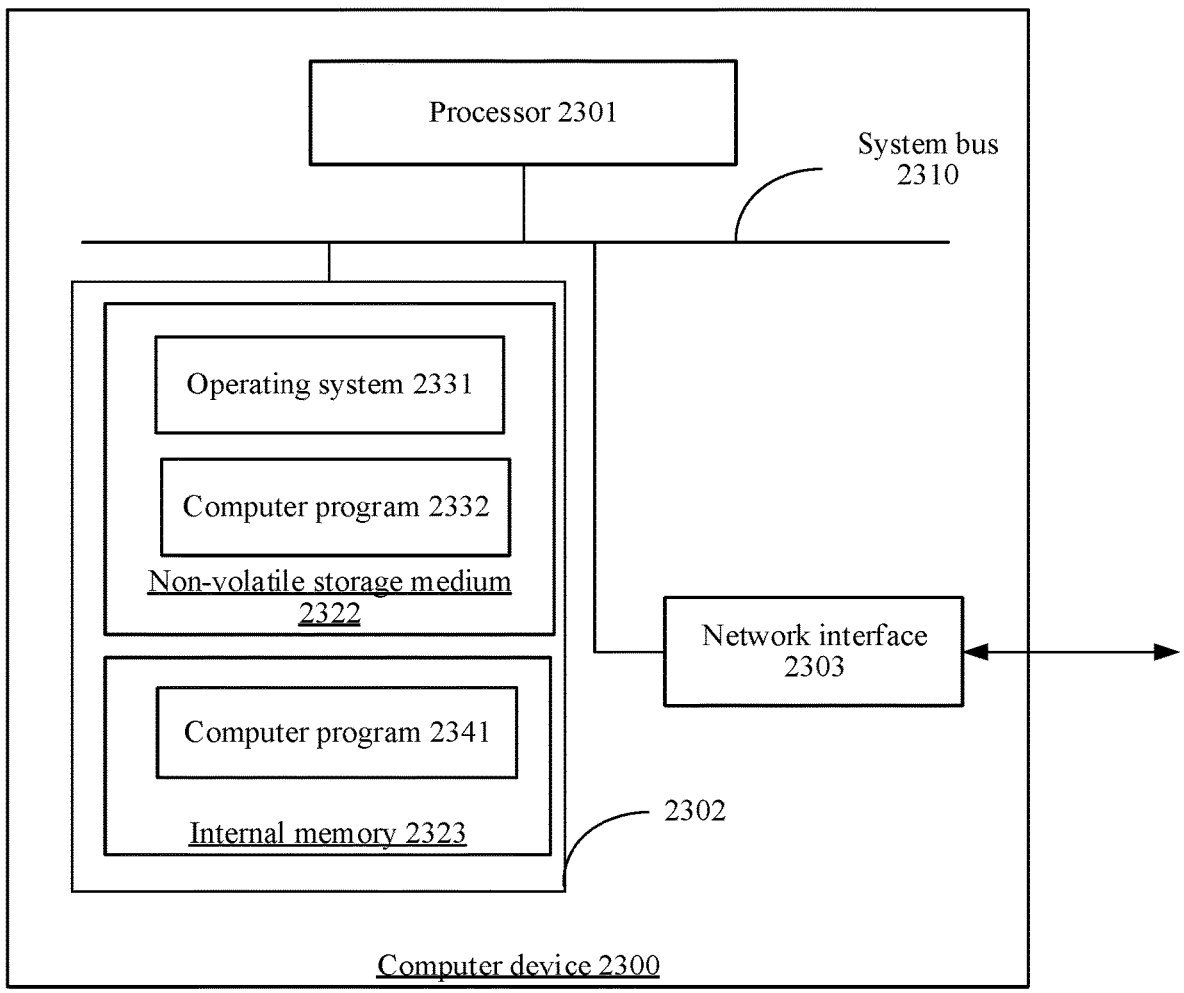
FIG. 23 is a diagram of an internal structure of a computer device according to an embodiment of the present disclosure.

FIG. 23 is a diagram of an internal structure of a computer device 2300 according to an embodiment. The computer device 2300 may be specifically a terminal or a server. As shown in FIG. 23, the computer device 2300 includes a processor 2301, a memory 2302, and a network interface 2303 connected through a system bus 2310. The memory 2302 includes a non-volatile storage medium 2322 and an internal memory 2323. The non-volatile storage medium 2322 of the computer device 2300 stores an operating system 2331, and may further store a computer program 2332. The computer program 2332, when executed by the processor 2301, may cause the processor 2301 to implement at least one method of the video encoding method and the video decoding method. The internal memory 2323 may also store a computer program 2341, and the computer program 2341, when executed by the processor 2301, may cause the processor 2301 to implement at least one method of the video encoding method and the video decoding method. A person skilled in the art may understand that the structure shown in FIG. 23 is merely a block diagram of a part of the structure related to the solution of the present disclosure, and does not constitute a limitation on a computer device to which the solution of the present disclosure is applied. Specifically, the computer device may include more or fewer components than those shown in the figure, or combine some components, or have different component arrangements.

In an embodiment, the video decoding apparatus provided in the present disclosure may be implemented in a form of a computer program, and the computer program may be run on the computer device shown in FIG. 23. The memory of the computer device may store program modules forming the video decoding apparatus, for example, the video frame obtaining module 2110, the determining module 2120, the encoding module 2130, and the adding module 2140 shown in FIG. 21. A computer program formed by the program modules causes the processor to perform the steps in the video encoding method in the embodiments of the present disclosure described in this specification. For example, the computer device shown in FIG. 23 may obtain an input video frame by using the video frame obtaining module 2110 of the video encoding apparatus shown in FIG. 21; determine down-sampling information corresponding to the input video frame by using the determining module 2120; encode the input video frame according to the down-sampling information by using the encoding module 2130 to obtain encoded data corresponding to the input video frame; and add the down-sampling information to the encoded data according to a processing range corresponding to the down-sampling information by using the adding module 2140.

In an embodiment, the video decoding apparatus provided in the present disclosure may be implemented in a form of a computer program, and the computer program may be run on the computer device shown in FIG. 23. The memory of the computer device may store program modules forming the video decoding apparatus, for example, the encoded data obtaining module 2210, the down-sampling information obtaining module 2220, and the decoding module 2230 shown in FIG. 22. A computer program formed by the program modules causes the processor to perform the steps in the video decoding method in the embodiments of the present disclosure described in this specification. For example, the computer device shown in FIG. 23 may obtain encoded data corresponding to a to-be-decoded video frame by using the encoded data obtaining module 2210 of the video decoding apparatus shown in FIG. 22; obtain, from the encoded data, down-sampling information corresponding to the to-be-decoded video frame by using the down-sampling information obtaining module 2220; and decode the encoded data according to the down-sampling information corresponding to the to-be-decoded video frame by using the decoding module 2230, to obtain a corresponding decoded video frame.

In an embodiment, the present disclosure further provides a computer device, including a memory and a processor, the memory storing at least one instruction, at least one program, and a code set or an instruction set, and the at least one instruction, the at least one program, and the code set or the instruction set being loaded and executed by the processor to implement the video encoding method or video decoding method in the foregoing embodiments of the present disclosure.

In an embodiment, the present disclosure further provides a computer-readable storage medium, storing at least one instruction, at least one program, and a code set or an instruction set, the at least one instruction, the at least one program, and the code set or the instruction set being loaded and executed by a processor to implement the video encoding method or video decoding method in the foregoing embodiments of the present disclosure.

In an embodiment, the present disclosure further provides a computer program product, the computer program product, when run on a computer, causing the computer to perform the video encoding method or video decoding method in the foregoing embodiments of the present disclosure.

A person of ordinary skill in the art may understand that all or some of the procedures of the methods in the embodiments may be implemented by a computer program instructing relevant hardware. The program may be stored in a non-volatile computer-readable storage medium. When the program is run, the procedures of the methods in the embodiments are performed. Any reference to the memory, storage, a database, or other media used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only describe several implementations of the present disclosure, and are described in detail, but they shall not be construed as a limitation to the patent scope of the present disclosure. A person of ordinary skill in the art may further make variations and improvements without departing from the ideas of the present disclosure, which all fall within the protection scope of the present disclosure. Therefore, the protection scope of the present disclosure shall be subject to the appended claims.

A person of ordinary skill in the art may understand that all or some of the steps of the embodiments may be implemented by hardware or a program instructing relevant hardware. The program may be stored in a computer-readable storage medium. The storage medium may be a read-only memory, a magnetic disk, an optical disc, or the like.

The foregoing descriptions are merely preferred embodiments of the present disclosure, and are not intended to limit the present disclosure. Any modification, equivalent replacement, improvement and the like made within the spirit and principle of the present disclosure shall fall within the protection scope of the present disclosure.

What is claimed is:

1. A video coding method, comprising:
obtaining an input video frame;
determining down-sampling information corresponding to the input video frame in response to determining that a target processing manner corresponding to the input video frame is a down-sampling processing manner, wherein the down-sampling information includes a down-sampling method, and the down-sampling method includes a first down-sample method with a first calculation complexity and a second down-sampling method with a second calculation complexity lower than the first calculation complexity;
in response to determining a real-time requirement is a first real-time requirement, employing the first down-sampling method, and in response to determining the real-time requirement is a second real-time requirement higher than the first real-time requirement, employing the second down-sampling method;
encoding the input video frame according to the down-sampling information to obtain encoded data corresponding to the input video frame;
obtaining a processing range corresponding to the down-sampling information, wherein the processing range includes one or more of a sequence level range, a group of pictures (GOP) level range, a frame level range, and a coded block level range, and wherein the sequence level range corresponds to a video sequence including two or more GOPs, the GOP level range corresponds to a GOP including two or more frames, the frame level range corresponds to a frame including two or more coded blocks, and the coded block level range corresponds to a coded block; and
adding the down-sampling information to the encoded data corresponding to the processing range, by:
determining whether the processing range is the sequence level range, the GOP level range, the frame level range, or the coded block level range;
in response to determining the processing range is the sequence level range, adding the down-sampling information to header information of the video sequence;
in response to determining the processing range is the GOP level range, adding the down-sampling information to header information of the GOP;
in response to determining the processing range is the frame level range, adding the down-sampling information to header information of the frame; and
in response to determining the processing range is the coded block level range, adding the down-sampling information to header information of the coded block.

2. The method according to claim 1, wherein the down-sampling information includes a down-sampling proportion, and the down-sampling proportion is obtained by:
obtaining a current quantization parameter (QP) estimation value corresponding to the input video frame;
obtaining a QP threshold corresponding to the input video frame; and
determining, according to a difference between the current QP estimation value and the QP threshold, the down-sampling proportion corresponding to the input video frame.

3. The method according to claim 2, wherein the determining, according to a difference between the current QP estimation value and the QP threshold, the down-sampling proportion corresponding to the input video frame comprises:
obtaining a correspondence between a candidate difference range and a candidate down-sampling proportion;
determining, from the candidate difference range according to the difference between the current QP estimation value and the QP threshold, a target difference range corresponding to the difference; and
determining, from the candidate down-sampling proportion according to the target difference range and the correspondence, the down-sampling proportion corresponding to the input video frame.

4. The method according to claim 2, wherein the obtaining a QP threshold corresponding to the input video frame comprises:
obtaining video frame information corresponding to the input video frame; and
determining, according to the video frame information, the QP threshold corresponding to the input video frame.

5. The method according to claim 1, wherein the down-sampling information includes a down-sampling method, and the down-sampling method is determined by:
calculating an image content complexity corresponding to the input video frame;
obtaining a correspondence between a candidate image content complexity and a candidate down-sampling method; and
determining, according to the correspondence, the down-sampling method corresponding to the image content complexity.

6. The method according to claim 1, wherein the down-sampling information includes a down-sampling method, and the down-sampling method is determined by:
obtaining a current coded block of the input video frame;
calculating a module gradient value corresponding to the current coded block;
classifying the current coded block into a target module class in a module set according to the module gradient value, candidate module classes in the module class set respectively corresponding to different module gradient value ranges;
obtaining a correspondence between a candidate module class and a candidate down-sampling method; and
determining, according to the correspondence between the candidate module class and the candidate down-sampling method and the target module class, the down-sampling method corresponding to the current coded block.

7. The method according to claim 1, wherein the down-sampling information includes a down-sampling proportion, and the encoded data is obtained by:
processing the input video frame according to the down-sampling proportion to obtain a current frame;
obtaining a reference frame corresponding to the current frame; and
encoding the current frame according to the reference frame, to obtain the encoded data corresponding to the input video frame.

8. The method according to claim 7, wherein the encoding the current frame according to the reference frame, to obtain the encoded data corresponding to the input video frame comprises:
obtaining a down-sampling proportion corresponding to the current frame, and processing the reference frame according to the down-sampling proportion to obtain a target reference frame; and encoding the current frame according to the target reference frame, to obtain the encoded data corresponding to the input video frame.

9. The method according to claim 1, wherein the determining down-sampling information corresponding to the input video frame comprises:
obtaining a correspondence between a candidate environmental factor and candidate down-sampling information; and
obtaining a current environmental factor, and determining, according to the correspondence between the candidate environmental factor and the candidate down-sampling information, the down-sampling information corresponding to the current environmental factor.

10. The method according to claim 1, wherein the down-sampling method includes a first down-sampling proportion and a second down-sampling proportion higher than the first down-sampling proportion, and the method further comprises:
determining whether the input video frame is a B frame or a P frame; and
in response to determining the input video frame is the B frame, employing the second down-sampling proportion; and
in response to determining the input video frame is the P frame, employing the first down-sampling proportion.

11. A video coding method, comprising:
obtaining encoded data corresponding to a current frame to be decoded;
determining a processing range according to the encoded data, wherein the processing range includes one or more of a sequence level range, a group of pictures (GOP) level range, a frame level range, and a coded block level range, and wherein the sequence level range corresponds to a video sequence including two or more GOPs, the GOP level range corresponds to a GOP including two or more frames, the frame level range corresponds to a frame including two or more coded blocks, and the coded block level range corresponds to a coded block;
reading down-sampling information corresponding to the processing range, by:
determining whether the processing range is the sequence level range, the GOP level range, the frame level range, or the coded block level range;
in response to determining the processing range is the sequence level range, reading the down-sampling information from header information of the video sequence;
in response to determining the processing range is the GOP level range, reading the down-sampling information from header information of the GOP;
in response to determining the processing range is the frame level range, reading the down-sampling information from header information of the frame; and
in response to determining the processing range is the coded block level range, reading the down-sampling information from header information of the coded block;
decoding the encoded data according to the down-sampling information corresponding to the current frame, to obtain a decoded video frame, wherein the down-sampling information includes a down-sampling method, and the down-sampling method includes a first down-sample method with a first calculation complexity and a second down-sampling method with a second calculation complexity lower than the first calculation complexity; and
in response to determining a real-time requirement is a first real-time requirement, employing the first down-sampling method, and in response to determining the real-time requirement is a second real-time requirement higher than the first real-time requirement, employing the second down-sampling method.

12. The method according to claim 11, wherein the down-sampling information includes a down-sampling proportion, and the decoded video frame is obtained by:
decoding the encoded data according to the down-sampling proportion corresponding to the current frame, to obtain a reconstructed video frame corresponding to the current frame; and
up-sampling the reconstructed video frame according to an up-sampling proportion corresponding to the down-sampling proportion, to obtain the decoded video frame.

13. The method according to claim 12, wherein the decoding the encoded data according to the down-sampling proportion corresponding to the current frame, to obtain a reconstructed video frame corresponding to the current frame comprises:
obtaining a current reference frame corresponding to the current frame; and
decoding the encoded data according to the down-sampling proportion corresponding to the current frame and the current reference frame, to obtain the reconstructed video frame corresponding to the current frame.

14. The method according to claim 13, wherein the decoding the encoded data according to the down-sampling proportion corresponding to the current frame and the current reference frame, to obtain the reconstructed video frame corresponding to the current frame comprises:
determining, according to the down-sampling proportion corresponding to the current frame, resolution information corresponding to the current frame;
processing the current reference frame according to the resolution information to obtain a target reference frame; and
decoding the encoded data according to the target reference frame, to obtain the reconstructed video frame corresponding to the current frame.

15. The method according to claim 11, wherein the down-sampling information includes a down-sampling method, and the decoded video frame is obtained by:
decoding the encoded data to obtain a reconstructed video frame corresponding to the current frame; and
processing the reconstructed video frame according to an up-sampling method corresponding to the down-sampling method, to obtain the decoded video frame.

16. A non-transitory computer-readable storage medium storing computer program instructions executable by at least one processor to perform:
obtaining an input video frame;
determining down-sampling information corresponding to the input video frame in response to determining that a target processing manner corresponding to the input video frame is a down-sampling processing manner, wherein the down-sampling information includes a down-sampling method, and the down-sampling method includes a first down-sample method with a first calculation complexity and a second down-sampling method with a second calculation complexity lower than the first calculation complexity;

in response to determining a real-time requirement is a first real-time requirement, employing the first down-sampling method, and in response to determining the real-time requirement is a second real-time requirement higher than the first real-time requirement, employing the second down-sampling method;

encoding the input video frame according to the down-sampling information to obtain encoded data corresponding to the input video frame;

obtaining a processing range corresponding to the down-sampling information, wherein the processing range includes one or more of a sequence level range, a group of pictures (GOP) level range, a frame level range, and a coded block level range, and wherein the sequence level range corresponds to a video sequence including two or more GOPs, the GOP level range corresponds to a GOP including two or more frames, the frame level range corresponds to a frame including two or more coded blocks, and the coded block level range corresponds to a coded block; and adding the down-sampling information to header information corresponding to the processing range, by:

determining whether the processing range is the sequence level range, the GOP level range, the frame level range, or the coded block level range;

in response to determining the processing range is the sequence level range, adding the down-sampling information to header information of the video sequence;

in response to determining the processing range is the GOP level range, adding the down-sampling information to header information of the GOP;

in response to determining the processing range is the frame level range, adding the down-sampling information to header information of the frame; and in response to determining the processing range is the coded block level range, adding the down-sampling information to header information of the coded block.

* * * * *